US012795564B2

(12) United States Patent
Das

(10) Patent No.: US 12,795,564 B2

(45) Date of Patent: Nov. 10, 2026

(54) APPARATUS AND METHODS FOR COORDINATED DELIVERY OF MULTIPLE DATA CHANNELS OVER PHYSICAL MEDIUM

(71) Applicant: Charter Communications Operating, LLC, St. Louis, MO (US)

(72) Inventor: Pratik Das, Escondido, CA (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 245 days.

(21) Appl. No.: 18/520,197

(22) Filed: Nov. 27, 2023

(65) Prior Publication Data

US 2024/0098393 A1 Mar. 21, 2024

Related U.S. Application Data

(63) Continuation of application No. 17/334,313, filed on May 28, 2021, now Pat. No. 11,832,034, which is a (Continued)

(51) Int. Cl.

*H04W 56/00* (2009.01)
*H04J 3/16* (2006.01)

(Continued)

(52) U.S. Cl.

CPC ......... *H04W 56/001* (2013.01); *H04J 3/1652* (2013.01); *H04L 5/0007* (2013.01); (Continued)

(58) Field of Classification Search

CPC ... H04W 56/001; H04W 16/14; H04W 36/08; H04W 48/18; H04W 72/0453; (Continued)

(56) References Cited

U.S. PATENT DOCUMENTS 3,999,051 A 12/1976 Petschauer
4,339,657 A 7/1982 Larson et al.

(Continued)

FOREIGN PATENT DOCUMENTS

CN 105071860 A 11/2015
EP 0812119 A2 12/1997

(Continued)

OTHER PUBLICATIONS

Wu et al., "Method and Device for Transmitting Uplink Channels, and Method and Device for Transmitting Downlink Channels", Nov. 8, 2018, WO, WO 2018201942 (Year: 2018).*

(Continued)

*Primary Examiner* — Michael K Phillips

(74) *Attorney, Agent, or Firm* — Patent Beach PC

(57) ABSTRACT

Apparatus and methods for unified high-bandwidth, low-latency data services. In one embodiment, a network architecture having service delivery over at least portions of extant infrastructure (e.g., a hybrid fiber coaxial infrastructure) is disclosed, which includes standards-compliant ultra-low latency and high data rate services (e.g., 5G NR services) via a common service provider. In one variant, parallel MIMO data streams supported by 3GPP 5G NR are shifted in frequency before being injected into the single coaxial cable feeder, so that frequency diversity (instead of spatial diversity) is leveraged to achieve the maximum total carrier bandwidth that 3GPP 5G NR chipsets. Intermediate Frequencies (IF) are transmitted over the media in one implementation, (i.e., instead of higher frequencies), and block-conversion to RF carrier frequency is employed subsequently in the enhanced consumer premises equipment (CPEe) for 3GPP band-compliant interoperability with the 3GPP 5G NR chipset in the CPEe.

20 Claims, 26 Drawing Sheets

Related U.S. Application Data continuation of application No. 16/384,706, filed on Apr. 15, 2019, now Pat. No. 11,026,004.

(60) Provisional application No. 62/658,465, filed on Apr. 16, 2018.

(51) Int. Cl.

| | |
|---|---|
| ***H04L 5/00*** | (2006.01) |
| ***H04L 12/28*** | (2006.01) |
| ***H04L 27/00*** | (2006.01) |
| ***H04L 27/26*** | (2006.01) |
| ***H04L 41/5003*** | (2022.01) |
| ***H04L 47/70*** | (2022.01) |
| ***H04L 61/5007*** | (2022.01) |
| ***H04L 67/12*** | (2022.01) |
| ***H04Q 11/02*** | (2006.01) |
| ***H04W 16/14*** | (2009.01) |
| ***H04W 36/08*** | (2009.01) |
| ***H04W 48/18*** | (2009.01) |
| ***H04W 72/0453*** | (2023.01) |
| ***H04W 80/10*** | (2009.01) |
| *H04M 7/00* | (2006.01) |
| *H04W 84/04* | (2009.01) |

(52) U.S. Cl.

CPC ........ *H04L 5/0041* (2013.01); *H04L 12/2801* (2013.01); *H04L 27/0006* (2013.01); *H04L 27/2637* (2013.01); *H04L 41/5003* (2013.01); *H04L 47/821* (2013.01); *H04L 61/5007* (2022.05); *H04L 67/12* (2013.01); *H04Q 11/02* (2013.01); *H04W 16/14* (2013.01); *H04W 36/08* (2013.01); *H04W 48/18* (2013.01); *H04W 72/0453* (2013.01); *H04W 80/10* (2013.01); *H04L 27/26* (2013.01); *H04M 7/006* (2013.01); *H04Q 2213/13012* (2013.01); *H04W 84/042* (2013.01)

(58) Field of Classification Search

CPC ... H04W 80/10; H04W 84/042; H04W 36/04; H04W 88/085; H04J 3/1652; H04L 5/0007; H04L 5/0041; H04L 12/2801; H04L 27/0006; H04L 27/2637; H04L 41/5003; H04L 47/821; H04L 61/5007; H04L 67/12; H04L 27/26; H04L 5/0037; H04L 5/006; H04L 12/2803; H04L 41/0806; H04L 43/16; H04L 12/2838; H04L 12/2869; H04L 12/2898; H04L 43/10; H04Q 11/02; H04Q 2213/13012; H04M 7/006

See application file for complete search history.

(56) References Cited

U.S. PATENT DOCUMENTS

| | | | |
|---|---|---|---|
| 4,574,364 | A | 3/1986 | Tabata et al. |
| 4,604,751 | A | 8/1986 | Aichelmann, Jr. et al. |
| 4,692,757 | A | 9/1987 | Tsuhara et al. |
| 4,710,761 | A | 12/1987 | Kapur et al. |
| 4,845,644 | A | 7/1989 | Anthias et al. |
| 4,890,098 | A | 12/1989 | Dawes et al. |
| 4,890,257 | A | 12/1989 | Anthias et al. |
| 5,113,517 | A | 5/1992 | Beard et al. |
| 5,121,475 | A | 6/1992 | Child et al. |
| 5,129,055 | A | 7/1992 | Yamazaki et al. |
| 5,155,731 | A | 10/1992 | Yamaguchi |
| 5,175,813 | A | 12/1992 | Golding et al. |
| 5,245,615 | A | 9/1993 | Treu |
| 5,276,437 | A | 1/1994 | Horvath et al. |
| 5,408,602 | A | 4/1995 | Giokas et al. |
| 5,463,768 | A | 10/1995 | Cuddihy et al. |
| 5,487,143 | A | 1/1996 | Southgate |
| 5,502,839 | A | 3/1996 | Kolnick |
| 5,522,025 | A | 5/1996 | Rosenstein |
| 5,564,002 | A | 10/1996 | Brown |
| 5,581,686 | A | 12/1996 | Koppolu et al. |
| 5,596,702 | A | 1/1997 | Stucka et al. |
| 5,621,879 | A | 4/1997 | Kohda |
| 5,664,046 | A | 9/1997 | Abecassis |
| 5,673,403 | A | 9/1997 | Brown et al. |
| 5,675,755 | A | 10/1997 | Trueblood |
| 5,692,142 | A | 11/1997 | Craycroft et al. |
| 5,734,380 | A | 3/1998 | Adams et al. |
| 5,742,583 | A | 4/1998 | Scott |
| 5,764,230 | A | 6/1998 | Baradel et al. |
| 5,790,779 | A | 8/1998 | Ben-Natan et al. |
| 5,831,609 | A | 11/1998 | London et al. |
| 5,850,544 | A | 12/1998 | Parvathaneny et al. |
| 5,856,826 | A | 1/1999 | Craycroft |
| 5,862,316 | A | 1/1999 | Hagersten et al. |
| 5,867,160 | A | 2/1999 | Kraft, IV et al. |
| 5,874,960 | A | 2/1999 | Mairs et al. |
| 5,877,755 | A | 3/1999 | Hellhake |
| 5,895,472 | A | 4/1999 | Brodsky et al. |
| 5,973,702 | A | 10/1999 | Orton et al. |
| 5,995,103 | A | 11/1999 | Ashe |
| 6,031,530 | A | 2/2000 | Trueblood |
| 6,092,107 | A | 7/2000 | Eleftheriadis et al. |
| 6,160,872 | A | 12/2000 | Karnowski et al. |
| 6,169,725 | B1 | 1/2001 | Gibbs et al. |
| 6,181,713 | B1 | 1/2001 | Patki et al. |
| 6,192,403 | B1 | 2/2001 | Jong et al. |
| 6,216,152 | B1 | 4/2001 | Wong et al. |
| 6,219,044 | B1 | 4/2001 | Ansberry et al. |
| 6,233,611 | B1 | 5/2001 | Ludtke et al. |
| 6,240,555 | B1 | 5/2001 | Shoff et al. |
| 6,252,889 | B1 | 6/2001 | Patki et al. |
| 6,313,880 | B1 | 11/2001 | Smyers et al. |
| 6,317,881 | B1 | 11/2001 | Shah-Nazaroff et al. |
| 6,330,010 | B1 | 12/2001 | Nason et al. |
| 6,336,122 | B1 | 1/2002 | Lee et al. |
| 6,337,717 | B1 | 1/2002 | Nason et al. |
| 6,366,876 | B1 | 4/2002 | Looney |
| 6,381,710 | B1 | 4/2002 | Kim |
| 6,381,735 | B1 | 4/2002 | Hunt |
| 6,397,262 | B1 | 5/2002 | Hayden et al. |
| 6,430,570 | B1 | 8/2002 | Judge et al. |
| 6,456,892 | B1 | 9/2002 | Dara-Abrams et al. |
| 6,460,141 | B1 | 10/2002 | Olden |
| 6,469,742 | B1 | 10/2002 | Trovato et al. |
| 6,496,864 | B1 | 12/2002 | McCartney |
| 6,505,298 | B1 | 1/2003 | Cerbini et al. |
| 6,510,152 | B1 | 1/2003 | Gerszberg et al. |
| 6,529,965 | B1 | 3/2003 | Thomsen et al. |
| 6,532,552 | B1 | 3/2003 | Benignus et al. |
| 6,542,500 | B1 | 4/2003 | Gerszberg et al. |
| 6,542,739 | B1 | 4/2003 | Garner |
| 6,546,016 | B1 | 4/2003 | Gerszberg et al. |
| 6,546,419 | B1 | 4/2003 | Humpleman et al. |
| 6,600,958 | B1 | 7/2003 | Zondag |
| 6,606,711 | B2 | 8/2003 | Andrews et al. |
| 6,625,274 | B1 | 9/2003 | Hoffpauir et al. |
| 6,630,943 | B1 | 10/2003 | Nason et al. |
| 6,631,350 | B1 | 10/2003 | Celi, Jr. et al. |
| 6,631,403 | B1 | 10/2003 | Deutsch et al. |
| 6,651,248 | B1 | 11/2003 | Alpern |
| 6,654,722 | B1 | 11/2003 | Aldous et al. |
| 6,687,735 | B1 | 2/2004 | Logston et al. |
| 6,714,534 | B1 | 3/2004 | Gerszberg et al. |
| 6,750,879 | B2 | 6/2004 | Sandberg |
| 6,762,796 | B1 | 7/2004 | Nakajoh et al. |
| 6,762,798 | B1 | 7/2004 | Messer et al. |
| 6,802,056 | B1 | 10/2004 | Chaiken et al. |
| 6,847,649 | B2 | 1/2005 | Sutanto |
| 6,850,533 | B2 | 2/2005 | Gerszberg et al. |
| 6,856,330 | B1 | 2/2005 | Chew et al. |
| 6,873,877 | B1 | 3/2005 | Tobias et al. |
| 6,895,573 | B2 | 5/2005 | Norgaard et al. |

(56) References Cited

U.S. PATENT DOCUMENTS

| | | | |
|---|---|---|---|
| 6,938,254 | B1 | 8/2005 | Mathur et al. |
| 6,941,341 | B2 | 9/2005 | Logston et al. |
| 6,944,185 | B2 | 9/2005 | Patki et al. |
| 6,948,175 | B1 | 9/2005 | Fong et al. |
| 6,948,183 | B1 | 9/2005 | Peterka |
| 6,952,836 | B1 | 10/2005 | Donlan et al. |
| 6,968,364 | B1 | 11/2005 | Wong et al. |
| 6,973,050 | B2 | 12/2005 | Birdwell et al. |
| 6,996,808 | B1 | 2/2006 | Niewiadomski et al. |
| 7,010,796 | B1 | 3/2006 | Strom et al. |
| 7,039,633 | B1 | 5/2006 | Dey et al. |
| 7,055,146 | B1 | 5/2006 | Durr et al. |
| 7,058,964 | B2 | 6/2006 | Khandelwal et al. |
| 7,068,597 | B1 | 6/2006 | Fijolek et al. |
| 7,080,356 | B2 | 7/2006 | Atallah et al. |
| 7,096,459 | B2 | 8/2006 | Keller et al. |
| 7,111,072 | B1 | 9/2006 | Matthews et al. |
| 7,137,106 | B2 | 11/2006 | Herman et al. |
| 7,146,305 | B2 | 12/2006 | Made et al. |
| 7,158,993 | B1 | 1/2007 | Schwabe |
| 7,181,725 | B1 | 2/2007 | Posegga et al. |
| 7,194,249 | B2 | 3/2007 | Phillips et al. |
| 7,203,869 | B2 | 4/2007 | Gwak |
| 7,213,213 | B2 | 5/2007 | Sekiguchi et al. |
| 7,216,170 | B2 | 5/2007 | Ludvig et al. |
| 7,240,104 | B2 | 7/2007 | Gautney |
| 7,266,726 | B1 | 9/2007 | Ladd et al. |
| 7,290,253 | B1 | 10/2007 | Agesen |
| 7,316,003 | B1 | 1/2008 | Dulepet et al. |
| 7,328,333 | B2 | 2/2008 | Kawano et al. |
| 7,366,286 | B1 | 4/2008 | Shenoi |
| 7,370,322 | B1 | 5/2008 | Matena et al. |
| 7,394,473 | B2 | 7/2008 | Asai |
| 7,401,324 | B1 | 7/2008 | Dmitriev |
| 7,478,341 | B2 | 1/2009 | Dove |
| 7,487,534 | B1 | 2/2009 | Peterka et al. |
| 7,546,602 | B2 | 6/2009 | Hejlsberg et al. |
| 7,552,450 | B1 | 6/2009 | Evans et al. |
| 7,581,012 | B2 | 8/2009 | Shiouchi et al. |
| 7,606,529 | B1 | 10/2009 | Swan et al. |
| 7,698,606 | B2 | 4/2010 | Ladd et al. |
| 7,814,544 | B1 | 10/2010 | Wilhelm |
| 7,945,902 | B1 | 5/2011 | Sahoo |
| 8,024,607 | B2 | 9/2011 | Ladd et al. |
| 8,042,113 | B2 | 10/2011 | Clohessy et al. |
| 8,046,636 | B2 | 10/2011 | Ladd et al. |
| 8,265,028 | B2 | 9/2012 | Davies et al. |
| 8,302,111 | B2 | 10/2012 | Ladd et al. |
| 8,321,723 | B2 | 11/2012 | Ladd et al. |
| 8,599,797 | B2 | 12/2013 | Pelkonen |
| 8,724,588 | B2 | 5/2014 | Li et al. |
| 8,750,710 | B1 | 6/2014 | Hirt et al. |
| 8,799,723 | B2 | 8/2014 | Ladd et al. |
| 8,880,071 | B2 | 11/2014 | Taaghol et al. |
| 8,989,297 | B1 | 3/2015 | Lou et al. |
| 8,997,136 | B2 | 3/2015 | Brooks et al. |
| 9,001,789 | B2 | 4/2015 | Hosobe |
| 9,185,341 | B2 | 11/2015 | Hardin |
| 9,300,445 | B2 | 3/2016 | Hardin |
| 9,564,932 | B1 | 2/2017 | Pack et al. |
| 9,596,593 | B2 | 3/2017 | Li et al. |
| 9,612,816 | B2 | 4/2017 | Choi et al. |
| 9,654,149 | B2 | 5/2017 | Piipponen et al. |
| 9,706,512 | B2 | 7/2017 | Suh |
| 9,769,692 | B2 | 9/2017 | Freda et al. |
| 9,807,778 | B2 | 10/2017 | Ma et al. |
| 9,813,148 | B2 | 11/2017 | Syed et al. |
| 9,894,659 | B1 | 2/2018 | Wang et al. |
| 9,918,260 | B2 | 3/2018 | Marinier et al. |
| 9,948,349 | B2 | 4/2018 | Malach |
| 10,009,431 | B2 | 6/2018 | Holtmanns |
| 10,085,199 | B1 | 9/2018 | Shaw et al. |
| 10,135,730 | B2 | 11/2018 | Chou |
| 10,164,858 | B2 | 12/2018 | Gunasekara et al. |
| 10,375,629 | B2 | 8/2019 | Zhang |
| 10,506,456 | B2 | 12/2019 | Lou et al. |
| 10,506,499 | B2 | 12/2019 | Keller et al. |
| 10,680,883 | B2 | 6/2020 | Hall et al. |
| 10,693,687 | B1 | 6/2020 | Kushnir |
| 10,735,095 | B1 | 8/2020 | Kim |
| 10,742,270 | B1 | 8/2020 | Kim |
| 10,924,825 | B2 | 2/2021 | Das et al. |
| 11,044,597 | B2 | 6/2021 | Wong et al. |
| 11,102,560 | B2 | 8/2021 | Hoole et al. |
| 11,129,213 | B2 | 9/2021 | Vaidya et al. |
| 11,190,861 | B2 | 11/2021 | Bali |
| 11,405,797 | B2 | 8/2022 | Vaidya et al. |
| 11,432,284 | B2 | 8/2022 | Hmimy et al. |
| 11,553,244 | B2 | 1/2023 | Maricevic et al. |
| 11,563,491 | B2 | 1/2023 | Bowler et al. |
| 2001/0007138 | A1 | 7/2001 | Iida et al. |
| 2001/0049691 | A1 | 12/2001 | Asazu |
| 2002/0009149 | A1 | 1/2002 | Rodriguez et al. |
| 2002/0032754 | A1 | 3/2002 | Logston et al. |
| 2002/0034193 | A1 | 3/2002 | Patki et al. |
| 2002/0038358 | A1 | 3/2002 | Sweatt, III et al. |
| 2002/0040470 | A1 | 4/2002 | Guthrie et al. |
| 2002/0044567 | A1 | 4/2002 | Voit et al. |
| 2002/0044569 | A1 | 4/2002 | Kwok et al. |
| 2002/0049978 | A1 | 4/2002 | Rodriguez et al. |
| 2002/0052977 | A1 | 5/2002 | Stall |
| 2002/0073244 | A1 | 6/2002 | Davies et al. |
| 2002/0083214 | A1 | 6/2002 | Heisig et al. |
| 2002/0112090 | A1 | 8/2002 | Bennett et al. |
| 2002/0126144 | A1 | 9/2002 | Chenede |
| 2002/0144193 | A1 | 10/2002 | Hicks et al. |
| 2002/0170033 | A1 | 11/2002 | Chen |
| 2002/0174430 | A1 | 11/2002 | Ellis et al. |
| 2002/0174433 | A1 | 11/2002 | Baumgartner et al. |
| 2002/0191028 | A1 | 12/2002 | Senechalle et al. |
| 2002/0198868 | A1 | 12/2002 | Kinzhalin, I et al. |
| 2003/0005454 | A1 | 1/2003 | Rodriguez et al. |
| 2003/0009765 | A1 | 1/2003 | Linden et al. |
| 2003/0009769 | A1 | 1/2003 | Hensgen et al. |
| 2003/0037331 | A1 | 2/2003 | Lee |
| 2003/0041291 | A1 | 2/2003 | Hashem et al. |
| 2003/0056155 | A1 | 3/2003 | Austen et al. |
| 2003/0056217 | A1 | 3/2003 | Brooks |
| 2003/0061240 | A1 | 3/2003 | McCann et al. |
| 2003/0081664 | A1 | 5/2003 | Lu et al. |
| 2003/0105995 | A1 | 6/2003 | Schroath et al. |
| 2003/0107604 | A1 | 6/2003 | Ording |
| 2003/0110331 | A1 | 6/2003 | Kawano et al. |
| 2003/0110511 | A1 | 6/2003 | Schutte et al. |
| 2003/0121055 | A1 | 6/2003 | Kaminski et al. |
| 2003/0122879 | A1 | 7/2003 | Inui et al. |
| 2003/0140285 | A1 | 7/2003 | Wilkie |
| 2003/0163811 | A1 | 8/2003 | Luehrs |
| 2003/0181241 | A1 | 9/2003 | Oakes et al. |
| 2003/0188320 | A1 | 10/2003 | Shing |
| 2003/0204848 | A1 | 10/2003 | Cheng et al. |
| 2003/0217197 | A1 | 11/2003 | Chan et al. |
| 2003/0217365 | A1 | 11/2003 | Caputo |
| 2003/0229899 | A1 | 12/2003 | Thompson et al. |
| 2003/0229900 | A1 | 12/2003 | Reisman |
| 2003/0231855 | A1 | 12/2003 | Gates et al. |
| 2004/0003400 | A1 | 1/2004 | Carney et al. |
| 2004/0034697 | A1 | 2/2004 | Fairhurst et al. |
| 2004/0040041 | A1 | 2/2004 | Crawford |
| 2004/0073944 | A1 | 4/2004 | Booth |
| 2004/0078695 | A1 | 4/2004 | Bowers et al. |
| 2004/0078829 | A1 | 4/2004 | Patel et al. |
| 2004/0083464 | A1 | 4/2004 | Cwalina et al. |
| 2004/0098730 | A1 | 5/2004 | Foote et al. |
| 2004/0103434 | A1 | 5/2004 | Ellis |
| 2004/0107451 | A1 | 6/2004 | Khandelwal et al. |
| 2004/0143836 | A1 | 7/2004 | McCormack et al. |
| 2004/0158649 | A1 | 8/2004 | Ophir et al. |
| 2004/0158829 | A1 | 8/2004 | Beresin et al. |
| 2004/0181811 | A1 | 9/2004 | Rakib |
| 2004/0186603 | A1 | 9/2004 | Sanford et al. |
| 2004/0187152 | A1 | 9/2004 | Francis et al. |
| 2004/0187156 | A1 | 9/2004 | Palm et al. |
| 2004/0199903 | A1 | 10/2004 | Iizuka |

(56) References Cited

U.S. PATENT DOCUMENTS

2004/0205339 A1 10/2004 Medin
2004/0218736 A1 11/2004 Fang et al.
2004/0236759 A1 11/2004 Young
2004/0261092 A1 12/2004 Addington et al.
2004/0261114 A1 12/2004 Addington et al.
2004/0261116 A1 12/2004 McKeown et al.
2004/0261126 A1 12/2004 Addington et al.
2005/0015799 A1 1/2005 Park
2005/0021766 A1 1/2005 McKeowen et al.
2005/0027851 A1 2/2005 McKeown et al.
2005/0034159 A1 2/2005 Ophir et al.
2005/0063317 A1 3/2005 Risberg et al.
2005/0071818 A1 3/2005 Reissman et al.
2005/0114900 A1 5/2005 Ladd et al.
2005/0120385 A1 6/2005 Stalker
2005/0132346 A1 6/2005 Tsantilis
2005/0160045 A1 7/2005 Watanabe et al.
2005/0162267 A1 7/2005 Khandelwal et al.
2005/0177832 A1 8/2005 Chew
2005/0273762 A1 12/2005 Lesh
2006/0005183 A1 1/2006 Minear et al.
2006/0020950 A1 1/2006 Ladd et al.
2006/0036750 A1 2/2006 Ladd et al.
2006/0047957 A1 3/2006 Helms et al.
2006/0070051 A1 3/2006 Kuck et al.
2006/0129947 A1 6/2006 Hamzy et al.
2006/0130107 A1 6/2006 Gonder et al.
2006/0130113 A1 6/2006 Carlucci et al.
2006/0143492 A1 6/2006 Leduc et al.
2006/0161946 A1 7/2006 Shin
2007/0094345 A1 4/2007 Rabbers et al.
2007/0207771 A1 9/2007 Bowser et al.
2007/0217436 A1 9/2007 Markley et al.
2007/0261090 A1 11/2007 Miller et al.
2007/0288897 A1 12/2007 Branda et al.
2007/0294673 A1 12/2007 Guerrera et al.
2008/0098212 A1 4/2008 Helms et al.
2008/0101291 A1 5/2008 Jiang et al.
2008/0178153 A1 7/2008 Fox et al.
2008/0196011 A1 8/2008 Bhandari et al.
2008/0256510 A1 10/2008 Auerbach
2008/0279287 A1 11/2008 Asahina
2008/0288930 A1 11/2008 Chen et al.
2009/0082060 A1 3/2009 Namatame
2009/0110088 A1 4/2009 Di Giandomenico et al.
2009/0119735 A1 5/2009 Dounaevski et al.
2009/0176490 A1 7/2009 Kazmi et al.
2009/0217326 A1 8/2009 Hasek
2009/0222867 A1 9/2009 Munetsugu
2009/0253387 A1 10/2009 Van Rensburg et al.
2010/0008235 A1 1/2010 Tinnakornsrisuphap et al.
2010/0035610 A1 2/2010 Narang et al.
2010/0064330 A1 3/2010 Yu et al.
2010/0176912 A1 7/2010 Sears et al.
2010/0178912 A1 7/2010 Gunnarsson et al.
2011/0117917 A1 5/2011 Gresset et al.
2011/0124335 A1 5/2011 Martin et al.
2011/0190000 A1 8/2011 Kwun
2011/0207456 A1 8/2011 Radulescu et al.
2011/0281583 A1 11/2011 Hole
2012/0076009 A1 3/2012 Pasko
2012/0083207 A1 4/2012 Rofougaran et al.
2012/0083225 A1 4/2012 Rofougaran et al.
2012/0195184 A1* 8/2012 Dapper .................. H04H 60/97 370/252
2012/0224563 A1 9/2012 Zisimopoulos et al.
2012/0246255 A1 9/2012 Walker et al.
2012/0275315 A1 11/2012 Schlangen et al.
2013/0010686 A1 1/2013 Shatzkamer et al.
2013/0077515 A1 3/2013 Jung et al.
2013/0077554 A1 3/2013 Gauvreau et al.
2013/0079003 A1 3/2013 Nagaraja et al.
2013/0143555 A1 6/2013 Singh et al.
2013/0156115 A1 6/2013 Petrovic
2013/0178225 A1 7/2013 Xing
2013/0189990 A1 7/2013 Kim et al.
2013/0201316 A1 8/2013 Binder et al.
2013/0215870 A1 8/2013 Hosobe
2013/0247027 A1 9/2013 Shah et al.
2013/0252616 A1 9/2013 Murakami
2013/0267229 A1 10/2013 Gopalakrishnan
2013/0279914 A1 10/2013 Brooks
2013/0322504 A1 12/2013 Asati et al.
2013/0337794 A1 12/2013 Kojima
2014/0073304 A1 3/2014 Brisebois et al.
2014/0087715 A1 3/2014 Suzuki et al.
2014/0099113 A1 4/2014 Fang et al.
2014/0148107 A1 5/2014 Maltsev et al.
2014/0177610 A1 6/2014 Kwentus et al.
2014/0241239 A1 8/2014 Chang
2014/0282704 A1 9/2014 Tumuluru et al.
2014/0282802 A1 9/2014 Bowler et al.
2014/0308986 A1 10/2014 Yang et al.
2014/0354442 A1 12/2014 Maity et al.
2014/0370895 A1 12/2014 Pandey et al.
2015/0063137 A1 3/2015 Shen et al.
2015/0085853 A1 3/2015 Smith et al.
2015/0087354 A1 3/2015 Ianev et al.
2015/0098349 A1 4/2015 Wei et al.
2015/0156777 A1 6/2015 Negus et al.
2015/0181363 A1 6/2015 Khorami
2015/0201088 A1 7/2015 Wu et al.
2015/0208290 A1 7/2015 Seo et al.
2015/0229584 A1 8/2015 Okamoto et al.
2015/0326237 A1 11/2015 Hamzeh
2015/0365178 A1 12/2015 Maattanen et al.
2016/0007138 A1 1/2016 Palanisamy et al.
2016/0013855 A1 1/2016 Campos et al.
2016/0014651 A1 1/2016 Wellington
2016/0020835 A1 1/2016 Stadelmeier et al.
2016/0021595 A1 1/2016 Czaja et al.
2016/0037514 A1 2/2016 Xiong et al.
2016/0037550 A1* 2/2016 Barabell ............. H04W 72/046 455/450
2016/0073344 A1 3/2016 Vutukuri et al.
2016/0088322 A1* 3/2016 Horev ................ H04N 21/2402 725/14
2016/0094421 A1 3/2016 Bali et al.
2016/0127434 A1 5/2016 Yoon et al.
2016/0127991 A1 5/2016 Ang et al.
2016/0128072 A1 5/2016 Rajagopal et al.
2016/0205679 A1 7/2016 Yoo et al.
2016/0212632 A1 7/2016 Katamreddy et al.
2016/0259923 A1 9/2016 Papa et al.
2016/0373974 A1 12/2016 Gomes et al.
2017/0019144 A1 1/2017 Malach
2017/0055186 A1 2/2017 Donepudi et al.
2017/0093555 A1 3/2017 Hamzeh et al.
2017/0094527 A1 3/2017 Shattil et al.
2017/0111846 A1 4/2017 Kang
2017/0118527 A1 4/2017 Wachob et al.
2017/0149937 A1 5/2017 Ren et al.
2017/0155703 A1 6/2017 Hao et al.
2017/0164068 A1 6/2017 Wachob et al.
2017/0201912 A1 7/2017 Zingler et al.
2017/0208488 A1 7/2017 Hwang et al.
2017/0208540 A1 7/2017 Egner et al.
2017/0214448 A1 7/2017 Lipowski et al.
2017/0245281 A1 8/2017 Zuckerman et al.
2017/0265220 A1 9/2017 Andreoli-Fang et al.
2017/0316233 A1 11/2017 Kherani et al.
2018/0063813 A1 3/2018 Gupta et al.
2018/0092142 A1 3/2018 Han et al.
2018/0098245 A1 4/2018 Livanos et al.
2018/0102828 A1 4/2018 Ashworth et al.
2018/0115905 A1 4/2018 Sirotkin
2018/0123749 A1 5/2018 Azizi et al.
2018/0146408 A1 5/2018 Meylan et al.
2018/0167128 A1 6/2018 Kinamon et al.
2018/0184337 A1 6/2018 Jin et al.
2018/0213452 A1 7/2018 Kim et al.
2018/0269974 A1 9/2018 Luciano
2018/0316563 A1 11/2018 Kumar et al.
2018/0331935 A1 11/2018 Ross et al.

(56) References Cited

U.S. PATENT DOCUMENTS

| | | | |
|---|---|---|---|
| 2018/0337752 | A1* | 11/2018 | Choi ........................ H04L 1/189 |
| 2018/0338277 | A1 | 11/2018 | Byun et al. |
| 2018/0343685 | A1 | 11/2018 | Hart et al. |
| 2018/0351665 | A1 | 12/2018 | Fukuta et al. |
| 2018/0351809 | A1 | 12/2018 | Meredith et al. |
| 2018/0375887 | A1 | 12/2018 | Dezent et al. |
| 2019/0007870 | A1 | 1/2019 | Gupta et al. |
| 2019/0028141 | A1 | 1/2019 | Padden et al. |
| 2019/0037630 | A1 | 1/2019 | Zhang et al. |
| 2019/0045388 | A1* | 2/2019 | Zhang ............... H04W 28/0231 |
| 2019/0052577 | A1 | 2/2019 | Li et al. |
| 2019/0053193 | A1 | 2/2019 | Park et al. |
| 2019/0058757 | A1 | 2/2019 | Sarda et al. |
| 2019/0075023 | A1 | 3/2019 | Sirotkin |
| 2019/0082447 | A1 | 3/2019 | Harsha et al. |
| 2019/0082501 | A1 | 3/2019 | Vesely et al. |
| 2019/0098582 | A1 | 3/2019 | Mackenzie et al. |
| 2019/0109643 | A1 | 4/2019 | Campos et al. |
| 2019/0124572 | A1 | 4/2019 | Park et al. |
| 2019/0124696 | A1 | 4/2019 | Islam et al. |
| 2019/0132170 | A1* | 5/2019 | Si ........................ H04W 56/001 |
| 2019/0141586 | A1 | 5/2019 | Olsson et al. |
| 2019/0158975 | A1 | 5/2019 | Petersen |
| 2019/0174359 | A1 | 6/2019 | Hannan |
| 2019/0208380 | A1 | 7/2019 | Shi et al. |
| 2019/0229974 | A1 | 7/2019 | Campos et al. |
| 2019/0245740 | A1 | 8/2019 | Kachhla |
| 2019/0253944 | A1 | 8/2019 | Kim |
| 2019/0261264 | A1 | 8/2019 | Lou et al. |
| 2019/0289470 | A1 | 9/2019 | Vaidya et al. |
| 2019/0306801 | A1 | 10/2019 | Zhou et al. |
| 2019/0313311 | A1 | 10/2019 | Huang-Fu et al. |
| 2019/0319814 | A1 | 10/2019 | Das |
| 2019/0319858 | A1 | 10/2019 | Das et al. |
| 2019/0320250 | A1 | 10/2019 | Hoole et al. |
| 2019/0320322 | A1 | 10/2019 | Jayawardene et al. |
| 2019/0320494 | A1 | 10/2019 | Jayawardene et al. |
| 2019/0357037 | A1 | 11/2019 | Velev et al. |
| 2019/0357199 | A1 | 11/2019 | Ali et al. |
| 2019/0379443 | A1 | 12/2019 | Pyun et al. |
| 2019/0379455 | A1 | 12/2019 | Wang et al. |
| 2020/0021689 | A1 | 1/2020 | Sultana et al. |
| 2020/0029245 | A1 | 1/2020 | Khoryaev et al. |
| 2020/0053545 | A1 | 2/2020 | Wong et al. |
| 2020/0059206 | A1 | 2/2020 | Williams et al. |
| 2020/0091608 | A1 | 3/2020 | Alpman et al. |
| 2020/0112888 | A1 | 4/2020 | Glennon et al. |
| 2020/0120724 | A1 | 4/2020 | Vaidya et al. |
| 2020/0137752 | A1* | 4/2020 | Parkvall ................ H04W 72/21 |
| 2020/0154388 | A1 | 5/2020 | Koshimizu et al. |
| 2020/0169049 | A1 | 5/2020 | Chiu et al. |
| 2020/0214065 | A1 | 7/2020 | Tomala et al. |
| 2020/0280836 | A1 | 9/2020 | Velev et al. |
| 2021/0028915 | A1 | 1/2021 | Jia et al. |
| 2021/0029759 | A1 | 1/2021 | Tang |
| 2021/0037447 | A1 | 2/2021 | Tarighat Mehrabani |
| 2021/0050906 | A1 | 2/2021 | Campos et al. |
| 2021/0058796 | A1 | 2/2021 | Gandhi et al. |
| 2021/0112551 | A1 | 4/2021 | Anderson et al. |
| 2021/0143893 | A1 | 5/2021 | Taneja et al. |
| 2021/0175925 | A1 | 6/2021 | Tarighat Mehrabani |
| 2021/0176665 | A1 | 6/2021 | Lan et al. |
| 2021/0226329 | A1 | 7/2021 | Krishnamachari et al. |
| 2021/0250196 | A1 | 8/2021 | Das et al. |
| 2021/0281993 | A1 | 9/2021 | Tiwari et al. |
| 2021/0336815 | A1 | 10/2021 | Das et al. |
| 2021/0337543 | A1 | 10/2021 | Das et al. |
| 2022/0045422 | A1 | 2/2022 | Lipowski |
| 2022/0078624 | A1 | 3/2022 | Hong |
| 2022/0132524 | A1 | 4/2022 | Mueck et al. |
| 2022/0240304 | A1 | 7/2022 | Wang et al. |
| 2023/0037887 | A1 | 2/2023 | Wachob |
| 2023/0044867 | A1 | 2/2023 | Wolcott et al. |
| 2023/0139455 | A1 | 5/2023 | Chatterjee et al. |
| 2023/0180054 | A1 | 6/2023 | Wirth et al. |

FOREIGN PATENT DOCUMENTS

| | | | | |
|---|---|---|---|---|
| GB | 2548796 | A | 10/2017 | |
| JP | 2006325206 | A | 11/2006 | |
| JP | 2011254495 | A | 12/2011 | |
| JP | 2016511998 | A | 4/2016 | |
| JP | 2017118483 | A | 6/2017 | |
| JP | 2018510589 | A | 4/2018 | |
| KR | 20160107419 | A | 9/2016 | |
| KR | 20160123469 | A | 10/2016 | |
| KR | 101890156 | B1 | 9/2018 | |
| WO | WO-2004045125 | A2 | 5/2004 | |
| WO | WO-2010120837 | A1 | 10/2010 | |
| WO | WO-2013051988 | A1 | 4/2013 | |
| WO | WO-2014029107 | A1 | 2/2014 | |
| WO | WO-2014078676 | A2 | 5/2014 | |
| WO | WO-2015147707 | A1 | 10/2015 | |
| WO | WO-2016095461 | A1 | 6/2016 | |
| WO | WO-2017186294 | A1 | 11/2017 | |
| WO | WO-2018063518 | A1 | 4/2018 | |
| WO | WO-2018201942 | A1 * | 11/2018 | ........ H04W 72/1263 |

OTHER PUBLICATIONS

3GPP., "Evolved Universal Terrestrial Radio Access (E-UTRA), Carrier Aggregation, Base Station (BS) radio transmission and reception (Release 10)", Technical Specification Group Radio Access Network, Technical Report (TR 36.808 V10.1.0), 2013, 31 pages.

3GPP., "RAN Adjusts Schedule for 2nd Wave of 5G Specifications (Release 16)", 2 pages, Retrieved from the internet [URL: https://www.3gpp.org/news-events/3gpp-news/2005-ran_r16_schedule] .

3GPP TR 38.801 v.14.0.0 (Mar. 2017) 3rd Generation Partnership Project; Technical Specification Group Radio Access Network; Study on New Radio Access Technology: Radio Access Architecture and Interfaces (Release 14), 91 pages.

3GPP TS 23.234 v13.1.0, "3GPP system to Wireless Local Area Network (WLAN) interworking; System description (Release 13)" 2017, 18 pages.

3GPP TS 23.501 v.15.4.0 (Dec. 2018) 3rd Generation Partnership Project; Technical Specification Group Services and System Aspects; System Architecture for the 5G System; Stage 2; Release 15, 236 pages.

3GPP TS 36.413 V14.4. entitled "3rd Generation Partnership Project; Technical Specification Group Radio Access Network; Evolved Universal Terrestrial Radio Access Network (E-Utran); S1 Application Protocol (S1AP) (Release 14)" dated Sep. 2017.

3GPP TS 38.473 V15.0.0 (Dec. 2017) "3rd Generation Partnership Project; Technical Specification Group Radio Access Network," TS 38.473 (v15.0.0), Dec. 2017, NG-RAN, F1 application protocol (F1AP), Release 15, 90 pages.

3GPP., "Study on New Radio Access Technology, Radio Interface Protocol Aspects (Release 14)", Technical Specification Group Radio Access Network, Technical Report (TR 38.804), V14.0.0 (Mar. 2017), 57 pages.

Article 5 of the Radio Regulations (edition 2001), Introduction to International Radio Regulations, 161 pages.

Bertenyi B., 3GPP TSG RAN, RAN Adjusts Schedule for2nd Wave of 5G Specifications, The Mobile Broadband Standard, A Global Initiative, Dec. 14, 2018, retrieved from the Internet: ( https://www.3gpp.org/news-events/3gpp-news/2005-ran_r16_schedule ), 2 pages.

ETSI TS 123 502 v15.2.0 (Jun. 2018) Technical Specification; 5G; Procedures for the 5G System; 311 pages.

GSMA Road to 5G: Introduction and Migration, Apr. 2018, 54 pages.

Maamoun K. M. et al., "A Survey and a Novel Scheme for RoF-PON as FTTx Wireless Services," 2009 6th InternationalSymposium on High Capacity Optical Networks and EnablingTechnologies(HONET), IEEE, 2009, pp. 246-253.

Nokia 5G New Radio (NR): Physical Layer Overview and Performance, IEEE Communication Theory Workshop, 2018 by A. Ghosh, May 15, 2018, 38 pages.

* cited by examiner

APPARATUS AND METHODS FOR COORDINATED DELIVERY OF MULTIPLE DATA CHANNELS OVER PHYSICAL MEDIUM

PRIORITY AND RELATED APPLICATIONS

This application is a continuation of and claims priority to co-owned and co-pending U.S. patent application Ser. No. 17/334,313 filed on May 28, 2021 entitled "APPARATUS AND METHODS FOR COORDINATED DELIVERY OF MULTIPLE DATA CHANNELS OVER PHYSICAL MEDIUM," and issuing as U.S. Pat. No. 11,832,034 on Nov. 28, 2023, which is a continuation of and claims priority to co-owned U.S. patent application Ser. No. 16/384,706 filed on Apr. 15, 2019 of the same title and issued as U.S. Pat. No. 11,026,004 on Jun. 1, 2021, and claims the benefit of priority to U.S. Provisional Patent Application No. 62/658,465 filed Apr. 16, 2018 and entitled "APPARATUS AND METHODS FOR INTEGRATED HIGH-CAPACITY DATA AND WIRELESS NETWORK SERVICES", each of which are incorporated herein by reference in its entirety.

This application is also related to co-owned and co-pending U.S. patent application Ser. No. 16/216,835 entitled "APPARATUS AND METHODS FOR INTEGRATED HIGH-CAPACITY DATA AND WIRELESS NETWORK SERVICES" filed Dec. 11, 2018, Ser. No. 16/261,234 entitled "APPARATUS AND METHODS FOR ENABLING MOBILITY OF A USER DEVICE IN AN ENHANCED WIRELESS NETWORK" filed Jan. 29, 2019, Ser. No. 16/384,561 entitled "APPARATUS AND METHODS FOR INTEGRATED HIGH-CAPACITY DATA AND WIRELESS IoT (INTERNET OF THINGS) SERVICES" filed Apr. 15, 2019, Ser. No. 16/384,805 entitled "GATEWAY APPARATUS AND METHODS FOR WIRELESS IoT (INTERNET OF THINGS) SERVICES" filed Apr. 15, 2019, and Ser. No. 16/384,701 entitled "APPARATUS AND METHODS FOR ENHANCING QUALITY OF EXPERIENCE FOR OVER-THE-TOP DATA SERVICES OVER HIGH-CAPACITY WIRELESS NETWORKS" filed Apr. 15, 2019, each of the foregoing incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of data networks and wireless devices, and specifically in one exemplary aspect to an architecture which integrates or unifies provision of high-speed data services in a variety of different locations and use cases, including provision of multiple data channels over a common bearer.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly attempting to adopt the paradigm of "anywhere", anytime," so that users (subscribers) can access the desired services (e.g., watch a movie) via a number of different receiving and rendering platforms, such as in different rooms of their house, on their mobile device while traveling, etc.

Managed Cable Networks

Network operators deliver data services (e.g., broadband) and video products to customers using a variety of different devices, thereby enabling their users or subscribers to access data/content in a number of different contexts, both fixed (e.g., at their residence) and mobile (such as while traveling or away from home). FIGS. 1 and 2 are a functional block diagrams illustrating a typical prior art managed (e.g., cable) content delivery network architecture used to provide such data services to its users and subscribers.

Data/content delivery may be specific to the network operator, such as where video content is ingested by the network operator or its proxy, and delivered to the network users or subscribers as a product or service of the network operator. For instance, a cable multiple systems operator (MSO) may ingest content from multiple different sources (e.g., national networks, content aggregators, etc.), process the ingested content, and deliver it to the MSO subscribers via e.g., a hybrid fiber coax (HFC) cable/fiber network, such as to the subscriber's set-top box or DOCSIS cable modem. Such ingested content is transcoded to the necessary format as required (e.g., MPEG-2 or MPEG-4/AVC), framed and placed in the appropriate media container format ("packaged"), and transmitted via e.g., statistical multiplex into a multi-program transport stream (MPTS) on 6 MHz radio frequency (RF) channels for receipt by the subscribers RF tuner, demultiplexed and decoded, and rendered on the user's rendering device (e.g., digital TV) according to the prescribed coding format.

Within the cable plant, VOD and so-called switched digital video (SDV) may also be used to provide content, and utilize a single-program transport stream (SPTS) delivery modality. In U. S. cable systems for example, downstream RF channels used for transmission of television programs are 6 MHz wide, and occupy a 6 MHz spectral slot between 54 MHz and 860 MHz. Deployments of VOD services have to share this spectrum with already established analog and digital cable television services such as those described above. Within a given cable plant, all homes that are electrically connected to the same cable feed running through a neighborhood will receive the same downstream signal. For the purpose of managing e.g., VOD services, these homes are grouped into logical groups typically called Service Groups. Homes belonging to the same Service Group receive their VOD service on the same set of RF channels.

VOD service is typically offered over a given number (e.g., 4) of RF channels from the available spectrum in cable.

Thus, a VOD Service Group consists of homes receiving VOD signals over the same 4 RF channels.

In most cable networks, programs are transmitted using MPEG (e.g., MPEG-2) audio/video compression. Since cable signals are transmitted using Quadrature Amplitude Modulation (QAM) scheme, available payload bitrate for typical modulation rates (QAM-256) used on HFC systems is roughly 38 Mbps. For example, in many VOD deployments, a typical rate of 3.75 Mbps is used to send one video program at resolution and quality equivalent to NTSC broadcast signals. In digital television terminology, this is called Standard Definition (SD) television resolution. Therefore, use of MPEG-2 and QAM modulation enables carriage of 10 SD sessions on one RF channel (10×3.75=37.5 Mbps<38 Mbps). Since a typical Service Group consists of 4 RF channels, 40 simultaneous SD VOD sessions can be accommodated within a Service Group.

Entertainment-quality transmission of HD (High Definition) signals requires about four times as much bandwidth as SD. For an exemplary MPEG-2 Main Profile-High Level (MP@HL) video compression, each HD program requires around 15 Mbps bitrate.

OTT

Alternatively, so-called "over-the-top" or OTT delivery may be used for providing services within a network, wherein content from a third party source who may be unaffiliated with the network operator provides content directly to the requesting user or subscriber via the network operator's infrastructure (including the cable architecture described supra), e.g., via an IP-based transport; i.e., the content is packetized and routed for delivery to the requesting user based on the user's network or IP address, such as via the aforementioned high-speed DOCSIS cable modem, according to the well-known Internet Protocol network-layer protocol.

IP unicasts (point to point) or multicasts (point to multiple points) have traditionally been used as the mechanism by which the OTT content is distributed over the network, via the user accessing a prescribed URL and logging in with their credentials to gain access to the content. The IP content is then streamed via the unicast/multicast to the requesting user(s), and received and decoded by a media player application program ("app") on the user's PC, laptop, or other IP-enabled end-user device.

Wireless

A multitude of wireless networking technologies, also known as Radio Access Technologies ("RATs"), provide the underlying means of connection for radio-based communication networks to user devices. Such RATs often utilize licensed radio frequency spectrum (i.e., that allocated by the FCC per the Table of Frequency Allocations as codified at Section 2.106 of the Commission's Rules). Currently only frequency bands between 9 kHz and 275 GHz have been allocated (i.e., designated for use by one or more terrestrial or space radio communication services or the radio astronomy service under specified conditions). For example, a typical cellular service provider might utilize spectrum for so-called "3G" (third generation) and "4G" (fourth generation) wireless communications as shown in Table 1 below:

TABLE 1

| Technology | Bands |
|---|---|
| 3G | 850 MHz Cellular, Band 5 (GSM/GPRS/EDGE).<br>1900 MHz PCS, Band 2 (GSM/GPRS/EDGE).<br>850 MHz Cellular, Band 5 (UMTS/HSPA + up to 21 Mbit/s).<br>1900 MHz PCS, Band 2 (UMTS/HSPA + up to 21 Mbit/s). |
| 4G | 700 MHz Lower B/C, Band 12/17 (LTE).<br>850 MHz Cellular, Band 5 (LTE).<br>1700/2100 MHz AWS, Band 4 (LTE).<br>1900 MHz PCS, Band 2 (LTE).<br>2300 MHz WCS, Band 30 (LTE). |

Alternatively, unlicensed spectrum may be utilized, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows typical ISM frequency allocations:

TABLE 2

| Frequency range | Type | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |
| 24 GHz-24.25 GHz | B | 24.125 GHz | Worldwide | Amateur, amateur-satellite, radiolocation & earth exploration-satellite service (active) |
| 61 GHz-61.5 GHz | A | 61.25 GHz | Subject to local acceptance | Fixed, inter-satellite, mobile & radiolocation service |

TABLE 2-continued

| Frequency range | Type | Center frequency | Availability | Licensed users |
|---|---|---|---|---|
| 122 GHz-123 GHz | A | 122.5 GHz | Subject to local acceptance | Earth exploration-satellite (passive), fixed, inter-satellite, mobile, space research (passive) & amateur service |
| 244 GHz-246 GHz | A | 245 GHz | Subject to local acceptance | Radiolocation, radio astronomy, amateur & amateur-satellite service |

ISM bands are also been shared with (non-ISM) license-free communications applications such as wireless sensor networks in the 915 MHz and 2.450 GHz bands, as well as wireless LANs (e.g., Wi-Fi) and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

User client devices (e.g., smartphone, tablet, phablet, laptop, smartwatch, or other wireless-enabled devices, mobile or otherwise) generally support multiple RATs that enable the devices to connect to one another, or to networks (e.g., the Internet, intranets, or extranets), often including RATs associated with both licensed and unlicensed spectrum. In particular, wireless access to other networks by client devices is made possible by wireless technologies that utilize networked hardware, such as a wireless access point ("WAP" or "AP"), small cells, femtocells, or cellular towers, serviced by a backend or backhaul portion of service provider network (e.g., a cable network). A user may generally access the network at a node or "hotspot," a physical location at which the user may obtain access by connecting to modems, routers, APs, etc. that are within wireless range.

One such technology that enables a user to engage in wireless communication (e.g., via services provided through the cable network operator) is Wi-Fi® (IEEE Std. 802.11), which has become a ubiquitously accepted standard for wireless networking in consumer electronics. Wi-Fi allows client devices to gain convenient high-speed access to networks (e.g., wireless local area networks (WLANs)) via one or more access points.

Commercially, Wi-Fi is able to provide services to a group of users within a venue or premises such as within a trusted home or business environment, or outside, e.g., cafes, hotels, business centers, restaurants, and other public areas. A typical Wi-Fi network setup may include the user's client device in wireless communication with an AP (and/or a modem connected to the AP) that are in communication with the backend, where the client device must be within a certain range that allows the client device to detect the signal from the AP and conduct communication with the AP.

Another wireless technology in widespread use is Long-Term Evolution standard (also colloquially referred to as "LTE," "4G," "LTE Advanced," among others). An LTE network is powered by an Evolved Packet Core ("EPC"), an Internet Protocol (IP)-based network architecture and eNodeB—Evolved NodeB or E-UTRAN node which part of the Radio Access Network (RAN), capable of providing high-speed wireless data communication services to many wireless-enabled devices of users with a wide coverage area.

Currently, most consumer devices include multi-RAT capability; e.g.; the capability to access multiple different RATs, whether simultaneously, or in a "fail over" manner (such as via a wireless connection manager process running on the device). For example, a smartphone may be enabled for LTE data access, but when unavailable, utilize one or more Wi-Fi technologies (e.g., 802.11g/n/ac) for data communications.

The capabilities of different RATs (such as LTE and Wi-Fi) can be very different, including regarding establishment of wireless service to a given client device. For example, there is a disparity between the signal strength threshold for initializing a connection via Wi-Fi vs. LTE (including those technologies configured to operate in unlicensed bands such as LTE-U and LTE-LAA). As a brief aside, LTE-U enables data communication via LTE in an unlicensed spectrum (e.g., 5 GHz) to provide additional radio spectrum for data transmission (e.g., to compensate for overflow traffic). LTE-LAA uses carrier aggregation to combine LTE in unlicensed spectrum (e.g., 5 GHZ) with the licensed band. Typical levels of signal strength required for LTE-U or LTE-LAA service are approximately −80 to −84 dBm. In comparison, Wi-Fi can be detected by a client device based on a signal strength of approximately −72 to −80 dBm, i.e., a higher (i.e., less sensitive) detection threshold.

Increasing numbers of users (whether users of wireless interfaces of the aforementioned standards, or others) invariably lead to "crowding" of the spectrum, including interference. Interference may also exist from non-user sources such as solar radiation, electrical equipment, military uses, etc. In effect, a given amount of spectrum has physical limitations on the amount of bandwidth it can provide, and as more users are added in parallel, each user potentially experiences more interference and degradation of performance.

Moreover, technologies such as Wi-Fi have limited range (due in part to the unlicensed spectral power mask imposed in those bands), and may suffer from spatial propagation variations (especially inside structures such as buildings) and deployment density issues. Wi-Fi has become so ubiquitous that, especially in high-density scenarios such as hospitality units (e.g., hotels), enterprises, crowded venues, and the like, the contention issues may be unmanageable, even with a plethora of Wi-Fi APs installed to compensate. Yet further, there is generally no coordination between such APs, each in effect contending for bandwidth on its backhaul with others.

Additionally, lack of integration with other services provided by e.g., a managed network operator, typically exists with unlicensed technology such as Wi-Fi. Wi-Fi typically acts as a "data pipe" opaquely carried by the network operator/service provider.

5G New Radio (NR) and NG-RAN (Next Generation Radio Area Network)

NG-RAN or "NextGen RAN (Radio Area Network)" is part of the 3GPP "5G" next generation radio system. 3GPP is currently specifying Release 15 NG-RAN, its components, and interactions among the involved nodes including so-called "gNBs" (next generation Node B's or eNBs). NG-RAN will provide very high-bandwidth, very low-latency (e.g., on the order of 1 ms or less "round trip") wireless communication and efficiently utilize, depending on application, both licensed and unlicensed spectrum of the type described supra in a wide variety of deployment scenarios, including indoor "spot" use, urban "macro" (large cell) coverage, rural coverage, use in vehicles, and "smart" grids and structures. NG-RAN will also integrate with 4G/4.5G systems and infrastructure, and moreover new LTE entities are used (e.g., an "evolved" LTE eNB or "eLTE eNB" which supports connectivity to both the EPC (Evolved Packet Core) and the NR "NGC" (Next Generation Core). As such, both "standalone" (SA) and "non-standalone" (NSA) configurations are described. As discussed in greater detail below, in the SA scenario, the 5G NR or the evolved LTE radio cells and the core network are operated alone. Conversely, in NSA scenarios, combination of e-UTRAN and NG-RAN entities are utilized.

In some aspects, exemplary Release 15 NG-RAN leverages technology and functions of extant LTE/LTE-A technologies (colloquially referred to as 4G or 4.5G), as bases for further functional development and capabilities. For instance, in an LTE-based network, upon startup, an eNB (base station) establishes S1-AP connections towards the MME (mobility management entity) whose commands the eNB is expected to execute. An eNB can be responsible for multiple cells (in other words, multiple Tracking Area Codes corresponding to E-UTRAN Cell Global Identifiers). The procedure used by the eNB to establish the aforementioned S1-AP connection, together with the activation of cells that the eNB supports, is referred to as the S1 SETUP procedure; see inter alia, 3GPP TS 36.413 V14.4, entitled "3rd Generation Partnership Project; Technical Specification Group Radio Access Network; Evolved Universal Terrestrial Radio Access Network (E-UTRAN); S1 Application Protocol (S1AP) (Release 14)" dated September 2017, which is incorporated herein by reference in its entirety.

As a brief aside, and referring to FIG. 3*a* (an SA configuration), the CU 304 (also known as gNB-CU) is a logical node within the NR architecture 300 that communicates with the NG Core 303, and includes gNB functions such as transfer of user data, session management, mobility control, RAN sharing, and positioning; however, other functions are allocated exclusively to the DU(s) 306 (also known as gNB-DUs) per various "split" options described subsequently herein in greater detail. The CU 304 communicates user data and controls the operation of the DU(s) 306, via corresponding front-haul (Fs) user plane and control plane interfaces 308, 310.

Accordingly, to implement the Fs interfaces 308, 310, the (standardized) F1 interface is employed. It provides a mechanism for interconnecting a gNB-CU 304 and a gNB-DU 306 of a gNB 302 within an NG-RAN, or for interconnecting a gNB-CU and a gNB-DU of an en-gNB within an E-UTRAN. The F1 Application Protocol (F1AP) supports the functions of F1 interface by signaling procedures defined in 3GPP TS 38.473. F1AP consists of so-called "elementary procedures" (EPs). An EP is a unit of interaction between gNB-CU and gNB-DU. These EPs are defined separately and are intended to be used to build up complete messaging sequences in a flexible manner. Generally, unless otherwise stated by the restrictions, the EPs may be invoked independently of each other as standalone procedures, which can be active in parallel.

Within such an architecture 300, a gNB-DU 306 (or ngeNB-DU) is under the control of a single gNB-CU 304. When a gNB-DU is initiated (including power-up), it executes the F1 SETUP procedure (which is generally modeled after the above-referenced S1 SETUP procedures of LTE) to inform the controlling gNB-CU of, inter alia, any number of parameters such as e.g., the number of cells (together with the identity of each particular cell) in the F1 SETUP REQUEST message.

FIGS. 3*b*-3*d* illustrate some of the alternate prior art configurations of 5G NR gNB architectures, including those involving eLTE eNB (evolved LTE eNBs that are capable of communication with an NGC or EPC) and various configurations of user-plane and control-plane interfaces in the so-called "non-standalone" or NSA configurations (e.g., Options 3, 4 and 7). See, inter alia, 3GPP TR 38.804 V14.0.0 (2017-03) "3rd Generation Partnership Project; Technical Specification Group Radio Access Network; Study on New Radio Access Technology; Radio Interface Protocol Aspects (Release 14)," incorporated herein by reference in its entirety, for additional details on these and other possible 4G/5G configurations.

In FIG. 3*b*, a eUTRAN eNB 316 is communicative with the 5G gNB 302 for user plane (UP) and control plane (CP) functions, and is communicative with the NGC 303 for UP functions (i.e., the gNB is a master node in conjunction with a 5GC).

In FIG. 3*c*, a eUTRAN eNB 316 is communicative with the 5G gNB 302 for user plane (UP) and control plane (CP) functions, and is communicative with the NGC 303 for UP and CP functions (i.e., the eNB is a master node in conjunction with a 5GC).

In FIG. 3*d*, a 5G gNB 302 is communicative with the eNB 316 for user plane (UP) and control plane (CP) functions, and is communicative with the Evoled Packet Core (EPC) 333 for UP functions (i.e., the eNB is a master node in conjunction with an EPC).

As of the date of this writing, 3GPP is delivering Release 15 to industry in three distinct steps: (i) 'early' drop: contains Non-standalone 5G specifications (so called Option-3 family), ASN.1 frozen in March 2018; (ii) 'main' drop: contains Standalone 5G (so called Option-2), ASN.1 frozen in September 2018; and (iii) 'late' drop: contains additional migration architectures (so called Option-4, Option-7, and 5G-5G dual connectivity), ASN.1 to be frozen in June 2019. See http://www.3upp.org/news-events/3gpp-news/2005-ran_r16_schedule.

Better Solutions Needed

Even with the great advances in wireless data rate, robustness and coverage afforded by extant 4/4.5G (e.g. LTE/LTE-A) and WLAN (and other unlicensed) systems, significant disabilities still exist.

One such problem relates to the situation where MNO or other radio access nodes or base stations are backhauled by another provider (e.g., a wireless network built around HFC/DOCSIS as backhaul between the radio and wireless core network elements). In such cases, several disadvantages are encountered, including (i) separate CAPEX (capital expenditure) and OPEX (operating expenditure) "silos" for maintaining the two different networks; i.e., wired and wireless; and (ii) lower data throughput efficiency and higher latency due to the additional overhead of encapsulating wireless data packets through e.g., the DOCSIS (backhaul) protocols. In the context of the aforementioned ultra-low latency requirements of 5G (i.e., 1 ms or less round-trip between endpoint nodes), such infrastructure-induced latency can result in failing to meet these requirements, making this architecture potentially unsuitable for 5G applications.

Moreover, to achieve certain capacity targets (e.g., 10 Gbps) over such infrastructure, increased use of optical fiber is needed in certain parts of the infrastructure. Under current HFC network design, services are provided to users via a single coaxial cable "drop" to their premises, and groups of such premises are served by common tap-off points or nodes within the larger architecture (see discussion of cable systems supra). Individual premises "tap off" the cabling or other infrastructure from each node and, depending on their geographic placement and other considerations, may require utilization of a number of different amplification units in order to maintain sufficient signal strength out to the most distant (topology-wise) premises in the system.

However, when using (i) a single receiver chipset in the consumer premises equipment (CPE) and (ii) 3GPP 5G NR waveforms over such a single coaxial feeder that MSOs bring to their subscriber's premises (or alternatively a single coaxial cable that is installed for lower-cost single input single output (SISO) distributed antenna systems (DAS)), the total carrier bandwidth that can be aggregated by the chipset in such architectures is limited to a value, e.g. 800 MHZ, under prior art techniques. This is insufficient for reaching high throughputs such as 10 Gbit/s, and fails to effectively leverage the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth (i.e., to leverage the spatial diversity that wireless channels afford when multiple antenna elements are used), at least the first generation of commercial 3GPP NR chipsets will support such parallel MIMO data streams. However, attempts to transmit these parallel streams over a single cable such as that described above would be counterproductive, as all the streams would occupy the same RF bandwidth, and would interfere with each other for lack of spatial diversity between them.

Additionally, at least first generation NR implementations ("early drop" discussed above) require both 3GPP 4G and 5G capability to operate in tandem, as part of the non-standalone (NSA) configuration, which adds further requirements/complexity. Specifically, 3GPP Release 15 indicates that the first implementations of networks and devices will be classed as NSA, in effect meaning that 5G networks will be supported by existing 4G/4.5G core infrastructure (see exemplary configurations of FIGS. 3*b*-3*d* discussed above). For instance, 5G-enabled UEs will connect using 5G frequencies for data-throughput improvements, but will continue use of 4G/4.5G infrastructure and EPC. That is, NSA leverages the existing LTE radio access and core to anchor 5G NR using the "Dual Connectivity" feature. Dual Connectivity may be defined as operation wherein a given UE consumes radio resources provided by at least two different network points (e.g. NR access from gNB and LTE access from eNB).

The initial implementations of 5G cellular infrastructure will be directed primarily to so-called enhanced mobile broadband (eMBB) and URLLC (ultra reliable low latency communications). These features are intended to provide, inter alia, increased data-bandwidth and connection reliability via two (2) new radio frequency ranges: (i) Frequency Range 1—this range overlaps and extends 4G/4.5G LTE frequencies, operating from 450 MHz to 6,000 MHz. Bands are numbered from 1 to 255 (commonly referred to as New Radio (NR) or sub-6 GHZ); and (ii) Frequency Range 2—this range operates at a higher 24,250 MHz to 52,600 MHz, and uses bands numbered between 257 to 511.

The 5G Standalone (SA) network and device standard (approval to be determined) advantageously provides simplification and improved efficiency over NSA. This simplification will lower CAPEX/OPEX cost, and improve performance in data throughput up to the edge portions of the wireless infrastructure. Once the incipient SA standard (later "drops" discussed above) is implemented, migration from 5G NSA to SA by operators will occur according to any one of a number of possible migration paths; however, until such migration is completed, NSA requirements must be supported where applicable.

Accordingly, improved apparatus and methods are needed to, inter alia, enable optimized delivery of ultra-high data rate services (both wired and wireless) such as the aforementioned 10 Gbps capability, and which leverage extant network infrastructure such as the single MSO cable drop discussed above. Ideally, such improved apparatus and methods would also have sufficient capability/flexibility to support both 4G and 5G NR functionality for NSA implementations which will likely be prevalent for at least a period of time before SA (Release 16) is fully implemented, as well as being adaptable for subsequent SA operation.

SUMMARY

The present disclosure addresses the foregoing needs by providing, inter alia, methods and apparatus for providing optimized delivery of ultra-high data rate services (both wired and wireless) and which leverage extant network infrastructure and which support extant 3GPP protocols including both 4G and 5G NR.

In a first aspect of the disclosure, a method of operating a radio frequency (RF) network so that extant infrastructure is used to deliver integrated wireless data services is disclosed. In one embodiment, the method includes transmitting OFDM (orthogonal frequency division multiplexing) waveforms over at least a portion of the extant infrastructure within a prescribed frequency band. In one variant, the transmitted OFDM waveforms including at least first and second spatial diversity data channels, the at least first and second spatial diversity data channels shifted in frequency relative to one another and within the prescribed frequency band so that each of the at least first and second spatial diversity data channels may be received by at least one receiver device and aggregated.

In one implementation, the transmitting over the at least portion of the extant infrastructure includes transmitting over a hybrid fiber coax (HFC) infrastructure for delivery to at least one single coaxial cable premises drop; and the integrated wireless data services comprise data delivery at rates in excess of 1 Gbps.

In another implementation, the method further includes designating the prescribed frequency band from an available total bandwidth of the extant infrastructure; and allocating the at least first and second spatial diversity data channels to at least two respective sub-bands. The allocation includes e.g., allocating using wideband amplifier apparatus into sub-bands of approximately 98 MHz, and may further comprise delivery of the at least two sub-bands to one or more extant HFC network hubs.

In a further implementation, the method further includes allocating at least one 3GPP Long Term Evolution (3GPP LTE) channel within at least one sub-band of the prescribed frequency band, and at least one synchronization carrier within at least one sub-band of the prescribed frequency band.

In one approach, I (In-phase) and Q (Quadrature) data are multiplexed onto the synchronization carrier, the multiplexing I (In-phase) and Q (Quadrature) data onto the synchronization carrier including multiplexing at least first and second data bits onto the synchronization carrier, the at least first data bits corresponding to a first technology, and the at least second data bits corresponding to a second technology (e.g., 3GPP LTE and 3GPP 5G NR (5th Generation New Radio)).

In another aspect, a network architecture configured to support wireless user devices is disclosed. In one embodiment, the architecture includes: a distribution node, the distribution node configured to transmit radio frequency (RF) waveforms onto a wireline or optical medium of a network, the RF waveforms being orthogonal frequency division multiplex (OFDM) modulated and including at least two spatially diverse data streams, a first of the at least two spatially diverse data streams allocated to a first frequency sub-band, and a second of the at least two spatial diversity data streams allocated to a second frequency sub-band; and a first plurality of user nodes, each of the first plurality of user nodes in data communication with the wireline or optical medium and including a receiver apparatus.

In one variant, the receiver apparatus is configured to: receive the transmitted OFDM modulated waveforms; upconvert the received OFDM modulated waveforms to at least one user frequency band to form upconverted waveforms; and transmit the upconverted waveforms to at least one wireless user device.

In one implementation, the network architecture includes a radio node in data communication with the distribution node and at least one of the first plurality of user nodes, the radio node configured to provide at least supplemental data communication to the at least one user node. The radio node is in data communication with the distribution node via at least an optical fiber medium, and the radio node is in data communication with the at least one user node via a wireless interface.

In another implementation, the radio node is in data communication with the distribution node via at least an optical fiber medium, and the radio node is in data communication with the at least one user node via a wireless interface.

In a further implementation, the network architecture includes a second distribution node, the second distribution node configured to transmit radio frequency (RF) waveforms onto a second wireline or optical medium of the network, the RF waveforms being orthogonal frequency division multiplex (OFDM) modulated, the second wireline or optical medium of the network serving a second plurality of user nodes different than the first plurality of user nodes. The architecture may also include a radio node in data communication with at least the distribution node and (i) at least one of the first plurality of user nodes, and (ii) at least one of the second plurality of user nodes, the radio node configured to provide at least supplemental data communication to both the at least one of the first plurality of user nodes, and the at least one of the second plurality of user nodes.

In one particular implementation, the radio node is in data communication with the distribution node via at least an optical fiber medium, and the radio node is in data communication with both the at least one of the first plurality of user nodes, and the at least one of the second plurality of user nodes, via a wireless interface utilizing an unlicensed portion of the RF spectrum.

In another aspect of the disclosure, a controller apparatus for use within a hybrid fiber/coaxial cable distribution network is disclosed. In one embodiment, the controller apparatus includes: a radio frequency (RF) communications management module; a first data interface in data communication with the RF communications management module for data communication with a network core process; a second data interface in data communication with the RF communications management module for data communication with a first RF distribution node of the hybrid fiber/coaxial cable distribution network; and a third data interface in data communication with the RF communications management module for data communication with a second RF distribution node of the hybrid fiber/coaxial cable distribution network.

In one variant, the radio frequency (RF) communications management module includes computerized logic to enable at least the transmission of digital data from at least one of the first RF distribution node and the second RF distribution node using a plurality of spatial diversity data streams shifted in frequency relative to one another and transmitted via a selected transmission frequency band.

In one implementation, the radio frequency (RF) communications management module includes a 3GPP Fifth Generation New Radio (5G NR) gNB (gNodeB) Controller Unit (CU), the first data interface for data communication with a network core process includes a 3GPP Fifth Generation New Radio (5G NR) $X_n$ interface with a 5GC (Fifth Generation Core), and the second data interface includes a 3GPP Fifth Generation New Radio (5G NR) F1 interface operative over at least a wireline data bearer medium, the first RF distribution node including a 3GPP Fifth Generation New Radio (5G NR) gNB (gNodeB) Distributed Unit (DU); and the third data interface includes an Fifth Generation New Radio (5G NR) F1 interface operative over at least a dense wave division multiplexed (DWDM) optical data bearer, the second RF distribution node including a 3GPP Fifth Generation New Radio (5G NR) gNB (gNodeB) Distributed Unit (DU).

In another aspect, methods and apparatus for utilizing spatial diversity data streams to deliver data over a common single transmission medium are disclosed. In one embodiment, the spatial diversity streams are 5G NR MIMO data streams, and the transmission medium includes a coaxial cable.

In a further aspect, a method of generating and delivering a plurality of MIMO data streams over a network is disclosed. In one embodiment, the method includes delivering two or more MIMO streams which converge at a destination node (e.g., CPEe) using different frequency resources after carriage over an interposed RF cable medium. In one variant, the two or more MIMO streams are mapped to the frequency resources based at least on channel quality feedback from the CPEe back to the transmission node. In another variant, the method further includes selecting an appoririate modulation and coding scheme (MCS) for each of the streams, such as by the transmission node.

In another aspect, methods for synchronizing first and second technology data streams transmitted over a bearer medium (e.g., coaxial cable) are disclosed. In one variant, I and Q signals are sent over the medium in a prescribed frequency band and used to synchronize 4G/4.5G (LTE/LTE-A) signals and 5G NR signals.

In another aspect, computerized network apparatus for use in a data network is disclosed. In one variant, the network includes an HFC network with NG-RAN capability, and the apparatus includes at least one enhanced DU (DUe).

In another variant, the network apparatus includes at least one enhanced CU (CUe), which can control a number of DU/DUe.

In yet another aspect, a system is disclosed. In one embodiment, the system includes (i) a controller entity, (ii) one or more distributed entities in data communication therewith via an HFC bearer.

In a further aspect of the disclosure, a method for providing high speed data services to a device is described. In one embodiment, the method includes providing indoor wireless coverage via a wireless-enabled CPE backhauled by an HFC network, and supplementing that capability via one or more external (e.g., pole mounted) access nodes that are communicative with the CPE via an external antenna apparatus. In one variant, the external access nodes are backhauled by the same HFC network.

In another aspect, a computerized access node implementing one or more of the foregoing aspects is disclosed and described. In one embodiment, the access node includes a wireless interface capable of data communication with a user device (e.g., UE). In one variant, the device is pole-mounted (e.g., on a telephone or utility pole), and further is configured to interface with a premises CPE via e.g., an antenna apparatus mounted on an exterior of the premises.

In another aspect, a computerized premises device implementing one or more of the foregoing aspects is disclosed and described. In one embodiment, the device includes a CPE having 5G NR capability, and is backhauled via an extant coaxial cable drop. In one variant, the device also includes MIMO-enabled chipset adapted for receipt and processing of the frequency-shifted waveforms previously referenced.

In another aspect, a computerized device implementing one or more of the foregoing aspects is disclosed and described. In one embodiment, the device includes a personal or laptop computer. In another embodiment, the device includes a mobile device (e.g., tablet or smartphone). In another embodiment, the device includes a computerized "smart" television or rendering device.

In another aspect, an integrated circuit (IC) device implementing one or more of the foregoing aspects is disclosed and described. In one embodiment, the IC device is embodied as a SoC (system on Chip) device. In another embodiment, an ASIC (application specific IC) is used as the basis of the device. In yet another embodiment, a chip set (i.e., multiple ICs used in coordinated fashion) is disclosed. In yet another embodiment, the device includes a multi-logic block FPGA device.

In another aspect, a computer readable storage apparatus implementing one or more of the foregoing aspects is disclosed and described. In one embodiment, the computer readable apparatus includes a program memory, or an EEPROM. In another embodiment, the apparatus includes a solid state drive (SSD) or other mass storage device. In another embodiment, the apparatus includes a USB or other "flash drive" or other such portable removable storage device. In yet another embodiment, the apparatus includes a "cloud" (network) based storage device which is remote from yet accessible via a computerized user or client electronic device. In yet another embodiment, the apparatus includes a "fog" (network) based storage device which is distributed across multiple nodes of varying proximity and accessible via a computerized user or client electronic device.

In a further aspect, an optical-to-coaxial cable transducer that can transmit and receive 3GPP 4G LTE and 5G NR waveforms to multiple CPE through a single coaxial cable interface is disclosed.

In a further aspect, a method of introducing expanded data network services within a network infrastructure are disclosed. In one embodiment, the network includes an HFC cable network, and the method includes (i) utilizing extant bearer media (e.g., coaxial cable to premises) as a primary backhaul for high speed data services, and (ii) subsequently using extant bearer media (e.g., coaxial cable or optical fiber to extant wireless nodes such as cellular base stations) to provide supplemental bandwidth/mobility services to the premises users. In another variant, the method further includes (iii) subsequently installing new optical fiber or other media to support backhaul of new (currently non-existent "pole mounted" or similar opportunistic access nodes which support further user mobility for the users/subscribers of the network operator.

These and other aspects shall become apparent when considered in light of the disclosure provided herein.

Figure 1:
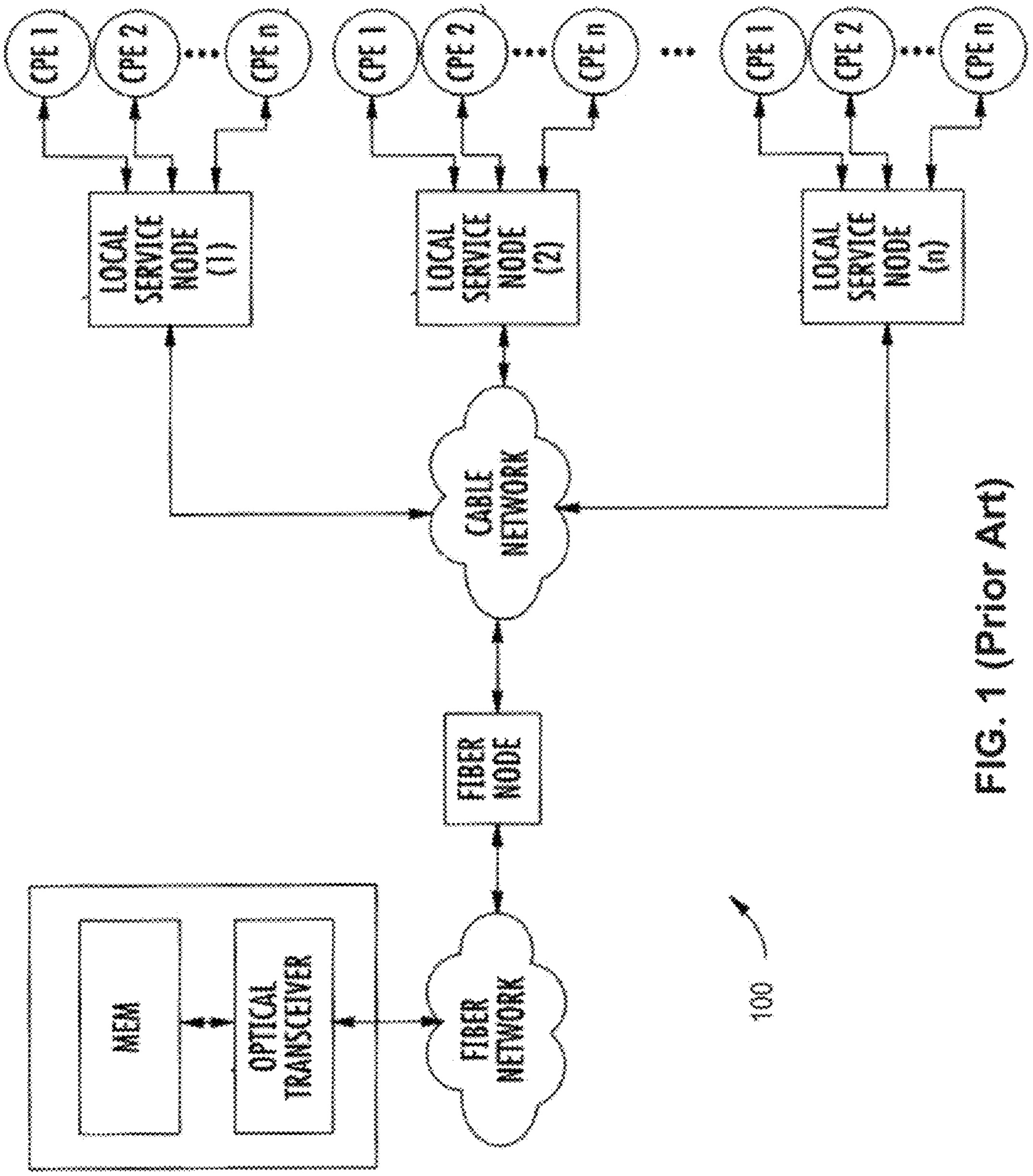
FIG. 1 (Prior Art)
FIGS. 1 and 2 are a functional block diagrams illustrating a typical prior art managed (e.g., cable) content delivery network architecture.

All figures @ Copyright 2017-2019 Charter Communications Operating, LLC. All rights reserved.

DETAILED DESCRIPTION

Reference is now made to the drawings wherein like numerals refer to like parts throughout.

As used herein, the term "application" (or "app") refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "central unit" or "CU" refers without limitation to a centralized logical node within a wireless network infrastructure. For example, a CU might be embodied as a 5G/NR gNB Central Unit (gNB-CU), which is a logical node hosting RRC, SDAP and PDCP protocols of the gNB or RRC and PDCP protocols of the en-gNB that controls the operation of one or more gNB-DUs, and which terminates the F1 interface connected with one or more DUs (e.g., gNB-DUs) defined below.

As used herein, the terms "client device" or "user device" or "UE" include, but are not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, and vehicle infotainment systems or portions thereof.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "distributed unit" or "DU" refers without limitation to a distributed logical node within a wireless network infrastructure. For example, a DU might be embodied as a 5G/NR gNB Distributed Unit (gNB-DU), which is a logical node hosting RLC, MAC and PHY layers of the gNB or en-gNB, and its operation is partly controlled by gNB-CU (referenced above). One gNB-DU supports one or multiple cells, yet a given cell is supported by only one gNB-DU. The gNB-DU terminates the F1 interface connected with the gNB-CU.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" or "backend" refers generally to a networked system controlled by an operator (e.g., an MSO) that distributes programming to MSO clientele using client devices, or provides other services such as high-speed data delivery and backhaul.

As used herein, the terms "Internet" and "internet" are used interchangeably to refer to inter-networks including, without limitation, the Internet. Other common examples include but are not limited to: a network of external servers, "cloud" entities (such as memory or storage not local to a device, storage generally accessible at any time via a network connection, and the like), service nodes, access points, controller devices, client devices, etc.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "LTE" refers to, without limitation and as applicable, any of the variants or Releases of the Long-Term Evolution wireless communication standard, including LTE-U (Long Term Evolution in unlicensed spectrum), LTE-LAA (Long Term Evolution, Licensed Assisted Access), LTE-A (LTE Advanced), 4G LTE, WiMAX, VOLTE (Voice over LTE), and other wireless data standards.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), 3D memory, and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "MNO" or "mobile network operator" refer to a cellular, satellite phone, WMAN (e.g., 802.16), or other network service provider having infrastructure required to deliver services including without limitation voice and data over those mediums. The term "MNO" as used herein is further intended to include MVNOs, MNVAs, and MVNEs.

As used herein, the terms "network" and "bearer network" refer generally to any type of telecommunications or data network including, without limitation, hybrid fiber coax (HFC) networks, satellite networks, telco networks, and data networks (including MANS, WANS, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications technologies or networking protocols (e.g., SONET, DOCSIS, IEEE Std. 802.3, ATM, X.25, Frame Relay, 3GPP, 3GPP2, LTE/LTE-A/LTE-U/LTE-LAA, 5GNR, WAP, SIP, UDP, FTP, RTP/RTCP, H.323, etc.).

As used herein the terms "5G" and "New Radio (NR)" refer without limitation to apparatus, methods or systems compliant with 3GPP Release 15, and any modifications, subsequent Releases, or amendments or supplements thereto which are directed to New Radio technology, whether licensed or unlicensed.

As used herein, the term "QAM" refers to modulation schemes used for sending signals over e.g., cable or other networks. Such modulation scheme might use any constellation level (e.g. QPSK, 16-QAM, 64-QAM, 256-QAM, etc.) depending on details of a network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation and as applicable, any of the variants of IEEE Std. 802.11 or related standards including 802.11 a/b/g/n/s/v/ac/ax, 802.11-2012/2013 or 802.11-2016, as well as Wi-Fi Direct (including inter alia, the "Wi-Fi Peer-to-Peer (P2P) Specification", incorporated herein by reference in its entirety).

Overview

In one exemplary aspect, the present disclosure provides improved architectures, methods and apparatus for providing enhanced ultra-high data rate services which, inter alia, leverage existing managed network (e.g., cable network) infrastructure. The disclosed architectures enable a highly uniform user-experience regardless of the environment (e.g., indoor/outdoor/mobility), in which content is consumed and eliminates the need to distinguish between fixed-broadband and mobile-broadband, or the foregoing and IoT. These capabilities are provided in exemplary embodiments over a single coaxial cable drop to a premises, and via a single CPE chipset. In some variants, NSA operation (consistent with 3GPP Release 15 for 5G NR) is further advantageously supported.

It one exemplary embodiment, the aforementioned capabilities are provided via multiple parallel MIMO data streams supported by 3GPP 5G NR; specifically, these streams are shifted in frequency (such as via a transceiver node within the MSO infrastructure) before being injected into the single coaxial cable feeder, so that frequency diversity (instead of the spatial diversity associated with the separate data streams intended for respective wireless antenna elements) is leveraged to achieve the maximum total carrier bandwidth ostensibly enabled by incipient 3GPP 5G NR chipsets.

Also, since higher frequencies attenuate much more over the coaxial transmission media than lower frequencies, Intermediate Frequencies (IF) are transmitted over the media in one implementation, (i.e., instead of higher frequencies), and block-conversion to RF carrier frequency is employed subsequently in the enhanced consumer premises equipment (CPEe) for 3GPP band-compliant interoperability with the 3GPP 5G NR chipset in the disclosed enhanced CPE (CPEe).

The IF carriers injected by the transceiver node into the coaxial feeder can be received by multiple CPEe in parallel, via a shared feeder used as a common bus and having directional couplers and power dividers or taps. Point-to-Multipoint (PtMP) downstream transmissions from the transceiver node to the CPEe are achieved in one variant by scheduling payload for different CPEe on different 3GPP 5G NR physical resource blocks (PRBs) which are separated in frequency.

In one implementation, the majority of bandwidth available on the coaxial cable is used in Time Division Duplex (TDD) fashion to switch between downstream and upstream 5G NR communications. Upstream communications from the multiple CPEe to the transceiver node(s) can also occur simultaneously, such as over separate PRBs (using inter alia, frequency separation).

In order to support the aforementioned 4G/5G NSA configuration, a minor portion of the lower frequency spectrum is allocated to such functions in one embodiment of the architecture. Another minor portion of the lower frequency spectrum on the coaxial cable employs one-way communication in the downstream (DS) direction for the transmission of two digital synchronization channels, one for 5G and one for 4G, which are in one implementation I-Q multiplexed onto one QPSK analog synchronization channel from the transceiver node to the multiple inline amplifiers and any CPEe that may be sharing the coaxial bus.

Detailed Description of Exemplary Embodiments

Exemplary embodiments of the apparatus and methods of the present disclosure are now described in detail. While these exemplary embodiments are described in the context of the previously mentioned wireless access nodes (e.g., gNBs and eNBs) associated with or supported at least in part by a managed network of a service provider (e.g., MSO), other types of radio access technologies ("RATs"), other types of networks and architectures that are configured to deliver digital data (e.g., text, images, games, software applications, video and/or audio) may be used consistent with the present disclosure. Such other networks or architectures may be broadband, narrowband, or otherwise, the following therefore being merely exemplary in nature.

It will also be appreciated that while described generally in the context of a network providing service to a customer or consumer or end user or subscriber (i.e., within a prescribed service area, venue, or other type of premises), the present disclosure may be readily adapted to other types of environments including, e.g., commercial/retail, or enterprise domain (e.g., businesses), or even governmental uses. Yet other applications are possible.

Other features and advantages of the present disclosure will immediately be recognized by persons of ordinary skill in the art with reference to the attached drawings and detailed description of exemplary embodiments as given below.

Service Provider Network Architecture

Figure 4:
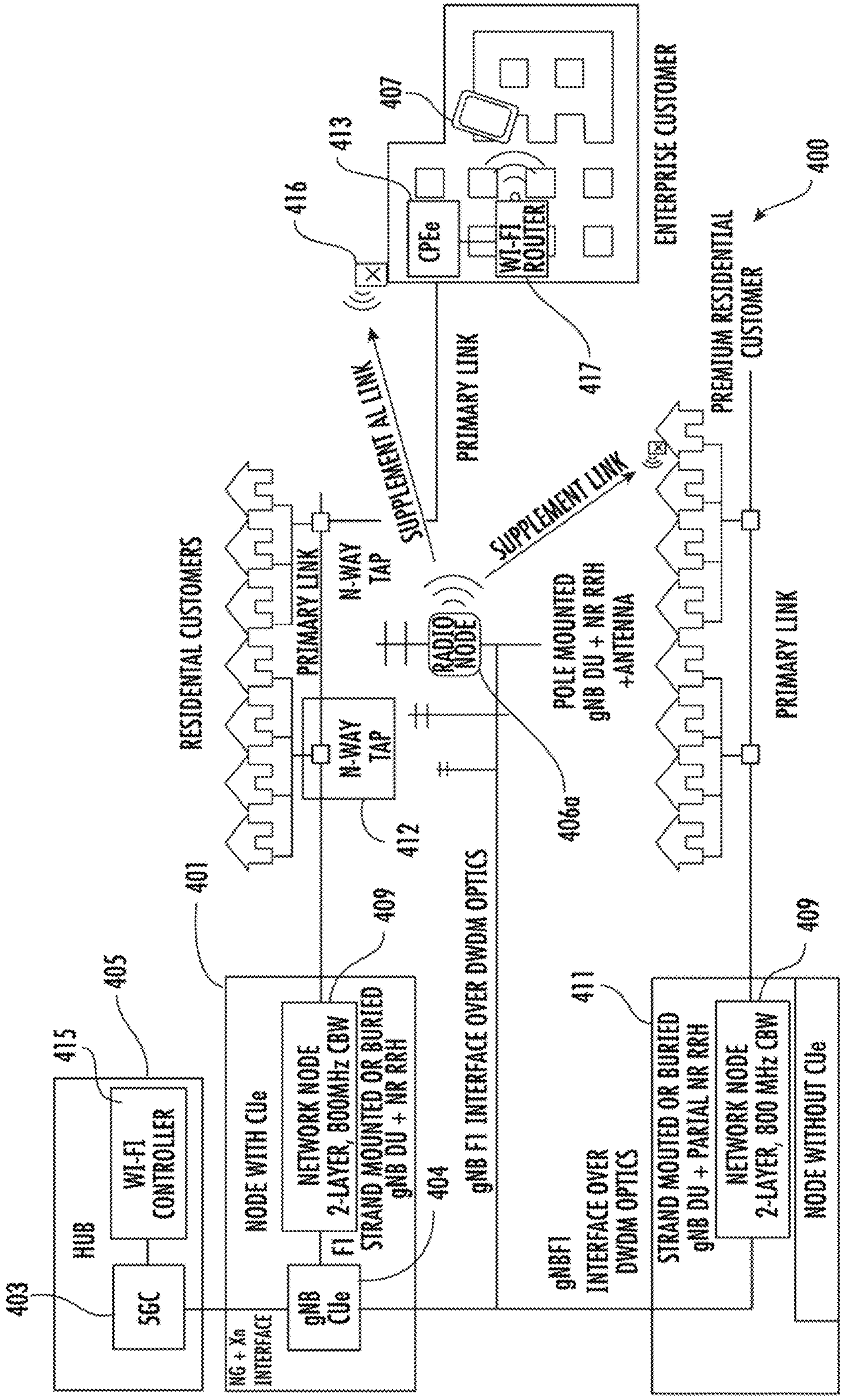
FIG. 4 is a functional block diagram of an exemplary MSO network architecture comprising various features described herein.

Referring now to FIG. 4, one embodiment of an enhanced service provider network architecture 400 is shown and described in detail.

As illustrated, the architecture 400 includes one or more hubs 405 within the MSO network (e.g., whether near edge portions of the network, or further towards the core), including a 5G NR core (5GC) 403. The hub 405 includes a WLAN controller process 415, and services one or more "enhanced" nodes 401, which each include a gNB CUe 404 and a network radio node 409, described in greater detail below. The nodes 401 utilize HFC infrastructure, including N-way taps 412 to deliver RF waveforms to the various served premises (including the enhanced CPE or CPEe) 413 and ultimately the user device(s) 407 (e.g., 3GPP-enabled UEs).

Also serviced by the node 401 are one or more non-CUe enabled nodes 411 including 4/4.5G/5G enabled network radio nodes 409, which service additional premises as shown.

In the illustrated embodiment, the nodes 401, 411 are backhauled by optical fiber, although this is merely illustrative, as other types of backhauls including e.g., high-bandwidth wireless may be used consistent with the present disclosure.

Similarly, one or more pole-mounted radio nodes 406*a* (and potentially other mobile client devices enabled for DU-type functionalities; e.g., authorized to receive data from another node or client device, and broadcast/receive signals according to the user domain frequency band) are backhauled to the MSO network via optical fiber (or other medium); these nodes 406 provide, inter alia, supplemental capacity/coverage for both indoor and outdoor (and mobility) scenarios as described in greater detail below.

In one exemplary embodiment, radio nodes 406*a* are located on an "edge" of a network (i.e., functioning as a network node proximate to the premises and away from the core), and are enabled for 4G and/or 5G communications as described in greater detail below. A given DU that provides 5G coverage to the premises thereby supplements the ultra-low latency and high-bandwidth services by the CUe 404. Moreover, as described further below, the CUe may be logically and functionally grouped with one or more DUes 406 to together make up a gNB. Prescribed unlicensed and/or licensed frequency bands are utilized by the nodes 406*a*. For example, in one implementation, the disclosed solution supports one or more prescribed subsets of NR and NR-U band combinations as defined by 3GPP, depending on the particular application(s) anticipated by the installation and the locale in which it is installed (including for example whether other operators or carriers such as MNOs are utilizing licensed spectrum within the prescribed area, and which frequency bands such operators are using). It will also be appreciated that so-called "quasi-licensed" spectrum (such as for instance that within the 3.55-3.70 GHz CBRS bands in the U.S.) may be utilized consistent with the methods and apparatus described herein.

In one variant, as noted above, mobile devices may function as intermediary nodes or transient "jumping points." Such devices may be those owned by subscribers of the hub or core providing the managed network services who have opted into (or not opted out) of use of their eligible devices as nodes. In other variants, devices owned by subscribers of a different core (e.g., managed by a different entity) may be included in the network of nodes. As an aside, such networking schemes are often generally referred to as "fog networking," a decentralized computing infrastructure in which data, computations, storage, and applications are distributed in an efficient manner between the data source and the destination (e.g., a "cloud" server, premises equipment, end user device) as opposed to a more highly centralized architecture.

A Wi-Fi router device 417 is also present in the served premises to provide WLAN coverage, in conjunction with the controller 415 at the hub 405. The centralized Wi-Fi controller 415 is also utilized in the exemplary architecture 400 for tight-interworking and better mobility between the 3GPP and Wi-Fi access technologies where the Wi-Fi router is either integrated with the consumer premises equipment (e.g., enhanced CPE or CPEe) or connected to it. In various embodiments, one or more intermediary nodes (e.g., radio node 406*a*) located between the CUe 404 and the served premises are utilized to provide additional coverage and bandwidth to the premises. Then, mobility between the 3GPP and Wi-Fi channels for any user can be triggered for the best data throughput, such as based on (i) estimation of the RF quality of the Wi-Fi channel toward the user, and/or (ii) the degree of congestion of the Wi-Fi router, and not just the Wi-Fi received signal strength indicators (RSSI) measured at the mobile device, the latter which may not be representative of the service quality that can be obtained by the user.

In the exemplary configuration, the controller (e.g., Wi-Fi Controller 415) is configured to choose the best (optimal) wireless connection available to it based on performance (as opposed to coverage/coverage area alone). Typically today, a preferred method of access is predetermined based on its received signal strength and/or as a preferred means (e.g. Wi-Fi could be defined as the preferred method of access to offload the mobile wireless network). However, this method suffers from the drawback of blind 'stickiness' to a technology, without considering the end user experience. Given that in exemplary embodiments of the architecture described herein, both Wi-Fi and licensed/unlicensed 3GPP access technologies are both controlled by the network operator (e.g.MSO), there is no need to prefer an access method, such as to purely to offload a user's traffic. The decision to offload or steer a user to a given access technology, can be based upon other criteria, such as e.g., a select set of Key Performance Indicators (KPIs) such as the user perceived latency, throughput, packet loss, jitter and bit/packet/frame error rates as measured in real-time at any given layer (e.g., L1, L2 or L3) by the network. For instance, in one implementation, once a target KPI threshold is triggered, the switching of the user can be triggered by either the AMF function (for 3GPP) or Wi-Fi Controller. This switching may then trigger a session establishment at the alternate access medium to transfer the user to that technology. This helps optimize QoE for connected users, since the controller will always be attempting to holistically optimize the connection versus merely making decisions based on coverage or signal strength alone.

This architecture also obviates the problematic transition between premises Wi-Fi and cellular, thereby enabling content consumption while the user is mobile, with no reduction in QoE or interruptions due to e.g., new session establishment in the cellular network. This is accomplished by, inter alia, communication between the Wi-Fi controller 415 and the CUe 404, such that the CUe can remain cognizant of both Wi-Fi and 3GPP channel status, performance and availability. Advantageously, in exemplary embodiments, the foregoing enhanced mobility is provided without the need for any module or customized application software or protocols of the user device (e.g., mobile UE), since all communication sessions (whether between the CPEe and the UE, or the supplemental radio access node and the UE) are both (i) controlled by a common system, and (ii) utilize extant 3GPP (e.g., 4/4.5G/5G) protocols and architectural elements. In one variant a GPRS Tunneling Protocol (GTP) is utilized for maintenance of session continuity between the heterogeneous RAN technologies (e.g., 3GPP and IEEE Std. 802.11). In another variant, a PMIP (Proxy Mobile IP) based approach is utilized for session maintenance/handover. In yet a further variant, techniques described in 3GPP TS 23.234 v13.1.0, "3GPP system to Wireless Local Area Network (WLAN) interworking; System description (Release 13)," incorporated herein by reference in its entirety, (aka "I-WLAN") based approach is utilized for these purposes. As will be appreciated by those of ordinary skill given the present disclosure, combinations of the foregoing mechanisms may be utilized as well, depending on the particular application (including the two heterogeneous technologies that are party to the session maintenance/handoff).

The MSO network architecture 400 of FIG. 4 is particularly useful for the delivery of packetized content (e.g., encoded digital content carried within a packet or frame structure or protocol) consistent with the various aspects of the present disclosure. In addition to on-demand and broadcast content (e.g., live video programming), the system of FIG. 4 may deliver Internet data and OTT (over-the-top) services to the end users (including those of the DUe's 406*a*) via the Internet protocol (IP) and TCP (i.e., over the 5G radio bearer), although other protocols and transport mechanisms of the type well known in the digital communication art may be substituted.

The architecture 400 of FIG. 4 further provides a consistent and seamless user experience with IPTV over both wireline and wireless interfaces. Additionally, in the IP paradigm, dynamic switching between unicast delivery and multicast/broadcast is used based on e.g., local demand. For instance, where a single user (device) is requesting content, an IP unicast can be utilized. For multiple devices (i.e., with multiple different IP addresses, such as e.g., different premises), multicast can be utilized. This approach provides for efficient and responsive switching of delivery and obviates other more equipment/CAPEX-intensive approaches.

Moreover, the architecture can be used for both broadband data delivery as well as "content" (e.g., movie channels) simultaneously, and obviates much of the prior separate infrastructure for "in band" and DOCSIS (and OOB) transport. Specifically, with DOCSIS (even FDX DOCSIS), bandwidth is often allocated for video QAMs, and a "split" is hard-coded for downstream and upstream data traffic. This hard split is typically implemented across all network elements—even amplifiers. In contrast, under the exemplary configuration of the architecture disclosed herein, effectively all traffic traversing the architecture is IP-based, and hence in many cases there is no need to allocate QAMs and frequency splits for different program or data streams. This "all-IP" approach enables flexible use of the available bandwidth on the transmission medium for all applications dynamically, based on for instance the demand of each such application at any given period or point in time.

In certain embodiments, the service provider network 400 also advantageously permits the aggregation and/or analysis of subscriber- or account-specific data (including inter alia, correlation of particular CUe or DUe or E-UTRAN eNB/femtocell devices associated with such subscriber or accounts) as part of the provision of services to users under the exemplary delivery models described herein. As but one example, device-specific IDs (e.g., gNB ID, Global gNB Identifier, NCGI, MAC address or the like) can be cross-correlated to MSO subscriber data maintained at e.g., the network head end(s) 407 so as to permit or at least facilitate, among other things, (i) user/device authentication to the MSO network; (ii) correlation of aspects of the area, premises or venue where service is provided to particular subscriber capabilities, demographics, or equipment locations, such as for delivery of location-specific or targeted content or advertising or 5G "slicing" configuration or delivery; and (iii) determination of subscription level, and hence subscriber privileges and access to certain services as applicable.

Moreover, device profiles for particular devices (e.g., 3GPP 5 g NR and WLAN-enabled UE, or the CPEe 413 and any associated antenna 416, etc.) can be maintained by the MSO, such that the MSO (or its automated proxy processes) can model the device for wireless or other capabilities. For instance, one (non-supplemented) CPEe 413 may be modeled as having bandwidth capability of X Gbps, while another premises' supplemented CPEe may be modeled as having bandwidth capability of X+Y Gbps, and hence the latter may be eligible for services or "slices" that are not available to the former.

As a brief aside, the 5G technology defines a number of network functions (NFs), which include the following:

1. Access and Mobility Management function (AMF)—Provides for termination of NAS signaling, NAS integrity protection and ciphering, registration and connection and mobility management, access authentication and authorization, and security context management. The AMF has functions analogous to part of the MME functionality of the prior Evolved Packet Core (EPC).

2. Application Function (AF)—Manages application influence on traffic routing, accessing NEF, interaction with policy framework for policy control. The NR AF is comparable to the AF in EPC.
3. Authentication Server Function (AUSF)—Provides authentication server functionality. The AUSF is similar to portions of the HSS from EPC.
4. Network Exposure function (NEF)—Manages exposure of capabilities and events, secure provision of information from external applications to 3GPP network, translation of internal/external information. The NEF is a wholly new entity as compared to EPC.
5. Network Slice Selection Function (NSSF)—Provides for selection of the Network Slice instances to serve the UE, determining the allowed NSSAI, determining the AMF set to be used to serve the UE. The NSSF is a wholly new entity as compared to EPC.
6. NF Repository function (NRF)—Supports the service discovery function, maintains NF profile and available NF instances The NRF is a wholly new entity as compared to EPC.
7. Policy Control Function (PCF)—Provides a unified policy framework, providing policy rules to CP functions, and access subscription information for policy decisions in UDR. The PCF has part of the PCRF functionality from EPC.
8. Session Management function (SMF)—Provides for session management (session establishment, modification, release), IP address allocation & management for UEs, DHCP functions, termination of NAS signaling related to session management, DL data notification, traffic steering configuration for UPF for proper traffic routing. The SMF includes portions of the MME and PGW functionality from EPC.
9. Unified Data Management (UDM)—Supports generation of Authentication and Key Agreement (AKA) credentials, user identification handling, access authorization, subscription management. This comprises a portion of HSS functionality from EPC.
10. User plane function (UPF)—The UPF provides packet routing & forwarding, packet inspection, QoS handling, and also acts as an external PDU session point of interconnect to Data Network (DN). The UPF may also act as an anchor point for intra-RAT and inter-RAT mobility. The UPF includes some of the prior SGW and PGW functionality from EPC.

Within the 5G NR architecture, the control plane (CP) and user plane (UP) functionality is divided within the core network or NGC (Next Generation Core). For instance, the 5G UPF discussed above supports UP data processing, while other nodes support CP functions. This divided approach advantageously allows for, inter alia, independent scaling of CP and UP functions. Additionally, network slices can be tailored to support different services, such as for instance those described herein with respect to session handover between e.g., WLAN and 3GPP NR, and supplemental links to the CPEe.

In addition to the NFs described above, a number of different identifiers are used in the NG-RAN architecture, including those of UE's and for other network entities, and may be assigned to various entities described herein. Specifically:

- the AMF Identifier (AMF ID) is used to identify an AMF (Access and Mobility Management Function);
- the NR Cell Global Identifier (NCGI), is used to identify NR cells globally, and is constructed from the PLMN identity to which the cell belongs, and the NR Cell Identity (NCI) of the cell;
- the gNB Identifier (gNB ID) is used to identify gNBs within a PLMN, and is contained within the NCI of its cells;
- the Global gNB ID, which is used to identify gNBs globally, and is constructed from the PLMN identity to which the gNB belongs, and the gNB ID;
- the Tracking Area identity (TAI), which is used to identify tracking areas, and is constructed from the PLMN identity to which the tracking area belongs, and the TAC (Tracking Area Code) of the Tracking Area; and
- the Single Network Slice Selection Assistance information (S-NSSAI), which is used to identify a network slice.

Hence, depending on what data is useful to the MSO or its customers, various portions of the foregoing can be associated and stored to particular gNB "clients" or their components being backhauled by the MSO network.

Distributed gNB Architectures

In the context of FIG. 4, the DUe's described herein may assume any number of forms and functions relative to the enhanced CPE (CPEe) 413 and the radio node 406*a* (e.g., pole mounted external device). Recognizing that generally speaking, "DU" and "CU" refer to 3GPP standardized features and functions, these features and functions can, so long as supported in the architecture 400 of FIG. 4, be implemented in any myriad number of ways and/or locations. Moreover, enhancements and/or extensions to these components (herein referred to as CUe and DUe) and their functions provided by the present disclosure may likewise be distributed at various nodes and locations throughout the architecture 400, the illustrated locations and dispositions being merely exemplary.

Notably, the "enhanced" NR-based gNB architecture utilizes existing infrastructure (e.g., at least a portion of the extant HFC cabling controlled by an MSO such as the Assignee hereof) while expanding the frequency spectrum used for signal propagation within the infrastructure (e.g., 1.6 GHz in total bandwidth). Moreover, access points or nodes installed at venues or premises, especially "edge"-based nodes (at least some of which may be controlled, licensed, installed, or leased by the MSO), may be leveraged to deliver 5G-based services to a subscriber of the 5G NR Core (e.g., 403). Fog-based networking made possible through this leveraged infrastructure allows the subscriber to access receive and maintain 5G service whether indoor or outdoor, and in fact, even while the subscriber is changing locations, e.g., moving indoor to outdoor, outdoor to indoor, between servicing nodes indoors (e.g., within a large house, office or housing complex, or venue), and between servicing nodes outdoors. Other nodes may be leveraged, including other 5G-enabled mobile devices that have opted into (or not opted out of) participating in the fog network. In effect, the ubiquity of mobile devices creates a peer-to-peer network for distribution and delivery of ultra-low-latency (e.g., 1 ms ping) and ultra-high-speed (e.g., 10 Gbps or higher) connectivity. In many cases, utilizing one or more participating peer devices results in faster service (e.g., greatly reduced ping) by obviating the need to reach a cell tower, a server, or a gateway that is resident in the backend portion of a cloud-type network.

Notably, the principles described further below enable a subscriber to maintain the 5G service (or any other 3GPP- or IEEE 802.11-based connectivity) without the signals dropping or disconnecting between sessions. In other words, "seamless" transfer of connectivity between nodes (akin to handovers) is made possible despite a difference in at least a portion of wireless data communications standards that may be utilized by the nodes. For instance, a CPEe and a DUe disposed near the "edge" of the network (i.e., near consumer premises) may each be capable of communicating data with, e.g., a mobile user device, via either or both 3GPP- and IEEE 802.11-based protocols. A subscriber, however, would not require a reconnection process with a different base station or modem (as opposed to, e.g., establishing connection to cellular data services when outside the range of a Wi-Fi AP, or connecting back to the Wi-Fi AP when entering the premises), invoking a "seamless" feel and further increasing the user experience.

By virtue of the way the frequency spectra used in existing infrastructure is accessed, such enhanced gNB architecture provides salient advantages to a subscriber thereof, such as improved connectivity speeds (e.g., data rates, response times, latency) and seamless mobility of user devices as noted above and described further below, thus significantly improving user experience relative to currently available services. Further, the operator of such an architecture may advantageously save costs of connecting new cables and pipes across long distances by obviating the need to overhaul the infrastructure itself.

Figure 5A:
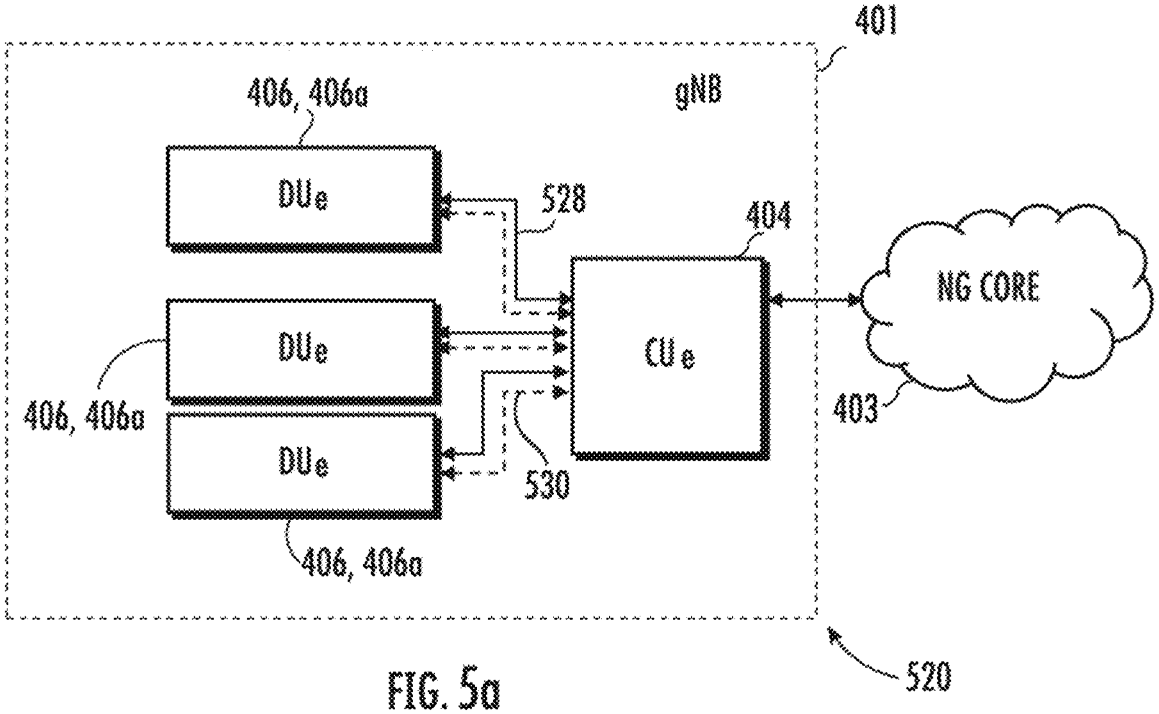
FIG. 5*a* is a functional block diagram of one exemplary embodiment of a gNB architecture including CUe and multiple DUes in standalone (SA) configuration, according to the present disclosure.

Accordingly, referring now to FIGS. 5*a*-5*f*, various embodiments of the distributed (CUe/DUe) gNB architecture according to the present disclosure are described. As shown in FIG. 5*a*, a first architecture 520 includes a gNB 401 having an enhanced CU (CUe) 404 and a plurality of enhanced DUs (DUe) 406, 406*a*. As described in greater detail subsequently herein, these enhanced entities are enabled to permit inter-process signaling and high data rate, low latency services, whether autonomously or under control of another logical entity (such as the NG Core 403 with which the gNB communicates, or components thereof), as well as unified mobility and IT services.

The individual DUe's 406, 406*a* in FIG. 5*a* communicate data and messaging with the CUe 4044 via interposed physical communication interfaces 528 and logical interfaces 530. As previously described, such interfaces may include a user plane and control plane, and be embodied in prescribed protocols such as FIAP. Operation of each DUe and CUe are described in greater detail subsequently herein; however, it will be noted that in this embodiment, one CUe 404 is associated with one or more DUe's 406, 406*a*, yet a given DUe is only associated with a single CUe. Likewise, the single CUe 404 is communicative with a single NG Core 403, such as that operated by an MSO. Each NG Core may have multiple gNBs 401 associated therewith (e.g., of the type shown in FIG. 4).

Figure 5B:
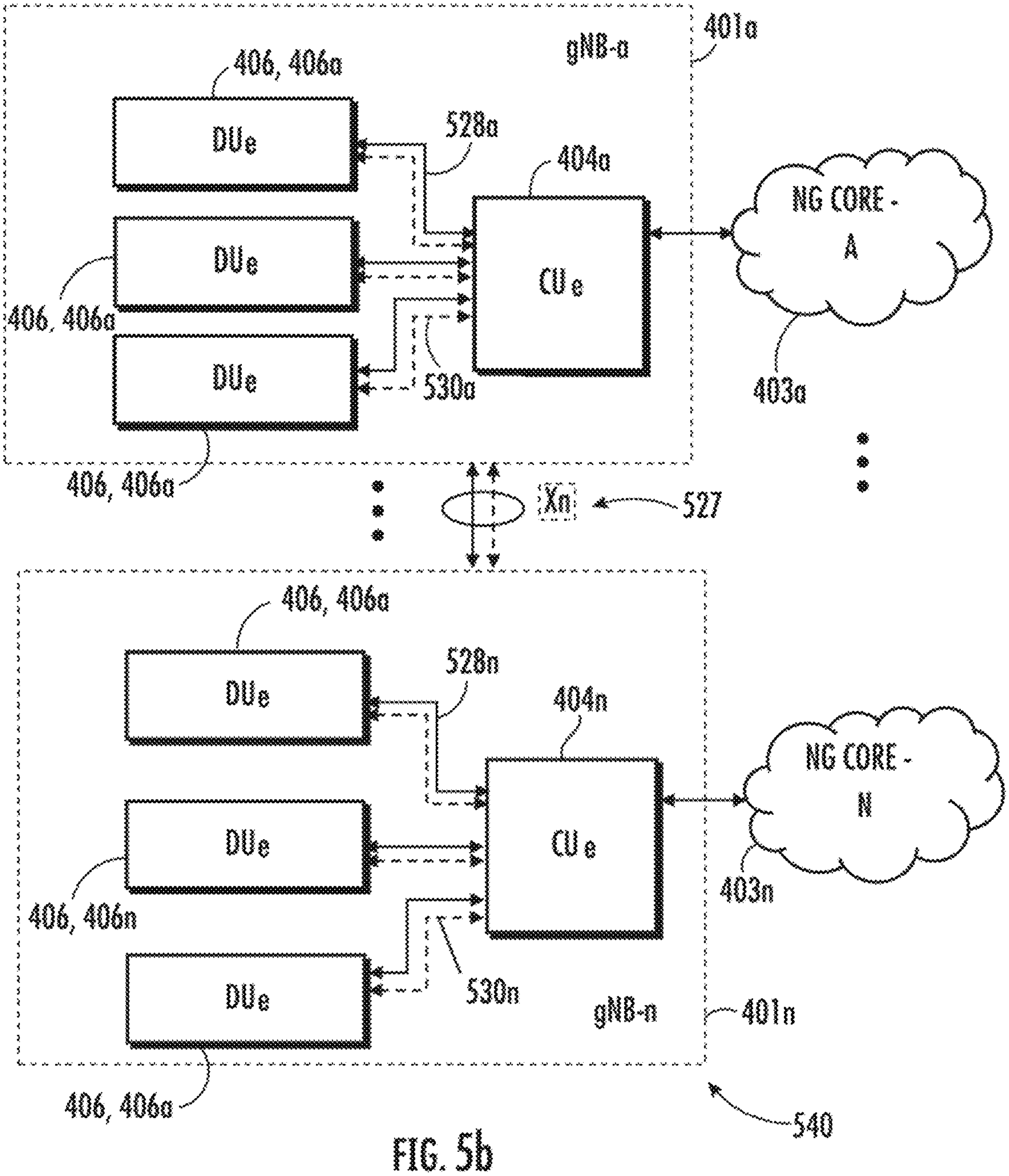
FIG. 5*b* is a functional block diagram of another exemplary embodiment of a gNB architecture including multiple CUes and multiple corresponding DUes (SA), according to the present disclosure.

In the architecture 540 of FIG. 5*b*, two or more gNBs 401*a*-*n* are communicative with one another via e.g., an Xn interface 527, and accordingly can conduct at least CUe to CUe data transfer and communication. Separate NG Cores 403*a*-*n* are used for control and user plane (and other) functions of the network.

Figure 5C:
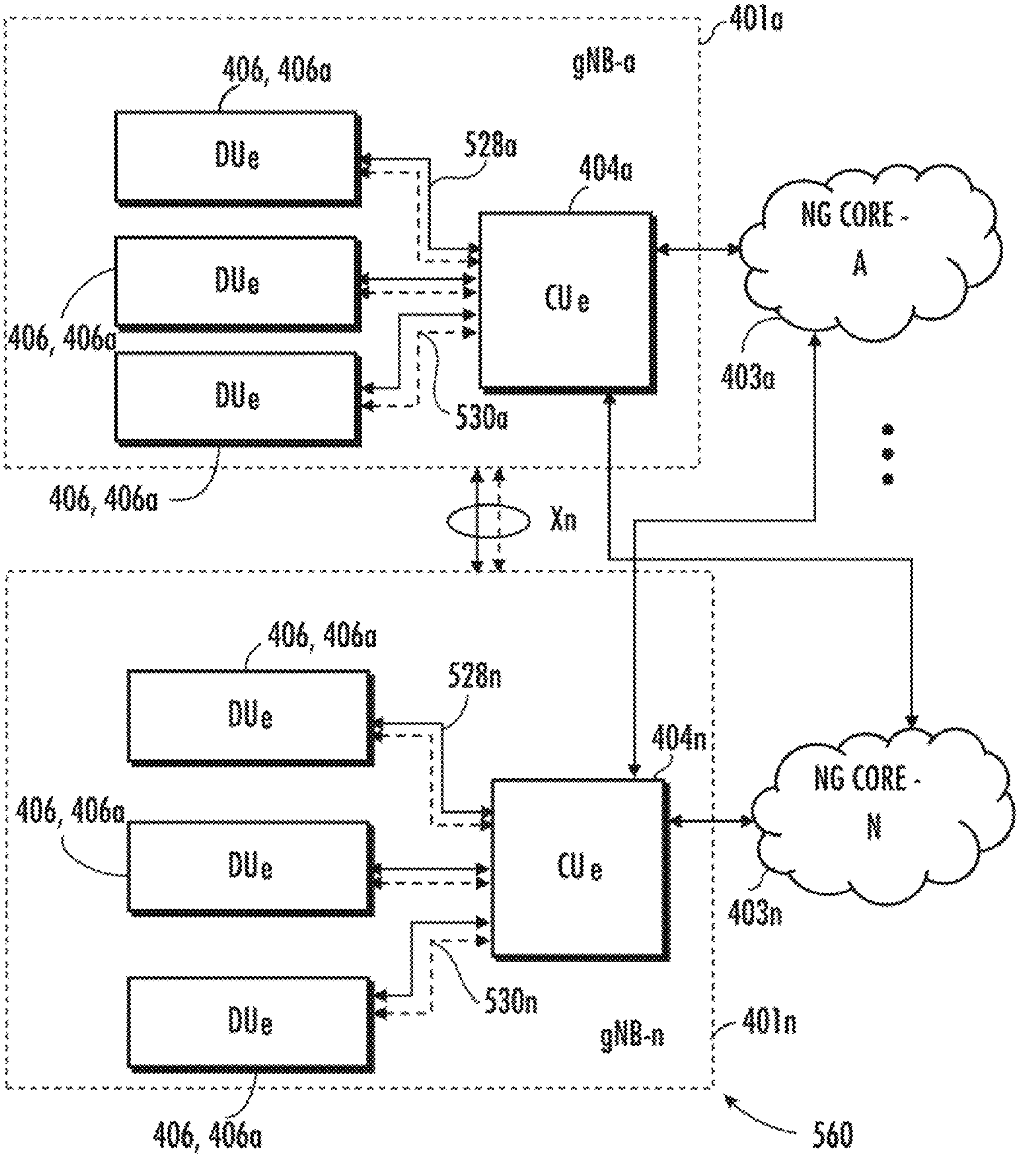
FIG. 5*c* is a functional block diagram of yet another exemplary embodiment of a gNB architecture including multiple CUes logically cross-connected to multiple different cores (SA), according to the present disclosure.

In the architecture 560 of FIG. 5*c*, two or more gNBs 401*a*-*n* are communicative with one another via e.g., the Xn interface 527, and accordingly can conduct at least CUe to CUe data transfer and communication. Moreover, the separate NG Cores 403*a*-*n* are logically "cross-connected" to the gNBs 401 of one or more other NG Cores, such that one core can utilize/control the infrastructure of another, and vice versa. This may be in "daisy chain" fashion (i.e., one gNB is communicative one other NG Core other than its own, and that NG Core is communicate with yet one additional gNB 401 other than its own, and so forth), or the gNBs and NG Cores may form a "mesh" topology where multiple Cores 403 are in communication with multiple gNBs or multiple different entities (e.g., service providers). Yet other topologies will be recognized by those of ordinary skill given the present disclosure. This cross-connection approach advantageously allows for, inter alia, sharing of infrastructure between two MSOs, or between MNO and MSO, which is especially useful in e.g., dense deployment environments which may not be able to support multiple sets of RAN infrastructure, such as for different service providers.

Figure 5D:
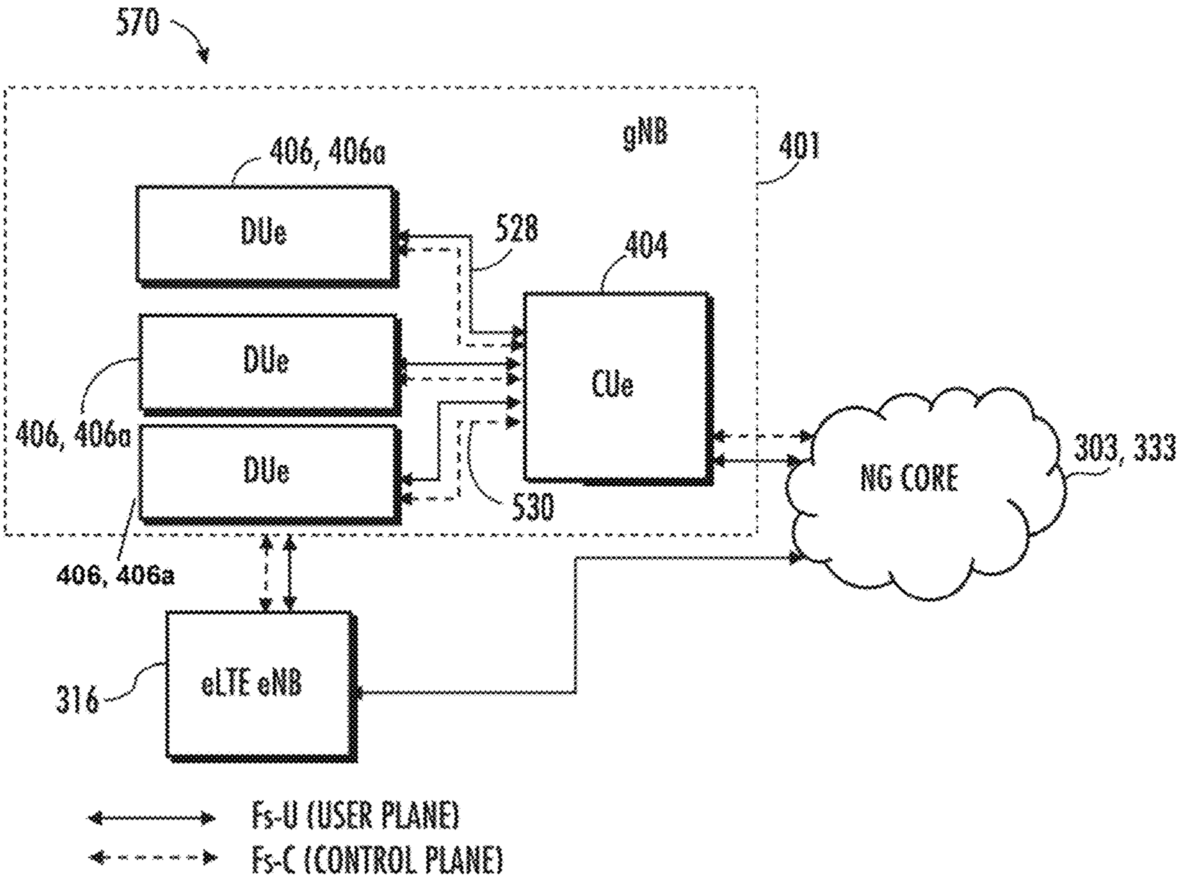
FIG. 5*d* is a functional block diagram of an NSA gNB and eLTE eNB architecture including a 5G NR Core (NGC) according to the present disclosure.
Figure 5E:
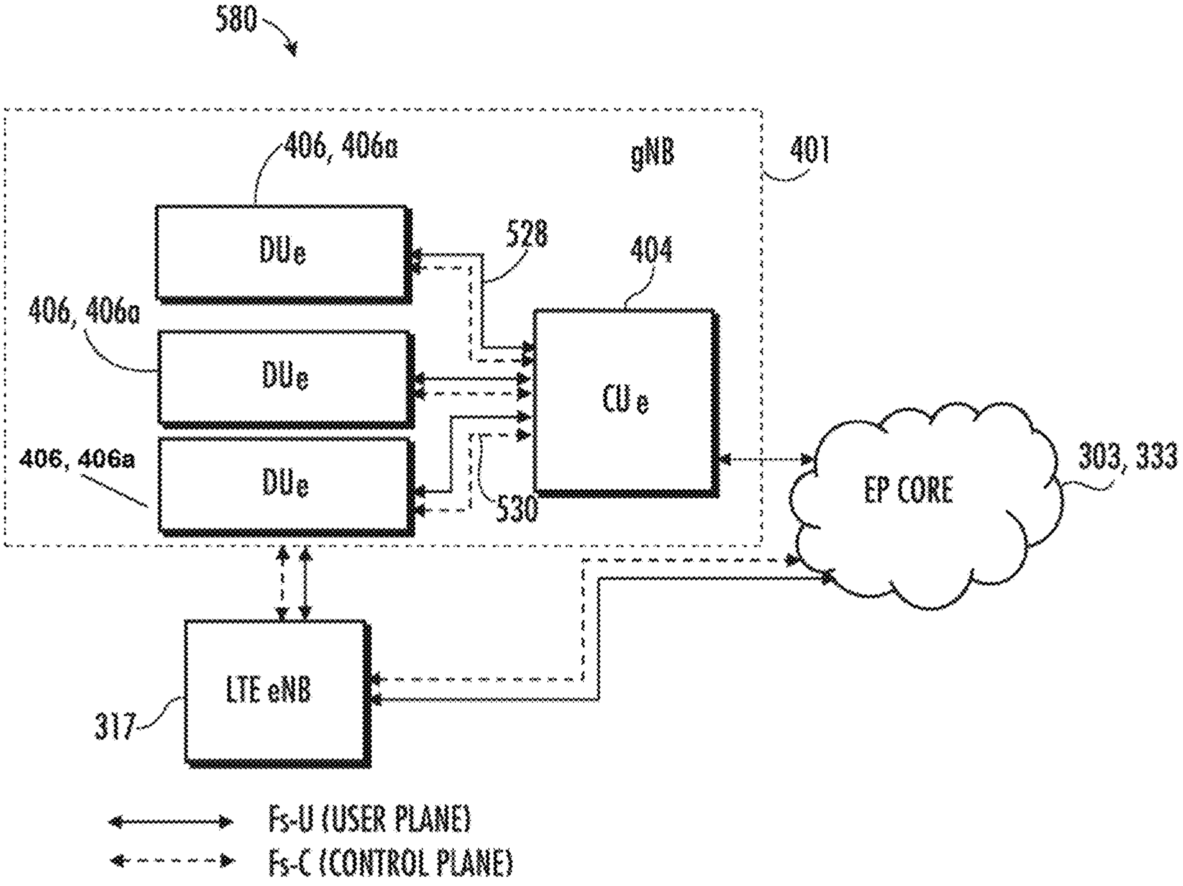
FIG. 5*e* is a functional block diagram of an NSA gNB and LTE eNB architecture including an Evolved Packet Core (EPC) according to the present disclosure.
Figure 5F:
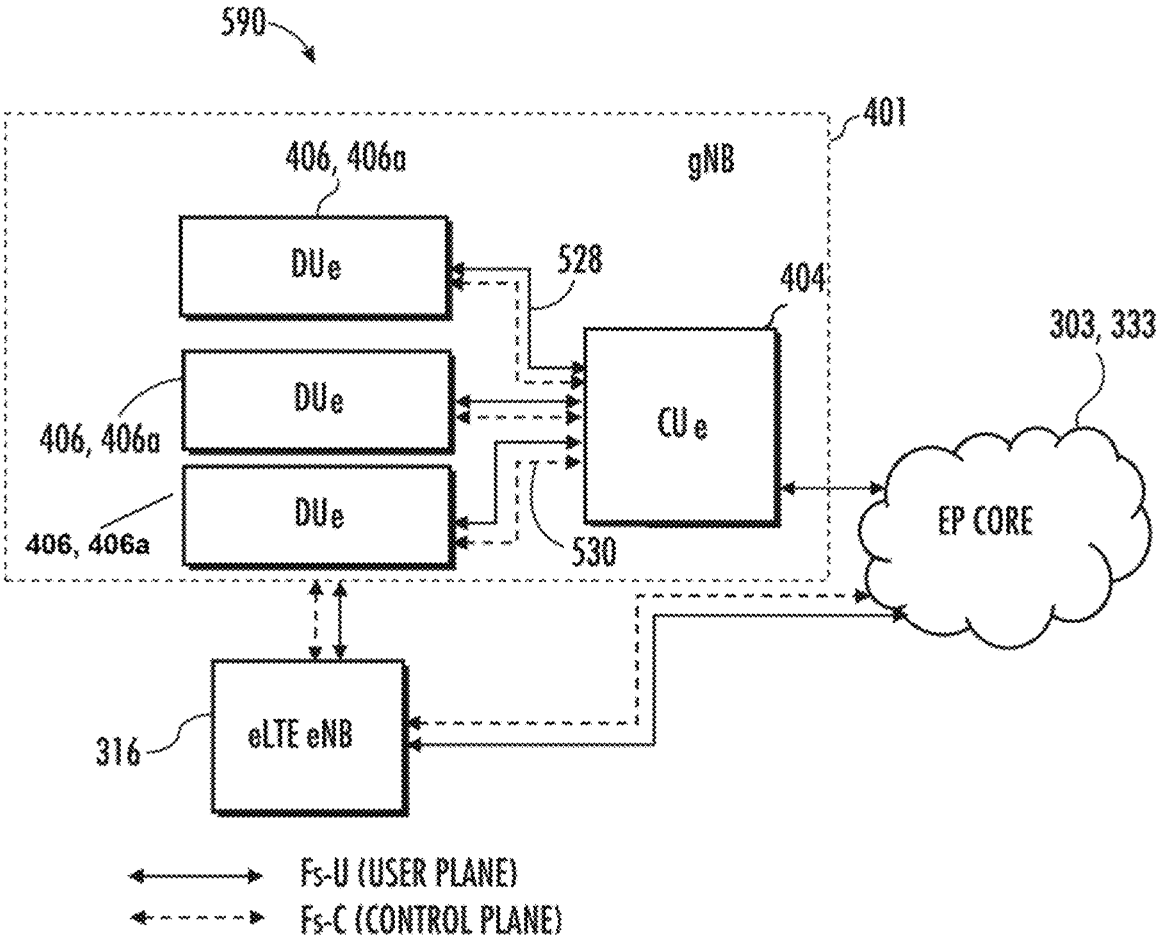
FIG. 5*f* is a functional block diagram of an NSA gNB and eLTE eNB architecture including an Evolved Packet Core (EPC) according to the present disclosure.

FIGS. 5*d*-5*f* relate to so-called NSA architectures contemplated during, inter alia, migration or transition between 4G/4.5G and 5G technology. Note that per 3GPP Release 15, some new definitions of entities have been introduced, including: (i) LTE eNB—An eNB device that can connect to the EPC and the extant pre-Release 15 LTE core network; (ii) eLTE eNB—An evolution of the LTE eNB—the eLTE eNB can connect to the EPC and the 5GC; (iii) NG—A data interface between the NGC and the gNB; (iv) NG21A control plane (CP) interface between core network and the RAN (corresponding to S1-C in LTE); and (v) NG3—A user plane (UP) interface between the core network and the RAN (corresponding to S1-U in LTE).

In a "standalone" or SA scenario (e.g., FIGS. 5*a*-5*c* above), the 5G NR or the evolved LTE radio cells and the core network are operated alone, and are used for both control plane and user plane. The SA configuration is more simplified than NSA from an operational and management standpoint. Moreover, pure SA networks can operate independently using normal inter-generation handover between 4G and 5G for service continuity. Three variations of SA are defined in 3GPP: (i) Option 1 using EPC and LTE eNB access (i.e. as per current 4G LTE networks); (ii) Option 2 using 5GC and NR gNB access; and (iii) Option 5 using 5GC and LTE ng-eNB access.

Figure 3A:
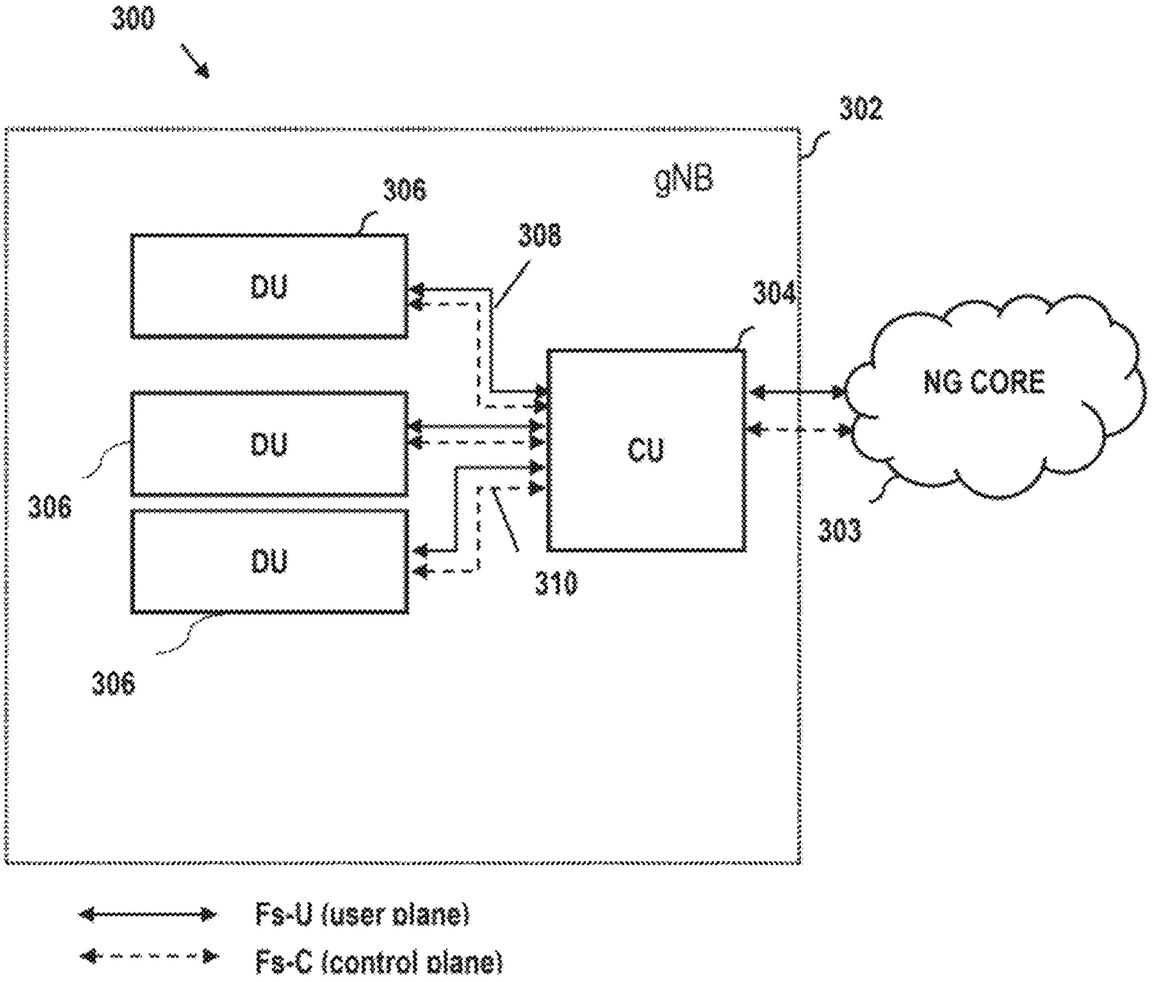
FIG. 3a (Prior Art)
FIG. 3*a* is a functional block diagram of a prior art gNB architecture including CU and multiple DUs.
Figure 3B:
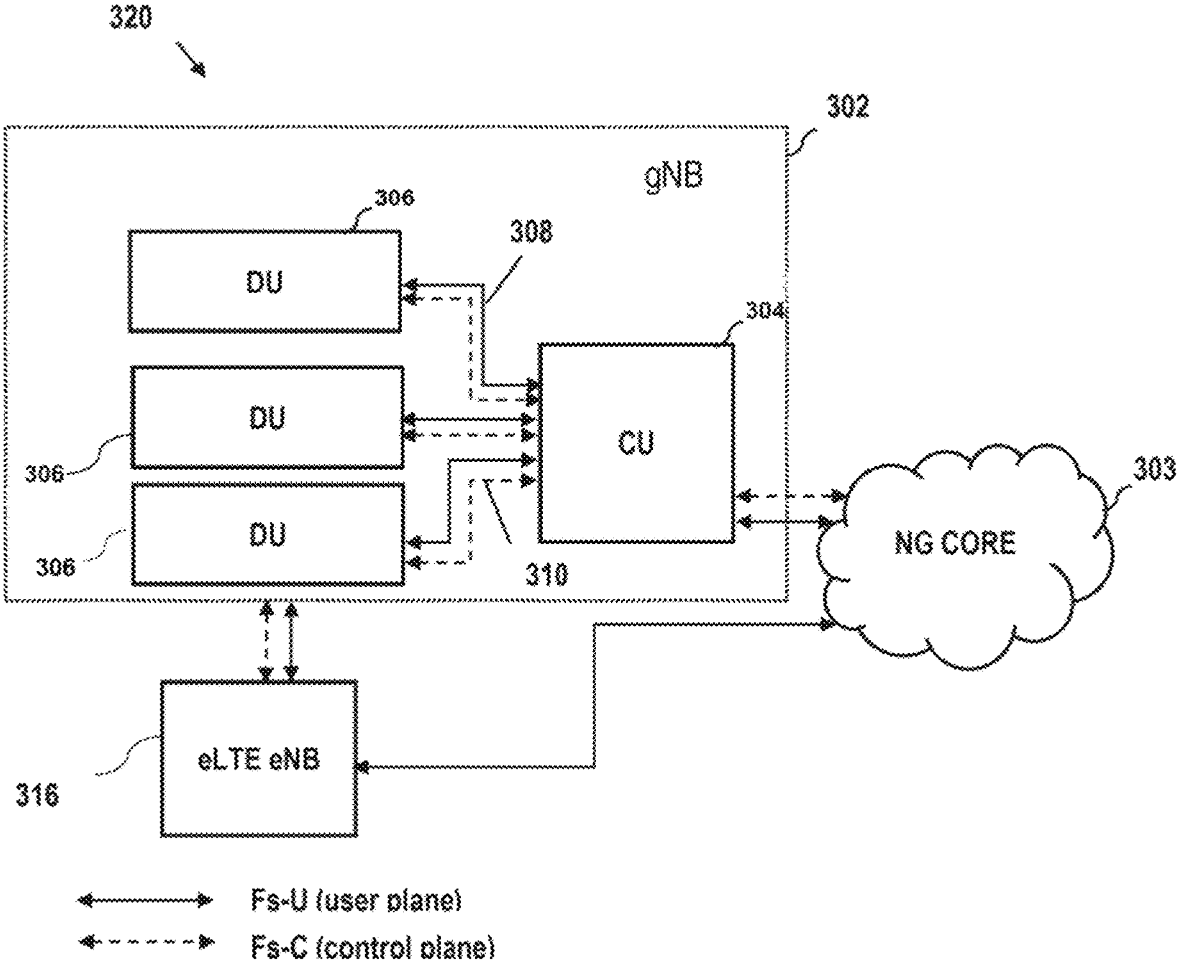
FIG. 3b (Prior Art)
FIG. 3*b* is a functional block diagram of a prior art NSA gNB and eLTE eNB architecture including a 5G NR Core (NGC).
Figure 3C:
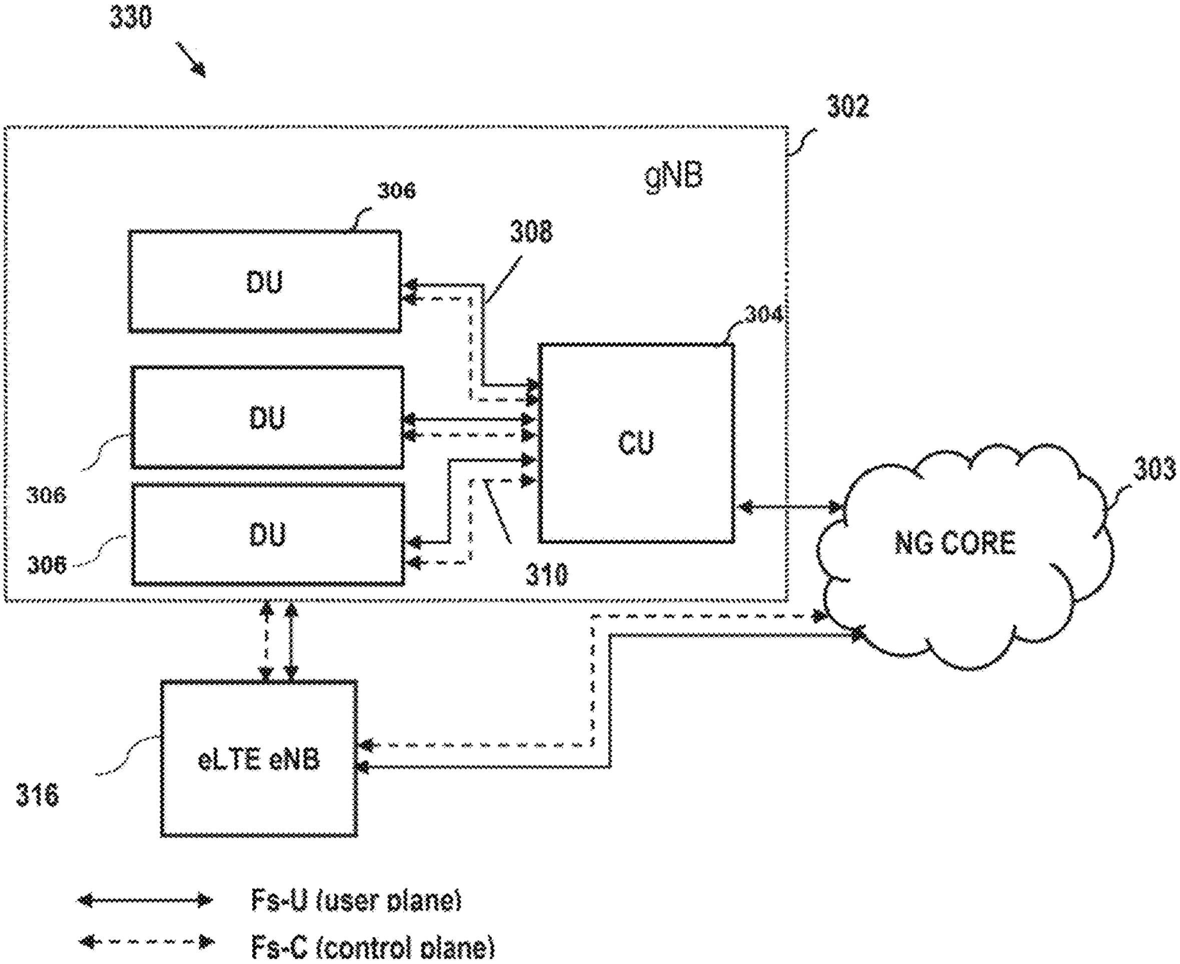
FIG. 3c (Prior Art)
FIG. 3*c* is a functional block diagram of another prior art NSA gNB and eLTE eNB architecture including a 5G NR Core (NGC).
Figure 3D:
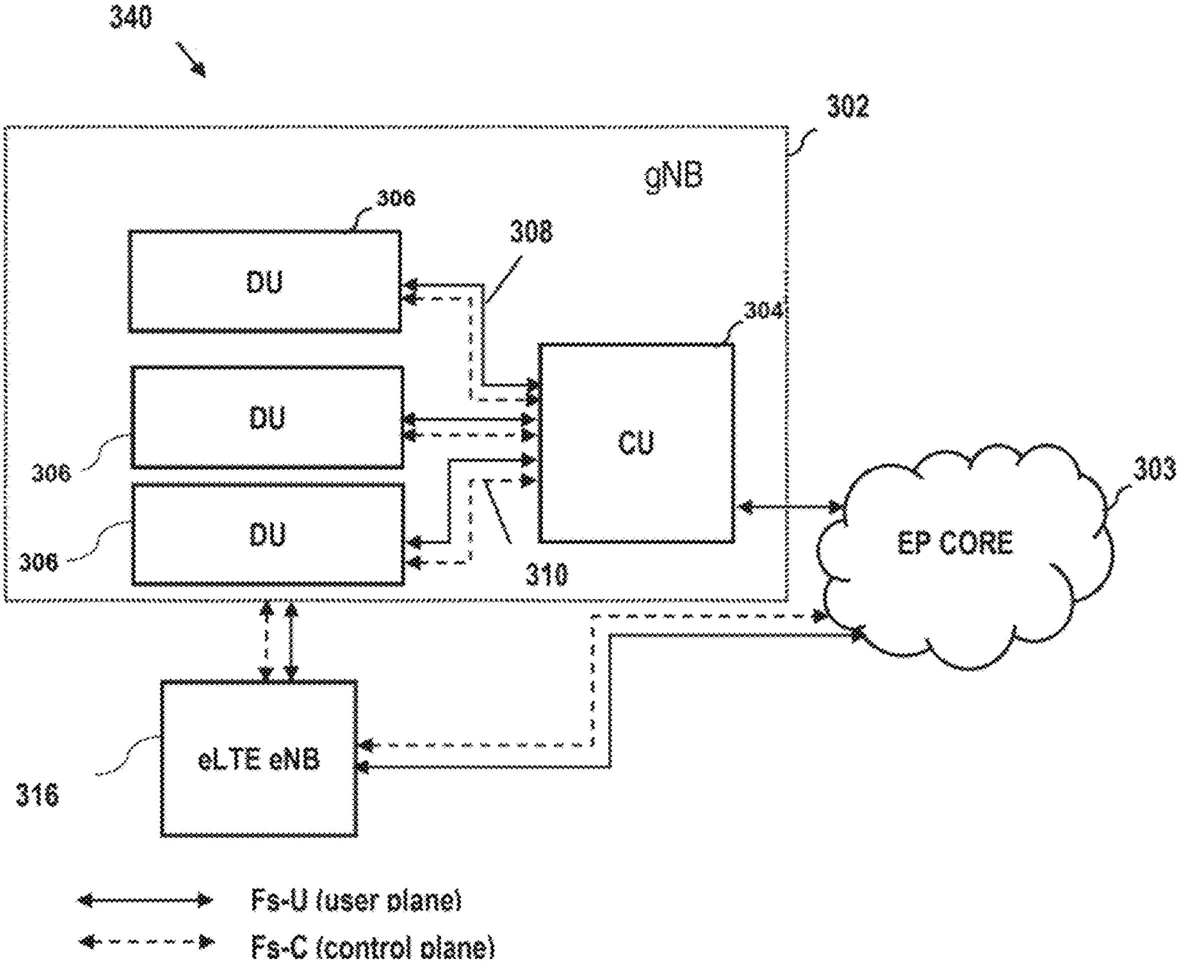
FIG. 3d (Prior Art)
FIG. 3*d* is a functional block diagram of another prior art NSA gNB and eLTE eNB architecture including an Evolved Packet Core (EPC).

As previously described with respect to FIGS. 3*b*-3*d*, in non-standalone (NSA) scenarios, the NR radio cells are effectively integrated or combined with LTE radio cells using dual connectivity to provide radio access. In the case of NSA, the radio network core network may be either EPC or 5GC, depending on the particular choice of the operator.

FIG. 5*d* illustrates an NSA gNB and eLTE eNB architecture including a 5G NR Core (NGC) according to the present disclosure. In this architecture 570, the NG Core 403 communicates with the gNB 401 with CUe and DUe's, as well as supporting an eLTE eNB 316 for the user plane. Control plane functions for the eLTE eNB are supported by the gNB 401.

FIG. 5*e* illustrates an NSA gNB and LTE eNB architecture including an Evolved Packet Core (EPC) according to the present disclosure. In this architecture 580, an EPC (EP Core) 303, 333 communicates with the gNB 401 with CUe and DUe's for user plane function, as well as supporting an LTE eNB 317 (i.e., an non-5G communicative NodeB) for the user plane and control plane.

FIG. 5*f* illustrates an NSA gNB and eLTE eNB architecture including an Evolved Packet Core (EPC) according to the present disclosure. In this architecture 590, an EPC (EP Core) 303, 333 communicates with the gNB 401 with CUe and DUe's for user plane function, as well as supporting an eLTE eNB 316 (i.e., a 5G communicative NodeB) for the user plane and control plane.

It will also be appreciated that while described primarily with respect to a unitary gNB-CUe entity or device 401 as shown in FIGS. 5-5*f*, the present disclosure is in no way limited to such architectures. For example, the techniques described herein may be implemented as part of a distributed or dis-aggregated or distributed CUe entity (e.g., one wherein the user plane and control plane functions of the CUe are dis-aggregated or distributed across two or more entities such as a CUe-C (control) and CUe-U (user)), and/or other functional divisions are employed, including in NSA-based architectures.

It is also noted that heterogeneous architectures of eNBs or femtocells (i.e., E-UTRAN LTE/LTE-A Node B's or base stations, including eLTE eNBs 316) and gNBs may be utilized consistent with the architectures of FIGS. 5-5*f*. For instance, a given DUe may (in addition to supporting node operations as discussed in greater detail with respect to FIGS. 7-7*a* below), act (i) solely as a DUe (i.e., 5G NR PHY node) and operate outside of an E-UTRAN macrocell, or (ii) be physically co-located with an eNB or femtocell and provide NR coverage within a portion of the eNB macrocell coverage area, or (iii) be physically non-colocated with the eNB or femtocell, but still provide NR coverage within the macrocell coverage area.

In accordance with the 5G NR model, the DUe(s) 406, 406*a* comprise logical nodes that each may include varying subsets of the gNB functions, depending on the functional split option. DUe operation is controlled by the CUe 404 (and ultimately for some functions by the NG Core 303). Split options between the DUe and CUe in the present disclosure may include for example:

Option 1 (RRC/PCDP split)
Option 2 (PDCP/RLC split)
Option 3 (Intra RLC split)
Option 4 (RLC-MAC split)
Option 5 (Intra MAC split)
Option 6 (MAC-PHY split)
Option 7 (Intra PHY split)
Option 8 (PHY-RF split)

Under Option 1 (RRC/PDCP split), the RRC (radio resource control) is in the CUe while PDCP (packet data convergence protocol), RLC (radio link control), MAC, physical layer (PHY) and RF are kept in the DUe, thereby maintaining the entire user plane in the distributed unit.

Under Option 2 (PDCP/RLC split), there are two possible variants: (i) RRC, PDCP maintained in the CUe, while RLC, MAC, physical layer and RF are in the DU(s); and (ii) RRC, PDCP in the CUe (with split user plane and control plane stacks), and RLC, MAC, physical layer and RF in the DUe's.

Under Option 3 (Intra RLC Split), two splits are possible: (i) split based on ARQ; and (ii) split based on TX RLC and RX RLC.

Under Option 4 (RLC-MAC split), RRC, PDCP, and RLC are maintained in the CUe 404, while MAC, physical layer, and RF are maintained in the DUe's.

Under Option 5 (Intra-MAC split), RF, physical layer and lower part of the MAC layer (Low-MAC) are in the DUe's 406, 406*a*, while the higher part of the MAC layer (High-MAC), RLC and PDCP are in the CUe 404.

Under Option 6 (MAC-PHY split), the MAC and upper layers are in the CUe, while the PHY layer and RF are in the DUe's. The interface between the CUe and DUe's carries data, configuration, and scheduling-related information (e.g. Modulation and Coding Scheme or MCS, layer mapping, beamforming and antenna configuration, radio and resource block allocation, etc.) as well as measurements.

Under Option 7 (Intra-PHY split), different sub-options for UL (uplink) and DL downlink) may occur independently. For example, in the UL, FFT (Fast Fourier Transform) and CP removal may reside in the DUe's, while remaining functions reside in the CUe 404. In the DL, iFFT and CP addition may reside in the DUe, while the remainder of the PHY resides in the CUe.

Finally, under Option 8 (PHY-RF split), the RF and the PHY layer may be separated to, inter alia, permit the centralization of processes at all protocol layer levels, resulting in a high degree of coordination of the RAN. This allows optimized support of functions such as COMP, MIMO, load balancing, and mobility.

Generally speaking, the foregoing split options are intended to enable flexible hardware implementations which allow scalable cost-effective solutions, as well as coordination for e.g., performance features, load management, and real-time performance optimization. Moreover configurable functional splits enable dynamic adaptation to various use cases and operational scenarios. Factors considered in determining how/when to implement such options can include: (i) QOS requirements for offered services (e.g. low latency to support 5G RAN requirements, high throughput); (ii) support of requirements for user density and load demand per given geographical area (which may affect RAN coordination); (iii) availability of transport and backhaul networks with different performance levels; (iv) application type (e.g. real-time or non-real time); (v) feature requirements at the Radio Network level (e.g. Carrier Aggregation).

It is also noted that the "DU" functionality referenced in the various split options above can itself be split across the DUe and its downstream components, such as the RF stages of the node 409 (see FIGS. 7 and 7*a*) and/or the CPEe 413. As such, the present disclosure contemplates embodiments where some of the functionality typically found within the DUe may be distributed to the node/CPEe.

It will further be recognized that user-plane data/traffic may also be routed and delivered apart from the CUe. In one implementation (described above), the CUe hosts both the RRC (control-plane) and PDCP (user-plane); however, as but one alternate embodiment, a so-called "dis-aggregated" CUe may be utilized, wherein a CUe-CP entity (i.e., CUe—control plane) hosts only the RRC related functions, and a CUe-UP (CUe—user plane) which is configured to host only PDCP/SDAP (user-plane) functions. The CUe-CP and CUe-UP entities can, in one variant, interface data and inter-process communications via an E1 data interface, although other approaches for communication may be used.

It will also be appreciated that the CUe-CP and CUe-UP may be controlled and/or operated by different entities, such as where one service provider or network operator maintains cognizance/control over the CUe-UP, and another over the CUe-CP, and the operations of the two coordinated according to one or more prescribed operational or service policies or rules.

Referring again to FIG. 4, the exemplary embodiment of the DUe 409 is a strand-mounted or buried DUe (along with the downstream radio chain(s), the latter which may include one or more partial or complete RRH's (remote radio heads) which include at least portions of the PHY functionality of the node (e.g., analog front end, DAC/ADCs, etc.). As can be appreciated, the location and configuration of each DUe/node may be altered to suit operational requirements such as population density, available electrical power service (e.g., in rural areas), presence of other closely located or co-located radio equipment, geographic features, etc.

As discussed with respect to FIGS. 7-7*a* below, the nodes 406, 406*a* in the embodiment of FIG. 5 include multiple OFDM-based transmitter-receiver chains of 800 MHz nominal bandwidth, although this configuration is merely exemplary. In operation, the node generates waveforms that are transmitted in the allocated band (e.g., up to approximately 1.6 GHz), but it will be appreciated that if desired, the OFDM signals may in effect be operated in parallel with signals carried in the below-800 MHz band, such as for normal cable system operations.

As shown in FIG. 4, in one implementation, each node (and hence DUe) is in communication with its serving CUe via an F1 interface, and may be either co-located or not co-located with the CUe. For example, a node/DUe may be positioned within the MSO HFC infrastructure proximate a distribution node within the extant HFC topology, such as before the N-way tap point 412, such that a plurality of premises (e.g., the shown residential customers) can be served by the node/DUe via the aforementioned OFDM waveforms and extant HFC plant. In certain embodiments, each node/DUe 406, 406*a* is located closer to the edge of the network, so as to service one or more venues or residences (e.g., a building, room, or plaza for commercial, corporate, academic purposes, and/or any other space suitable for wireless access). For instance, in the context of FIG. 4, a node might even comprise a CPEe or external access node (each discussed elsewhere herein). Each radio node 406 is configured to provide wireless network coverage within its coverage or connectivity range for its RAT (e.g., 4G and/or 5G NR). For example, a venue may have a wireless NR modem (radio node) installed within the entrance thereof for prospective customers to connect to, including those in the parking lot via inter alia, their NR or LTE-enabled vehicles or personal devices of operators thereof.

Notably, different classes of DUe/node 406, 406*a* may be utilized. For instance, a putative "Class A" LTE eNB may transmit up X dbm, while a "Class-B" LTE eNBs can transmit up to Y dbm (Y>X), so the average area can vary widely. In practical terms, a Class-A device may have a working range on the order of hundreds of feet, while a Class B device may operate out to thousands of feet or more, the propagation and working range dictated by a number of factors, including the presence of RF or other interferers, physical topology of the venue/area, energy detection or sensitivity of the receiver, etc. Similarly, different types of NR-enabled nodes/DUe 406, 406*a* can be used depending on these factors, whether alone or with other wireless PHYs such as WLAN, etc.

Moreover, using the architecture of FIG. 4, data may be delivered redundantly or separately via the radio access node 406*a* as well as the CPEe 413 via one or more DUe units 406*a*, depending on the location of the client device 407, thereby enabling the client device to have constant access to the requested data when in range of the serving node/device. For instance, in one scenario, the supplemental link is used to maintain a separate data session simultaneously even without mobility; i.e., one session via PHY1 for Service A, and another simultaneous session via PHY2 for Service B (as opposed to handover of Service A from PHY1 to PHY2). In one implementation, extant 3GPP LTE-A multi-band carrier aggregation (CA) protocols are leveraged, wherein the supplemental link acts as a Secondary Cell or "SCell" to the Primary Cell or "PCell" presently serving the user from inside the home/building, or vice versa (e.g., the supplemental link can act as the PCell, and the SCell added thereafter via e.g., the premises node). See inter alia, 3GPP TR 36.808, "Evolved Universal Terrestrial Radio Access (E-UTRA); Carrier Aggregation; Base Station (BS) radio transmission and reception," incorporated herein by reference in its entirety.

Signal Attenuation and Bandwidth

Figure 6A:
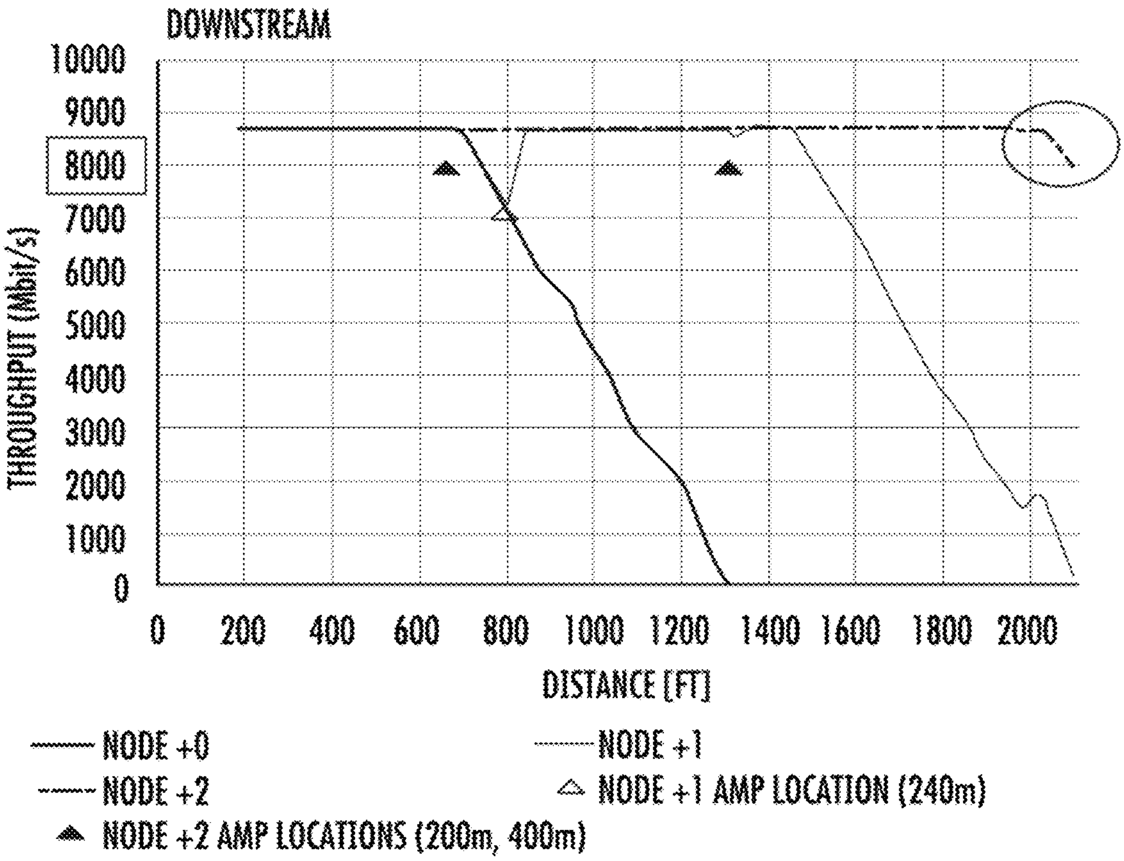
FIGS. 6*a* and 6*b* illustrate exemplary downstream (DS) and upstream (US) data throughputs or rates as a function of distance within the HFC cable plant of FIG. 5.
Figure 6B:
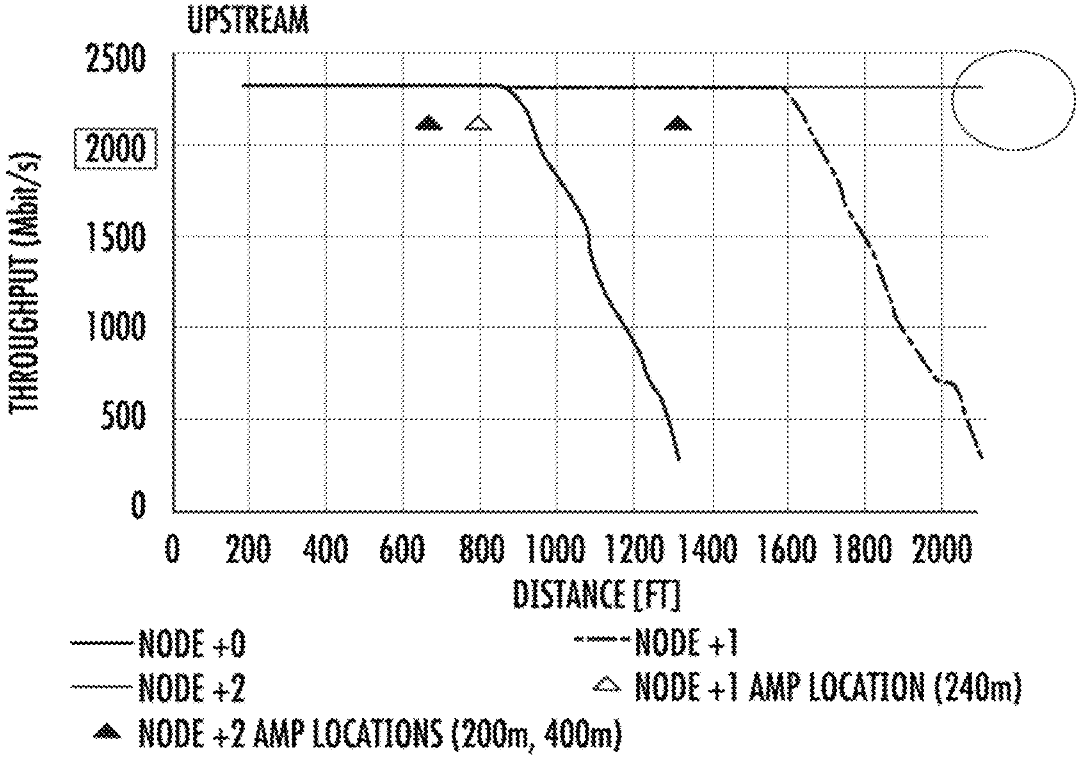

FIGS. 6*a* and 6*b* illustrate exemplary downstream (DS) and upstream (US) data throughputs or rates as a function of distance within the HFC cable plant of FIG. 4. As illustrated, a total (DS and US combined) bandwidth on the order of 10 Gbps is achievable (based on computerized simulation conducted by the Assignee hereof), at Node+2 at 2100 ft (640 m), and at Node+1 at 1475 ft (450 m). One exemplary split of the aforementioned 10 Gbps is asymmetric; e.g., 8 Gbps DL/2 Gbps UL, although this may be dynamically varied using e.g., TDD variation as described elsewhere herein.

Figure 2:
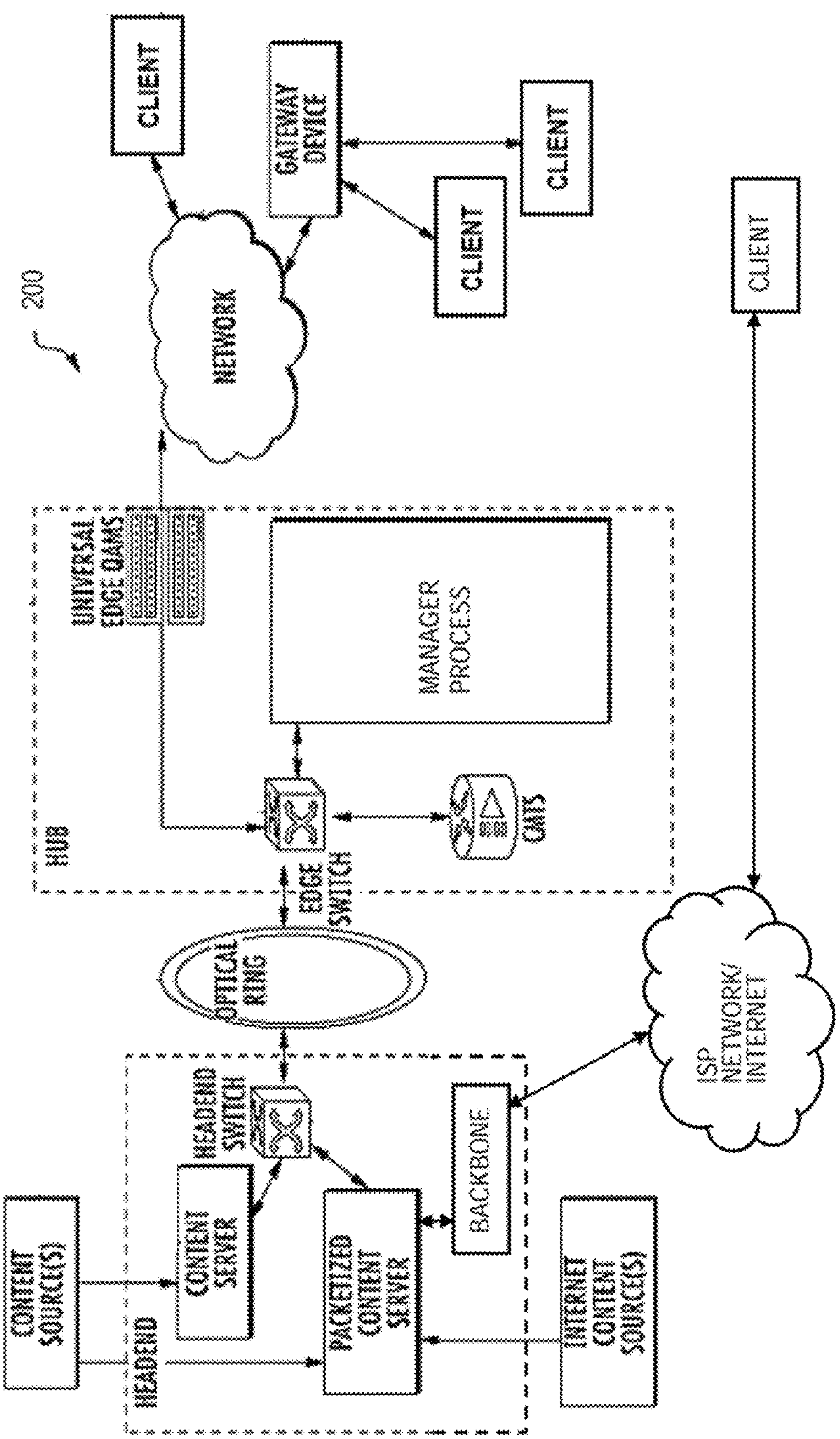
FIG. 2 (Prior Art)

Notably, the portions of the extant HFC architecture described above (see e.g., FIGS. 1 and 2) utilized by the architecture 400 of FIG. 4 are not inherently limited by their medium and architecture (i.e., optical fiber transport ring, with coaxial cable toward the edges); coaxial cable can operate at frequencies significantly higher than the sub-1 GHz typically used in cable systems, but at a price of significantly increased attenuation. As is known, the formula for theoretical calculation of attenuation (A) in a typical coaxial cable includes the attenuation due to conductors plus attenuation due to the dielectric medium:

$$A=4.35\ (R_t/Z_0)+2\sqrt{\overline{E}}78\ \text{pF}=\text{dB per 100 ft.}$$

where:

$R_t$=Total line resistance ohms per 1000 ft.

$$R_t=0.1\ (1/d+1\sqrt{\overline{F}}D)\ \text{(for single copper line)}$$

p=Power factor of dielectric

F=Frequency in megahertz (MHz)

As such, attenuation increases with increasing frequency, and hence there are practical restraints on the upper frequency limit of the operating band. However, these restraints are not prohibitive in ranges up to for example 2 GHz, where with suitable cable and amplifier manufacturing and design, such coaxial cables can suitably carry RF signals without undue attenuation. Notably, a doubling of the roughly 800 MHZ-wide typical cable RF band (i.e., to 1.6 GHz width) is very possible without suffering undue attenuation at the higher frequencies.

It will also be appreciated that the attenuation described above is a function of, inter alia, coaxial conductor length, and hence higher levels of "per-MHz" attenuation may be acceptable for shorter runs of cable. Stated differently, nodes serviced by shorter runs of cable may be able to better utilize the higher-end portions of the RF spectrum (e.g., on the high end of the aforementioned exemplary 1.6 GHz band) as compared to those more distant, the latter requiring greater or disproportionate amplification. As such, the present disclosure contemplates use of selective mapping of frequency spectrum usage as a function of total cable medium run length or similar.

Another factor of transmission medium performance is the velocity factor (VF), also known as wave propagation speed or velocity of propagation (VoP), defined as the ratio of the speed at which a wavefront (of an electromagnetic or radio frequency signal, a light pulse in an optical fiber or a change of the electrical voltage on a copper wire) propagates over the transmission medium, to the speed of light (c, approximately 3E08 m/s) in a vacuum. For optical signals, the velocity factor is the reciprocal of the refractive index. The speed of radio frequency signals in a vacuum is the speed of light, and so the velocity factor of a radio wave in a vacuum is 1, or 100%. In electrical cables, the velocity factor mainly depends on the material used for insulating the current-carrying conductor(s). Velocity factor is an important characteristic of communication media such as coaxial, CAT-5/6 cables, and optical fiber. Data cable and fiber typically has a VF between roughly 0.40 and 0.8 (40% to 80% of the speed of light in a vacuum).

Achievable round-trip latencies in LTE (UL/DL) are on the order of 2 ms (for "fast" UL access, which eliminates need for scheduling requests and individual scheduling grants, thereby minimizing latency, and shorter TTI, per Release 15), while those for 5G NR are one the order of 1 ms or less, depending on transmission time interval frequency (e.g., 60 kHz).

Notably, a significant portion of 4G/4.5G transport latency relates to network core and transport (i.e., non-edge) portions of the supporting infrastructure.

Hence, assuming a nominal 0.7 VF and a one (1) ms roundtrip latency requirement, putative service distances on the order of 100 km are possible, assuming no other processing or transport latency:

$$0.5E{=}03\text{ s(assume symmetric }US/DS)\times(0.7\times3E08\text{ m/s})\times1\text{ km}/1000\text{ m}=1.05E02\text{ km}$$

As discussed in greater detail below with respect to FIGS. 7*a* and 7*b*, the exemplary embodiments of the architecture 400 may utilize IF (Intermediate Frequencies) to reduce attenuation that exists at the higher frequencies on the brearer medium (i.e., coaxial cable).

Network Node and DUe Apparatus

Figure 7:
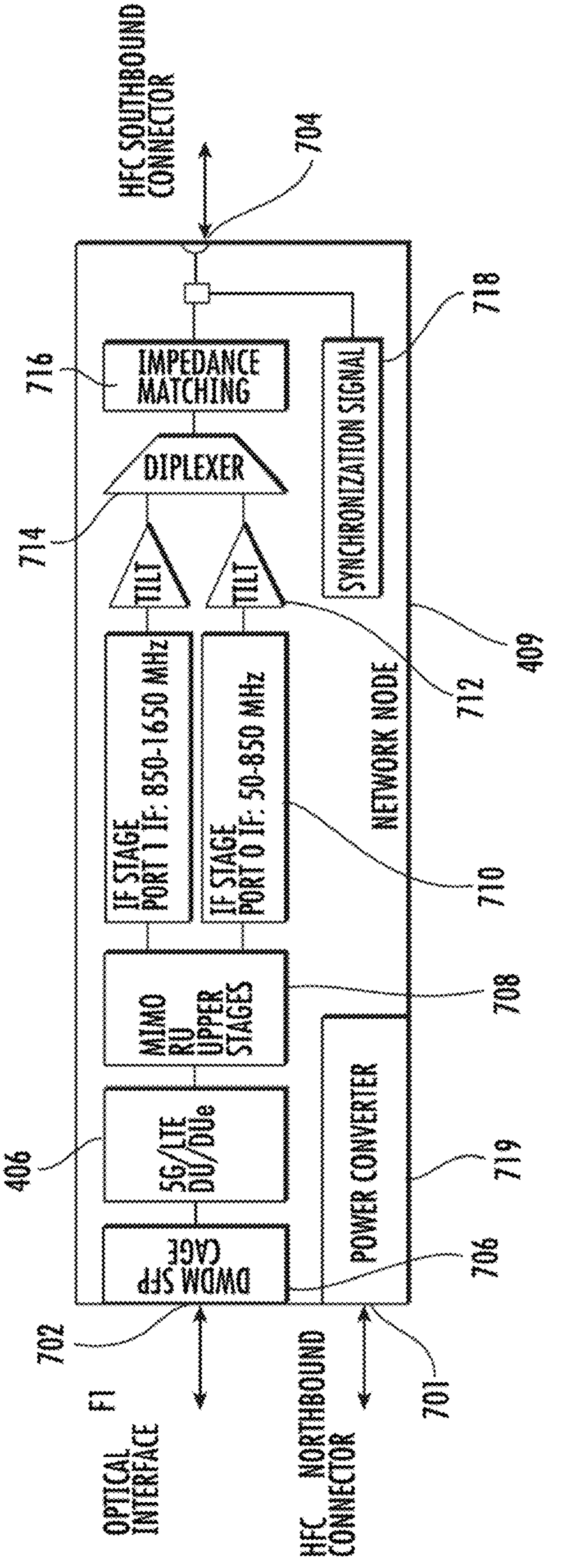
FIG. 7 is a functional block diagram illustrating an exemplary general configuration of a network node apparatus according to the present disclosure.
Figure 7A:
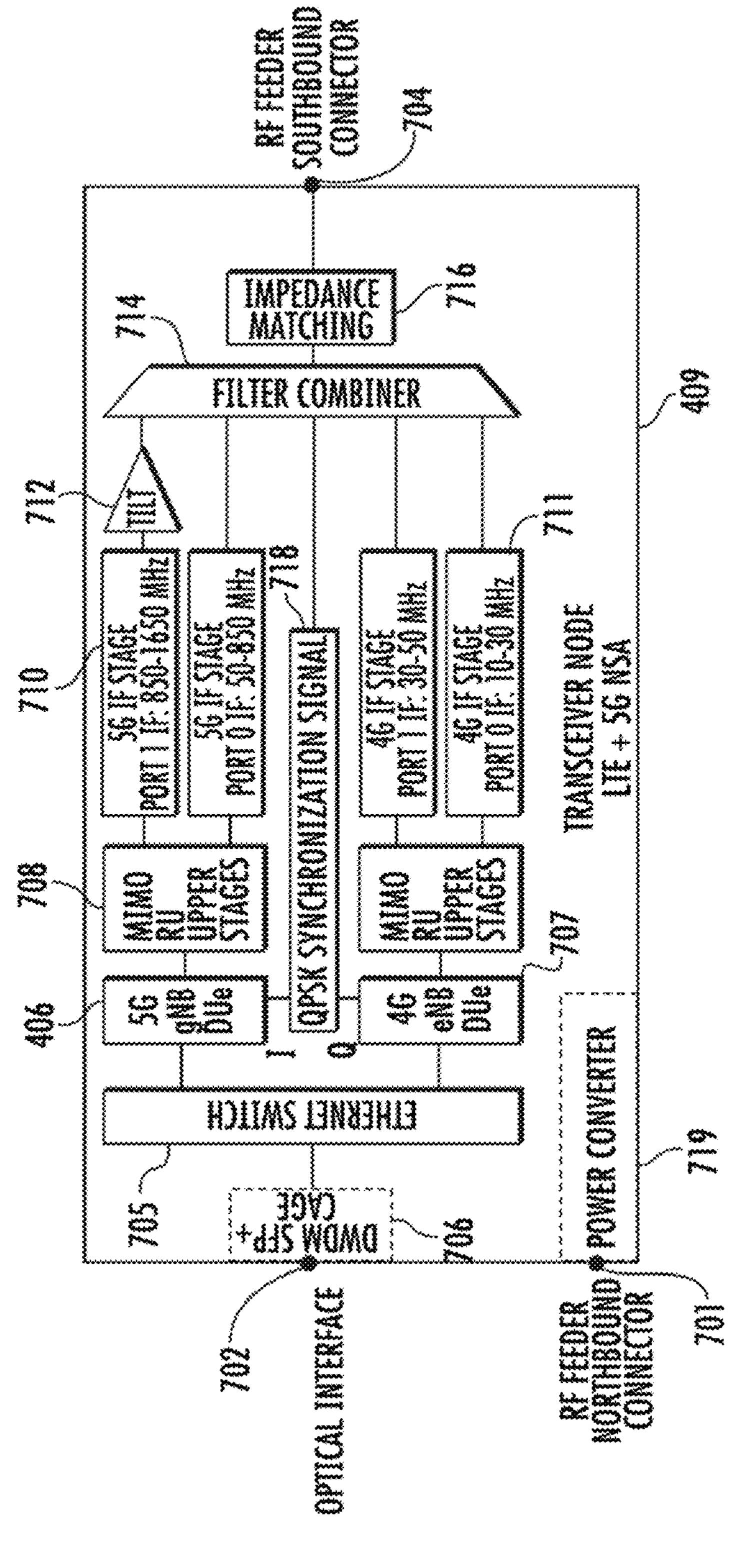
FIG. 7*a* is a functional block diagram illustrating an exemplary implementation of the network node apparatus according to the present disclosure, configured for 3GPP 4G and 5G capability.

FIGS. 7 and 7*a* illustrate exemplary configurations of a network radio frequency node apparatus 409 according to the present disclosure. As referenced above, these nodes 409 can take any number of form factors, including (i) co-located with other MSO equipment, such as in a physically secured space of the MSO, (ii) "strand" or pole mounted, (iii) surface mounted, and (iv) buried, so as to inter alia, facilitate most efficient integration with the extant HFC (and optical) infrastructure, as well as other 4G/5G components such as the CUe 404.

As shown, in FIG. 7, the exemplary node 409 in one embodiment generally includes an optical interface 702 to the HFC network DWDM system (see FIG. 2), as well as a "Southbound" RF interface 704 to the HFC distribution network (i.e., coax). The optical interface 702 communicates with an SFP connector cage 706 for receiving the DWDM signals via the interposed optical fiber. A 5G NR DUe 406 is also included to provide 5G DU functionality as previously described, based on the selected option split. The MIMO/radio unit (RU) stages 708 operate at baseband, prior to upconversion of the transmitted waveforms by the IF (intermediate frequency) stages 710 as shown. As discussed below, multiple parallel stages are used in the exemplary embodiment to capitalize on the multiple parallel data streams afforded by the MIMO technology within the 3GPP technology. A tilt stage 712 is also utilized prior to the diplexer stage 714 and impedance matching stage 716. Specifically, in one implementation, this "tilt" stage is used to compensate for non-linearity across different frequencies carried by the medium (e.g., coaxial cable). For instance, higher frequencies may have a higher loss per unit distance when travelling on the medium as compared to lower frequencies travelling the same distance on the same medium. When a high bandwidth signal (e.g. 50-1650 MHz) is transmitted on a coax line, its loss across the entire frequency bandwidth will not be linear, and may include shape artifacts such as a slope (or "tilt"), and/or bends or "knees" in the attenuation curve (e.g., akin to a low-pass filter). Such non-linear losses may be compensated for to achieve optimal performance on the medium, by the use of one or more tilt compensation apparatus 712 on the RF stage of the node device.

A synchronization signal generator 718 is also used in some embodiments as discussed in greater detail below with respect to FIG. 7*a*.

In the exemplary implementation of FIG. 7*a*, both 4G and 5G gNB DUe 707, 406 are also included to support the RF chains for 4G and 5G communication respectively. As described in greater detail below, the 5G portion of the spectrum is divided into two bands (upper and lower), while the 4G portion is divided into upper and lower bands within a different frequency range. In the exemplary implementation, OFDM modulation is applied to generate a plurality of carriers in the time domain. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based spectrum generation apparatus useful with various embodiments of the node 509 described herein.

In the exemplary embodiment, the 5G and LTE OFDM carriers produced by the node 409 utilize 1650 MHz of the available HFC bearer bandwidth, and this bandwidth is partitioned into two or more sub-bands depending on e.g., operational conditions, ratio of "N+0" subscribers served versus "N+i" subscribers served, and other parameters. See discussion of FIG. 7*c* below. In one variant, each node utilizes RF power from its upstream nodes to derive electrical power, and further propagate the RF signal (whether at the same of different frequency) to downstream nodes and devices including the wideband amplifiers.

While the present embodiments are described primarily in the context of an OFDM-based PHY (e.g., one using IFFT and FFT processes with multiple carriers in the time domain) along with TDD (time division duplex) temporal multiplexing, it will be appreciated that other PHY/multiple access schemes may be utilized consistent with the various aspects of the present disclosure, including for example and without limitation FDD (frequency division duplexing), direct sequence or other spread spectrum, and FDMA (e.g., SC-FDMA or NB FDMA).

As previously noted, to achieve high throughput using a single receiver chipset in the consumer premises equipment (CPEe) 413 and 3GPP 5G NR waveforms over a single coaxial feeder, such as the coaxial cable that MSOs bring to their subscriber's premises or the single coaxial cable that is installed for lower-cost single input single output (SISO) distributed antenna systems (DAS), the total carrier bandwidth that can be aggregated by the prior art chipset is limited to a value, e.g. 800 MHZ, which is insufficient for reaching high throughputs such as 10 Gbit/s using one data stream alone given the spectral efficiencies supported by the 3GPP 5G NR standard.

Since the 3GPP 5G NR standard supports the transmission of multiple independent parallel data streams as part of a multiple input multiple output (MIMO) channel for the same RF bandwidth to leverage the spatial diversity that wireless channels afford when multiple antenna elements are used, the very first generation of 3GPP 5G chipsets will support such parallel MIMO data streams. However, attempts to transmit these parallel streams over a single cable would generally be counterproductive, as all the streams would occupy the same RF bandwidth and would interfere with each other for lack of spatial diversity between them.

Accordingly, the various embodiments of the apparatus disclosed herein (FIGS. 7 and 7*a*) leverage the parallel MIMO data streams supported by 3GPP 5G NR, which are shifted in frequency in the transceiver node 409 before being injected into the single coaxial feeder so that frequency diversity (instead of spatial diversity; spatial diversity may be utilized at the CPEe and/or supplemental pole-mounted radio access node 406*a* if desired) is leveraged to achieve the maximum total carrier bandwidth that 3GPP 5G NR chipsets will support with parallel data streams. Conceptually, a transparent "pipe" that delivers MIMO streams which converge at the CPEe is created. Based on channel quality feedback from the CPEe back to the node (e.g., DUe 406 or node 409), the contents of the MIMO streams are mapped to different frequency resources, e.g. with a frequency selective scheduler, and the appropriate modulation and coding scheme (MCS) is selected by the transmission node for the contents. The aforementioned "pipe" disclosed herein acts in effect as a black box which internally reroutes different antenna ports to different frequency bands on the cable bearer medium.

Figure 7B:
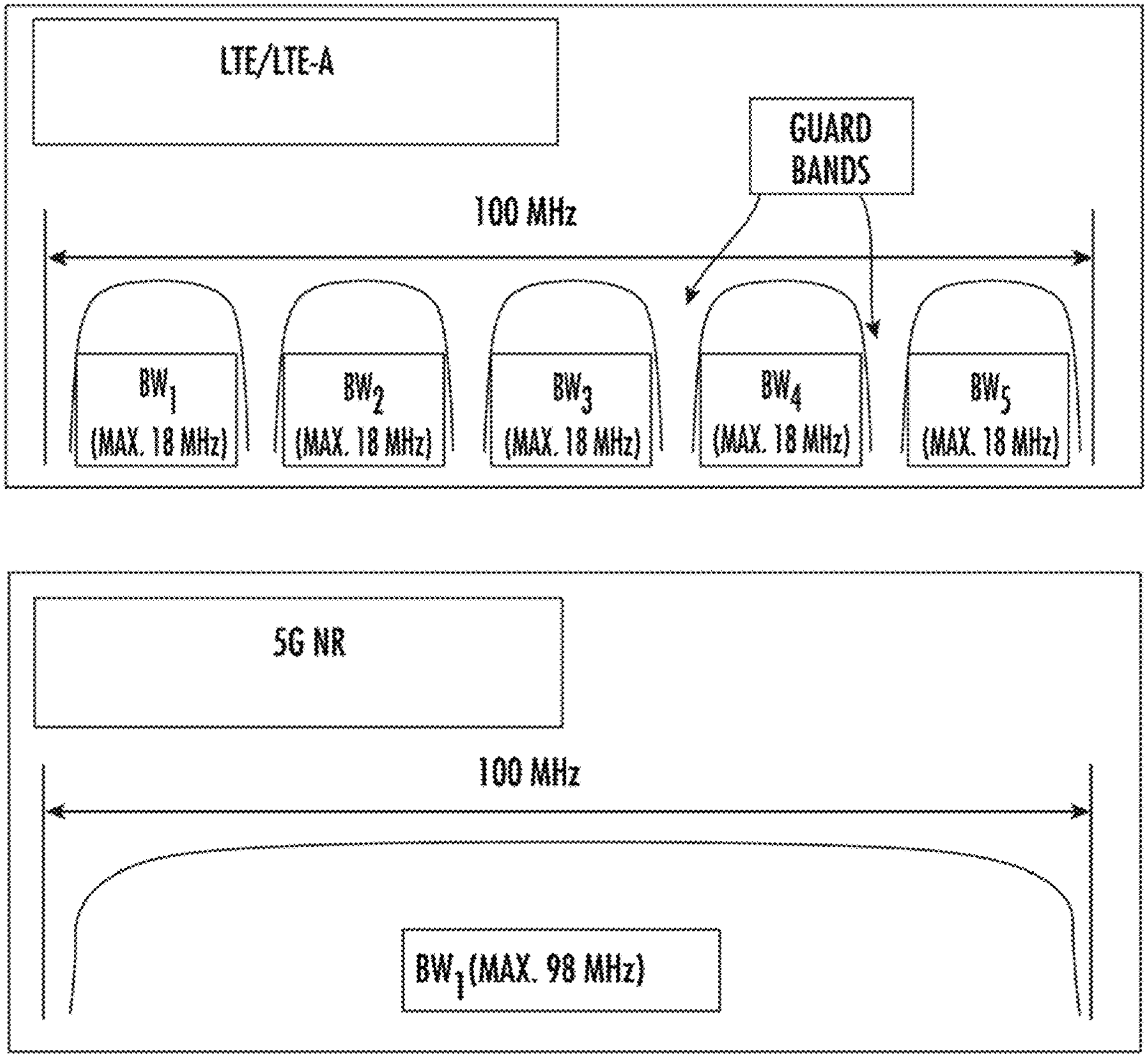
FIG. 7B PRIOR ART
FIG. 7*b* is a graphical representation of frequency spectrum allocations according to prior art LTE/LTE-A and 5G NR standards.

FIG. 7*b* shows a comparison of prior art LTE/LTE-A frequency bands and associated guard bands over a typical 100 MHz portion of the allocated frequency spectrum (top), as well as a comparable 5G NR frequency band allocation (bottom). As shown, 5G NR uses a wideband approach, with its maximum bandwidth being on the order of 98 MHz. Such use of the wideband 5G carrier is more efficient than multicarrier LTE/LTE-A. It provides a number of benefits, including faster load balancing, less common channel overhead, and reduced guard bands between carriers (LTE uses for example 10% allocated to its guard bands).

Accordingly, in one variant of the present disclosure (FIG. 7*c*), the node 409 is configured to offset the aforementioned individual parallel MIMO data streams in the frequency spectrum using a plurality of 5G NR widebands 732 (here, TDD carriers) distributed between lower and upper frequency limits 752, 754, each wideband having a center frequency and associated guardband (not shown) to the next adjacent wideband carrier(s) 732. In one implementation, the 5G NR values of maximum bandwidth and guardband are used; however, it will be appreciated that the various aspects of the present disclosure are in no way so limited, such values being merely exemplary. In the illustrated embodiments of FIG. 7*c*, N bands or TTD carriers 732 are spread across of the available spectrum, the latter which may in one example be 1.6 GHz as discussed previously herein, although other values are contemplated (including to frequencies well above 1.6 GHz, depending on the underlying cable medium losses and necessary transmission distances involved). As shown, depending on the available bandwidth and the bandwidth consumed by each TDD carrier 732, more or less of such carriers can be used (three shown on the left portion of the diagram, out to "n" total carriers. Notably, while a number of nominal 98 MHz NR carriers may be used, the embodiments of FIG. 7*c* also contemplate (i) much wider carriers (depending on the number of layers 737, 738 used, as shown in the bottom portion of FIG. 7*c*), and (ii) use of carrier aggregation or CA mechanisms to utilize two or more widebands together effectively as a common carrier.

As further shown in the top portion 730 of FIG. 7*c*, a lower band 734 is configured for FDD use; specifically, in this implementation, a downlink synchronization channel 733 (discussed elsewhere herein) is created at the lower portion of the band 734, and one or more LTE FDD bands 742 are created (such as for UL and DL channels as described below with respect to the bottom portion of FIG. 7*c*). The total bvandwidth of the FDD band 734 is small in comparison to the remainder of the spectrum (i.e., between the lower and upper limits 752, 754), the latter used to carry, inter alia, the 5G NR traffic.

In the exemplary implementation 740 (FIG. 7*c*, bottom portion) of the generalized model 730 (FIG. 7*c*, top portion), the individual 5G TDD carriers 732 each include multiple "layers" 737, 738, which in the exemplary configuration correspond to MIMO ports and which can be utilized for various functions. As shown, a common UL/DL layer 737 is associated with each or the larger carriers 732 (to maintain an uplink and downlink channel), as are a number (L) of additional UL or DL layers 738 (e.g., which can be selectively allocated to UL or DL, the latter being the predominant choice due to service asymmetry on the network where DL consumes much more bandwidth than UL). In one variant, each layer is 98 MHz wide to correspond to a single NR wideband, although this value is merely exemplary.

Within the LTE FDD band 742, two LTE carriers for UL and DL 735, 736 are used, and a separate DL synchronization channel 733 is used at the lower end of the spectrum. As will be appreciated, various other configurations of the lower portion of the cable spectrum frequency plan may be used consistent with the present disclosure. In one variant, the lower spectrum portion 742 (FIG. 7*c*) is allocated to a 3GPP 4G LTE MIMO carrier with two parallel streams 735, 736 of about 20 MHz bandwidth for a total of about 40 MHz (including guardbands). This is performed since 3GPP Release 15 only supports 5G NR in Non-Standalone (NSA) mode, whereby it must operate in tandem with a 4G/4.5 LTE carrier.

As an aside, 5G NR supports adaptive TDD duty cycles, whereby the proportion of time allocated for downstream and upstream transmissions can be adapted to the net demand for traffic from the total set of transmitting network elements, viz. the node and all the CPEe 413 sharing the coaxial bus with the node. 4G LTE does not support such adaptive duty cycles. To prevent receiver blocking in the likely scenario that the 5G and 4G duty cycles differ, high-rejection filter combiners 714 (FIG. 7*a*) are used in all active network elements, viz. transceiver nodes, inline amplifiers and CPEe 413 for the 4G and 5G carriers to not interfere with each other or cause receiver blocking. In the exemplary diplexer of FIG. 7*a*, both 4G and 5G are addressed via a high-rejection filter to allow for different duty cycles.

As noted above, another minor portion 733 of the lower spectrum on the coaxial cable (e.g., <5 MHz) employs one-way communication in the downstream for the transmission of two digital synchronization channels, one for 5G and one for 4G, which are I-Q multiplexed onto one QPSK analog synchronization channel within the aforementioned "minor portion" 733 from the signal generator 718 of the transceiver node 409 to the multiple inline amplifiers and CPEe 413 that may be sharing the coaxial bus. These synchronization channels aid coherent reception of the PRBs, Specifically, the synchronization signal is used to achieve frequency synchronization of oscillators in all active components downstream from the node such as line-extender amplifiers and CPEe's. The oscillators for the 4G and 5G technologies may be independent. If the carrier uses FDD, such as on the 4G LTE channels, frequency synchronization is sufficient. If the carrier uses TDD as in the 5G NR portions of FIG. 7c, then phase synchronization is needed as well for downstream components to identify the transmission mode—downlink or uplink and the duty cycle between the two and the synchronization signal conveys this information. Since lower frequencies attenuate less on the cable, the synchronization channel is in one implementation transmitted over a lower portion of the spectrum on the cable (FIG. 7c) so that it reaches every downstream network element and CPEe. In one variant, an analog signal is modulated with two bits, where one bit switches according to the duty cycle for the 4G signal, and the other bit switches according to the duty cycle of the 5G signal, although other approaches may be utilized.

It will also be recognized that: (i) the width of each 5G TDD wideband carrier 732 may be statically or dynamically modified based on e.g., operational requirements such as demand (e.g., network or bandwidth requirements of any dedicated bearer created for enhanced-QoE voice services), and (ii) the number of wideband carriers 732 used (and in fact the number of layers utilized within each wideband carrier 732) can be similarly statically or dynamically modified. It will also be appreciated that two or more different values of bandwidth may be used in association with different ones of the plurality of widebands, as well as being aggregated as previously described.

The values of $f_{lower}$ 752 and $f_{upper}$ 754 may also be varied depending on operational parameters and/or other considerations, such as RF signal attenuation as a function of frequency as discussed in detail previously herein. For example, since higher frequencies attenuate much more over the coaxial transmission media than lower frequencies, in one variant the Intermediate Frequencies (IF) are transmitted over the media, and block-conversion to RF carrier frequency is employed subsequently in the consumer premises equipment (CPEe) 413 for 3GPP band-compliant interoperability with the 3GPP 5G NR chipset in the CPEe. In this fashion, attenuation that would otherwise be experienced by conversion earlier in the topology is advantageously avoided. Similarly, very short runs of cable (e.g., a "last mile" between a fiber delivery node and a given premises, or from a distribution node to various subscriber CPEe within a multi-dwelling unit (MDU) such as an apartment or condominium building, hospital, or enterprise or school campus can be mapped out into much higher frequencies since their overall propagation distance over the cable is comparatively small.

In another variant, active or dynamic Tx/Rx port formation specified in the 5G NR standards is utilized, yet the formed beams therein are substituted with frequency bandwidth assignments as discussed above (i.e., total bandwidth, $f_{lower}$ 752 and $f_{upper}$ 754 values, and TDD carrier bandwidth values).

Figure 7C:
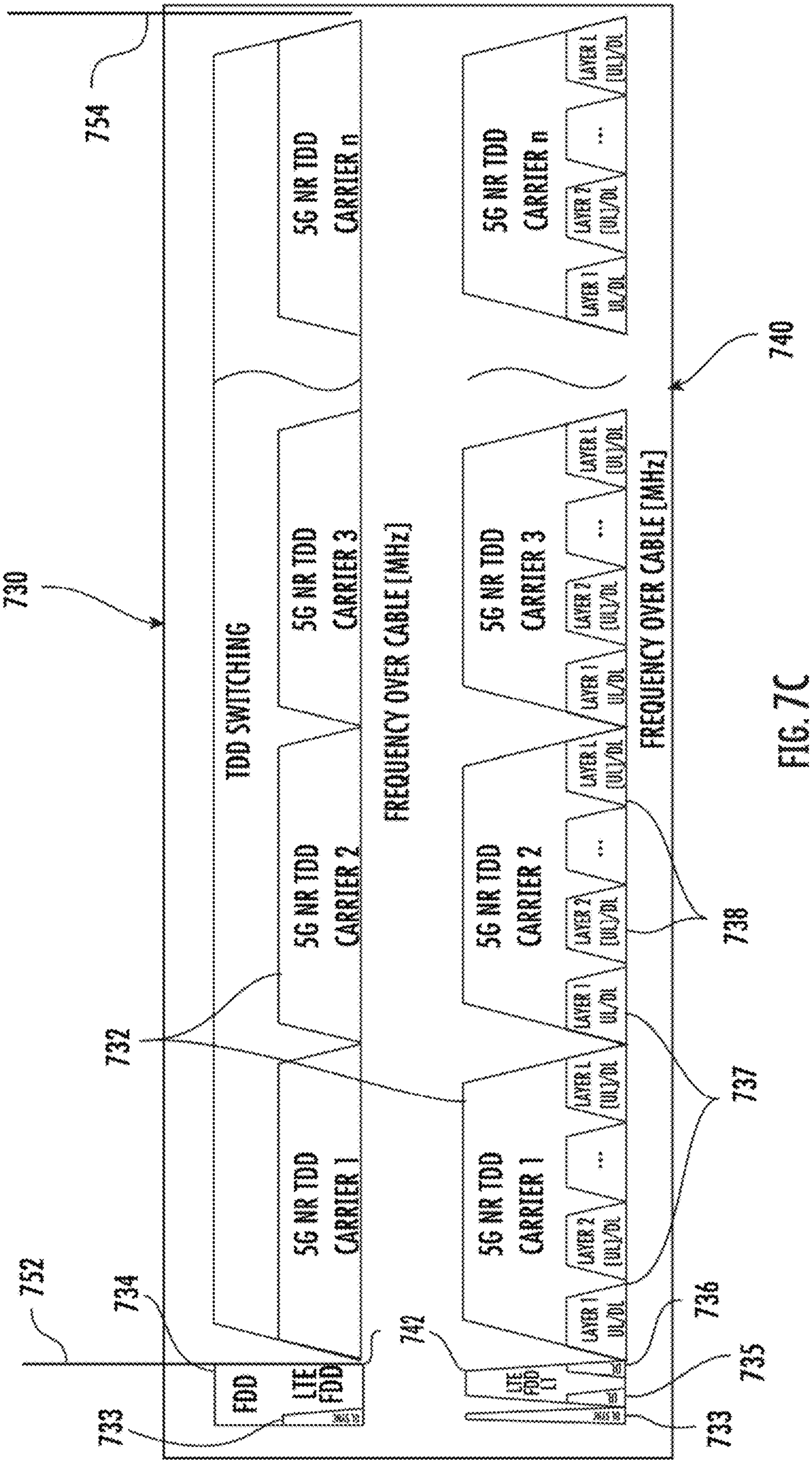
FIG. 7*c* is a graphical representation of a frequency spectrum allocation according to one embodiment of the present disclosure.

The foregoing aspects of FIG. 7c also highlight the fact that, while some exemplary configurations described herein utilize two (2) MIMO ports or streams as baseline of sorts for frequency diversity on the cable medium (i.e., in order to reduce the frequency-based filtering complexity in the CPEe 413), a much greater level of complexity in frequency planning can be utilized consistent with the present disclosure, including use of more MIMO layers and different bandwidths per TDD carrier 732. Specifically, exemplary embodiments herein map the different antenna ports to different frequency bands on the cable, with different frequency bands experiencing different levels of propagation loss, phase delay, environmental interference and self-interference. Hence, independent channels with frequency diversity for signals to reach the CPEe are created. When upconverted to RF frequency at the CPEe, the CPEe in one implementation processes these signals as if they were received over the air, and will (as shown in block 810 of FIG. 8), upconvert each frequency band on the cable, from 50 to 850 MHz for Port 0 and 850 to 1650 MHz for Port 1 in the exemplary embodiment, to the same RF frequency, thereby realigning them by virtue of a different frequency multiplier being applied to each port. Moreover, in the exemplary embodiment. The CPEe provides channel quality information (CQI), rank Indicator (RI) and precoding matrix indicator (PMI) feedback back to the distribution node 409 consistent with extant 3GPP protocols. If the higher frequencies on the cable medium are not excessively attenuated (see FIGS. 6a and 6b), an RI of 2 (for 2-layer MIMO) will be reported back to the node 409. The node then uses this information to code independent layers of data to the CPEe. However, depending on permissible complexity in the CPEe and the physical characteristics of the cable relative to topological location of the CPEe, four (4), or even (8) layers may be utilized in place of the more simple 2-layer approach above.

In operation, the IF carriers injected by the transceiver node into the coaxial feeder 704 can be received by multiple CPEe 413 that share the feeder as a common bus using directional couplers and power dividers or taps. Point-to-Multipoint (PtMP) downstream transmissions from the node 409 to the CPEe 413 can be achieved by, for instance, scheduling payload for different CPEe on different 3GPP 5G NR physical resource blocks (PRB) which are separated in frequency.

In the exemplary embodiments of FIG. 7c, the vast majority of bandwidth in the coaxial cable bearer is used in Time Division Duplex (TDD) fashion to switch between downstream (DS) and upstream (US) 5G NR communications, depeding on the configuration of the particular layers 737, 738 used in each TDD carrier 732. Upstream communications from the multiple CPEe 413 to the transceiver node can also/alternatively occur simultaneously over separate PRBs (with frequency separation) if desired.

The connectivity between the transceiver node 409 and the northbound or upstream network element is achieved with a fiber optic link 702 to the MSO DWDM plant. To minimize the number of fiber channels required to feed the transceiver node 409, and to restrict it to a pair of fiber strands, in one embodiment the 3GPP 5G NR F1 interface (described supra) is realized over the fiber pair to leverage the low overhead of the F1 interface. The 3GPP 5G NR Distribution Unit (DUe) functionality is incorporated into the transceiver node 409 as previously described, since the F1 interface is defined between the Central Unit (CU/CUe) and DU/DUe where, in the illustrated embodiment, the CUe and DUe together constitute a 3GPP 5G NR base station or gNB (see FIGS. 5a-5f).

An Ethernet switch 705 is also provided at the optical interface in the embodiment of FIG. 7a to divide the backhaul into the 4G and 5G data paths (e.g., the received upstream 4G and 5G signals are respectively routed differently based on the switch 705).

The exemplary node 409 also includes a power converter 719 to adapt for internal use of quasi-square wave low voltage power supply technology over HFC used by DOCSIS network elements as of the date of this disclosure. The node 409 in one variant is further configured to pass the quasi-square wave low voltage power received on the input port 701 through to the HFC output port 704 to other active network elements such as e.g., amplifiers, which may be installed downstream of the node on the HFC infrastructure.

It is noted that as compared to some extant solutions, the illustrated embodiment of FIGS. 4 and 7, 7*a*, 7*c* uses HFC versus twisted pair to feed the CPEe 413; HFC advantageously provides lower loss and wider bandwidths than twisted pair, which is exploited to provide 5G throughputs to farther distances, and to leverage the large existing base of installed coaxial cable. Moreover, the foregoing architecture in one implementation is configured to serve multiple CPEe 413 using directional couplers and power dividers or taps to attach to a common coaxial bus which connects to a single interface at the transceiver node. The aforementioned Ethernet services (necessary to service an external Wi-Fi access-point and an integrated Wi-Fi router) are further added in other implementations to provide expanded capability, in contrast to the existing solutions.

CPEe Apparatus

Figure 8:
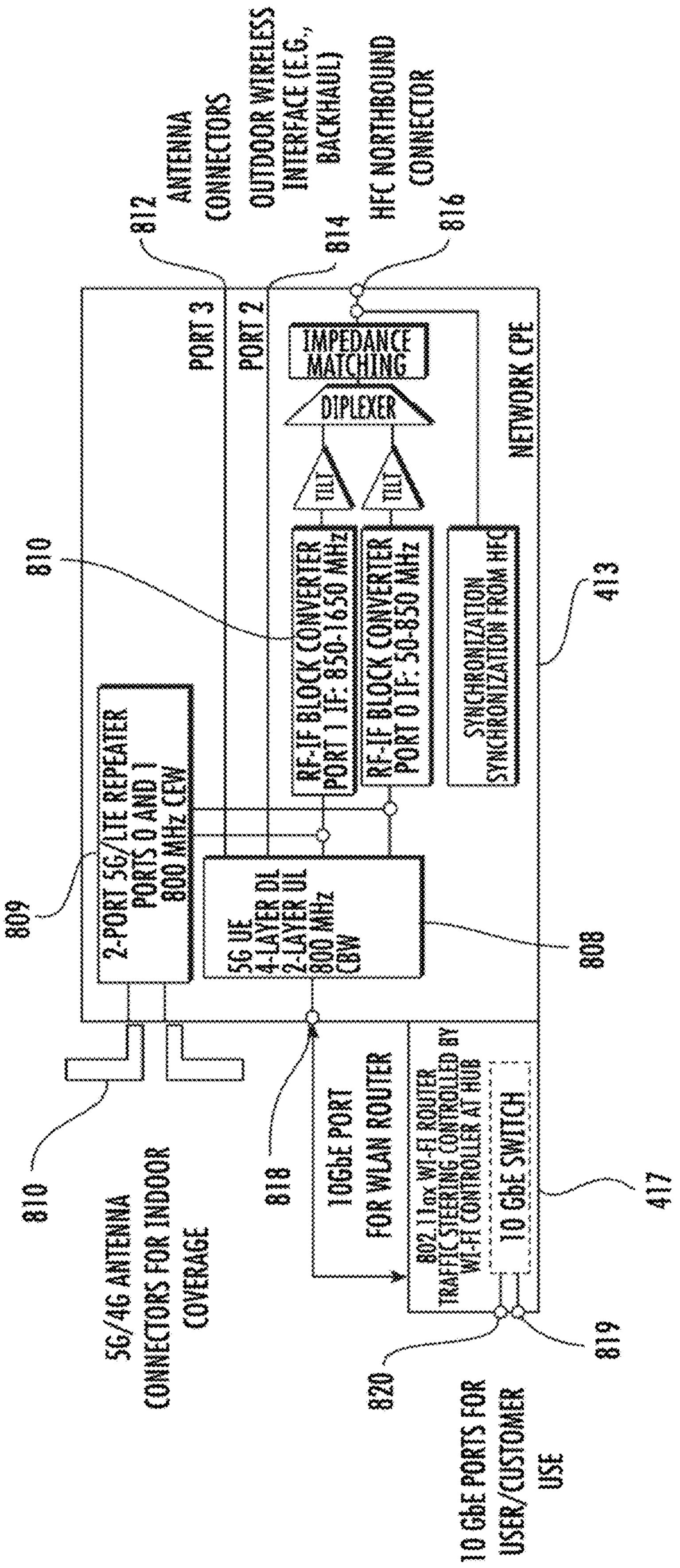
FIG. 8 is a functional block diagram illustrating an exemplary general configuration of a CPEe apparatus according to the present disclosure.

FIG. 8 illustrates an exemplary configuration of a CPEe apparatus 413 according to the present disclosure. As shown, the CPEe 413 generally an RF input interface 816 to the HFC distribution network (i.e., coax drop at the premises). A transmitter/receiver architecture generally symmetrical to the transmitter/receiver of the node 409 discussed previously is used; i.e., impedance matching circuitry, diplexer, synchronization circuit, tilt, etc. are used as part of the CPEe RF front end. Block converters 810 are used to convert to and from the coaxial cable domain bands (here, 50-850 and 850-1650 MHz) to the premises domain, discussed in greater detail below.

The exemplary CPEe 413 also includes a 5G UE process 808 to implement 3GPP functionality of the UE within the CPEe, and 3GPP (e.g., 5G/LTE) repeater module 809 which includes one or more antennae elements 810 for indoor/premises coverage within the user RF band(s). As such, the CPEe 413 shown can in effect function as a base station for user devices within the premises operating within the user band(s).

A 10 GbE WLAN port 818 is also included, which interfaces between the UE module 808 and the (optional) WLAN router 417 with internal 10 GbE switch 819) to support data interchange with premises WLAN infrastructure such as a Wi-Fi AP.

Also shown in the configuration of FIG. 8 are several external ports 812, 814 for external antenna 416 connection (e.g., roof-top antenna element(s) used for provision of the supplemental data link as previously described with respect to FIG. 4), wireless high-bandwidth backhaul, or other functions.

Figure 8A:
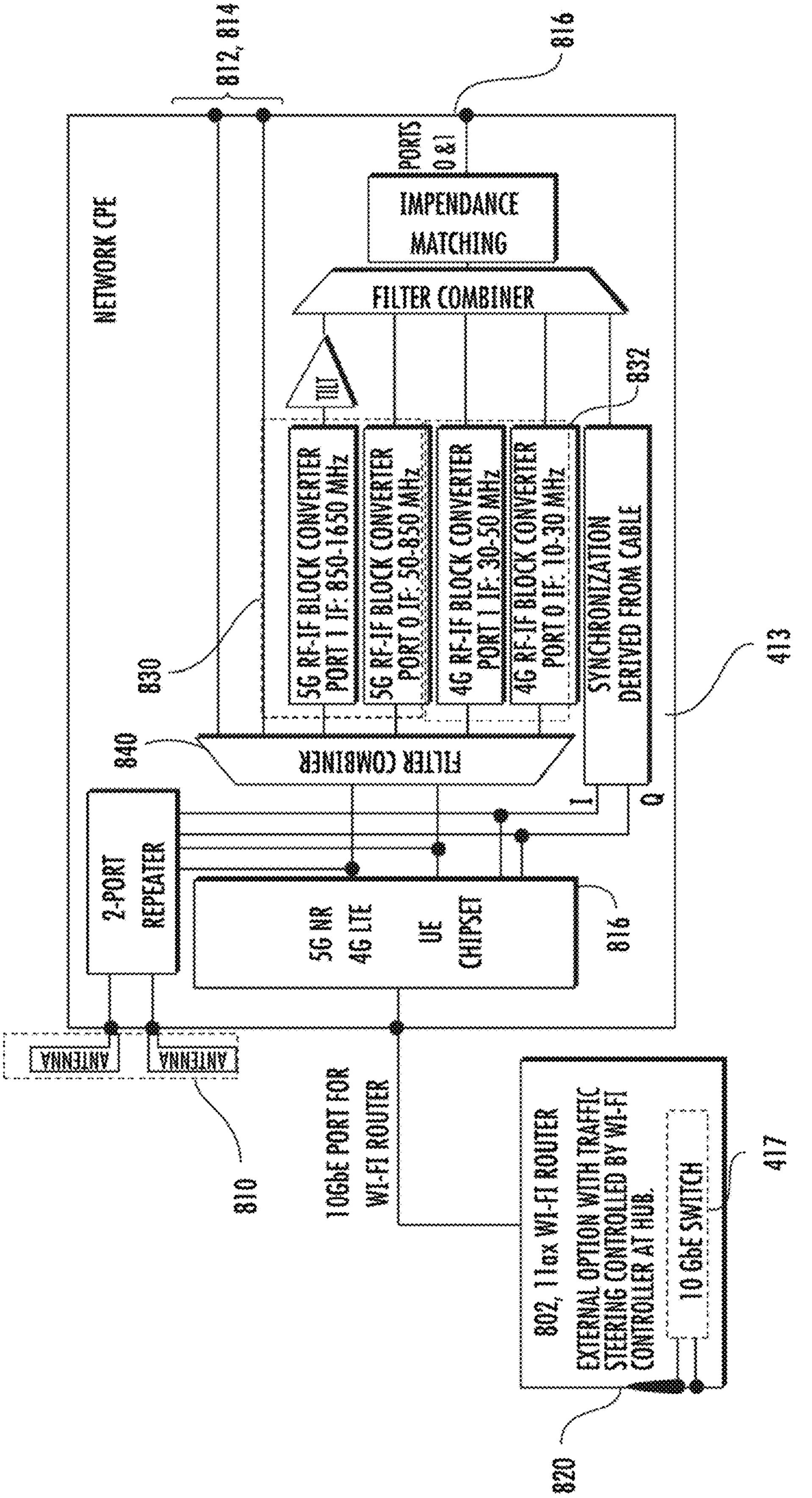
FIG. 8*a* is a functional block diagram illustrating an exemplary implementation of a CPEe apparatus according to the present disclosure, configured for 3GPP 4G and 5G capability.

In the exemplary implementation of FIG. 8*a*, both 4G and 5G gNB block converters 832, 830 are included to support the RF chains for 4G and 5G communication respectively (i.e., for conversion of the IF-band signals received to the relevant RF frequencies of the 4G/5G interfaces and modems within the CPEe, such as in the 2 GHz band. The block converters also enable upstream communication with the distribution node 409 via the relevant IF bands via the coaxial input 816 as previously described.

Notably, the CPEe 413 applies block-conversion between the IF and RF carrier frequency for the 4G and 5G carrier separately since they may be on different frequency bands. The CPEe includes in one implementation a 5G NR and 4G LTE-capable user equipment (UE) chipset 816. The two technologies are supported in this embodiment, since the first release of 3GPP 5G NR requires 4G and 5G to operate in tandem as part of the non-standalone (NSA) configuration.

It is noted that in the exemplary configuration of FIG. 8*a* (showing the lower frequencies in 4G combined with 5G), a filter combiner is used (in contrast to the more generalized approach of FIG. 8).

It is also noted that the specific implementation of FIG. 8*a* utilizes "tilt" compensation as previously described on only one of the RF-IF block converters 830. This is due to the fact that the need for such compensation arises, in certain cases such as coaxial cable operated in the frequency band noted) disproportionately at the higher frequencies (i.e., up to 1650 MHz in this embodiment). It will be appreciated however that depending on the particular application, different compensation configurations may be used consistent with the present disclosure. For example, in one variant, the upper-band block converters 830 may be allocated against more granular frequency bands, and hence tilt/compensation applied only in narrow regions of the utilized frequency band (e.g., on one or two of four 5G RF-IF block converters). Similarly, different types of tilt/compensation may be applied to each block converter (or a subset thereof) in heterogeneous fashion. Various different combinations of the foregoing will also be appreciated by those of ordinary skill given the present disclosure.

Block conversion to the RF frequency makes the signals 3GPP band-compliant and interoperable with the UE chipset in the CPEe 413. The RF carriers are also then amenable for amplification through the included repeater 809 for 4G and 5G which can radiate the RF carriers, typically indoors, through detachable external antennas 810 connected to the CPEe. Mobile devices such as smartphones, tablets with cellular modems and IoT devices can then serve off of the radiated signal for 4G and 5G service (see discussion of FIGS. 9*a* and 9*b* below).

The UE chipset 816 and the repeater 809 receive separate digital I/Q synchronization signals, one for 4G and one for 5G, for switching between the downstream and upstream modes of the respective TDD carriers, since they are likely to have different downstream-to-upstream ratios or duty cycle. These two digital synchronization signals are received from an I-Q modulated analog QPSK signal received from lower-end spectrum on the coaxial cable that feeds the CPEe 413 via the port 816.

As noted, in the exemplary implementation, OFDM modulation is applied to generate a plurality of carriers in the time domain at the distribution node 409; accordingly, demodulation (via inter alia, FFT) is used in the CPEe to demodulate the IF signals. See, e.g., co-owned and co-pending U.S. Pat. No. 9,185,341 issued Nov. 10, 2015 and entitled "Digital domain content processing and distribution apparatus and methods," and U.S. Pat. No. 9,300,445 issued Mar. 29, 2016 also entitled "Digital domain content processing and distribution apparatus and methods," each incorporated herein by reference in their entirety, for inter alia, exemplary reprogrammable OFDM-based receiver/demodulation apparatus useful with various embodiments of the CPEe 413 described herein.

Similar to the embodiment of FIG. 8, a 10 Gbe Ethernet port is also provided to support operation of the WLAN router 417 in the device of FIG. 8*a*, including for LAN use within the served premises.

Figure 9:
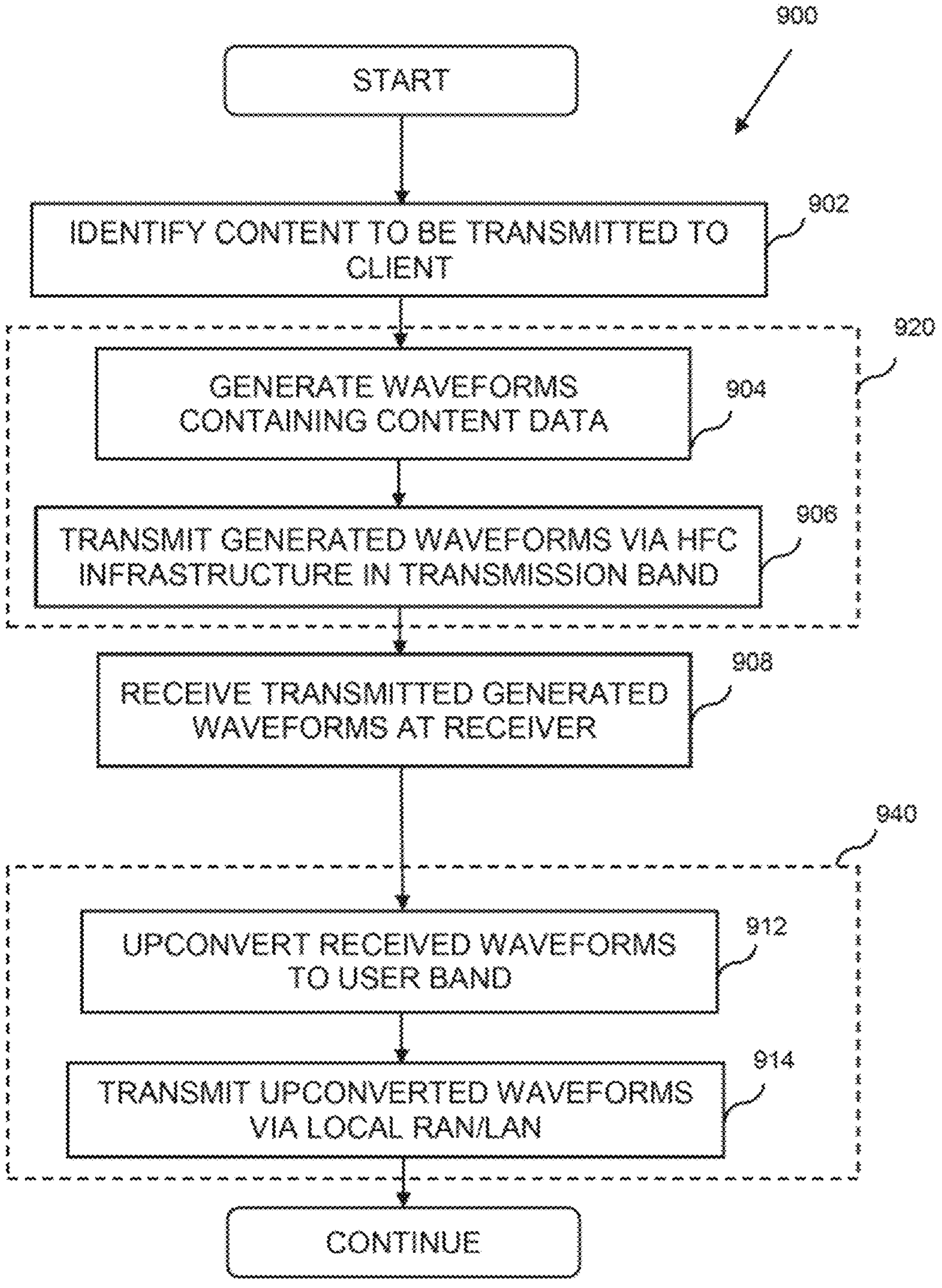
FIG. 9 is a logical flow diagram illustrating one embodiment of a generalized method of utilizing an existing network (e.g., HFC) for high-bandwidth data communication.
Figure 9A:
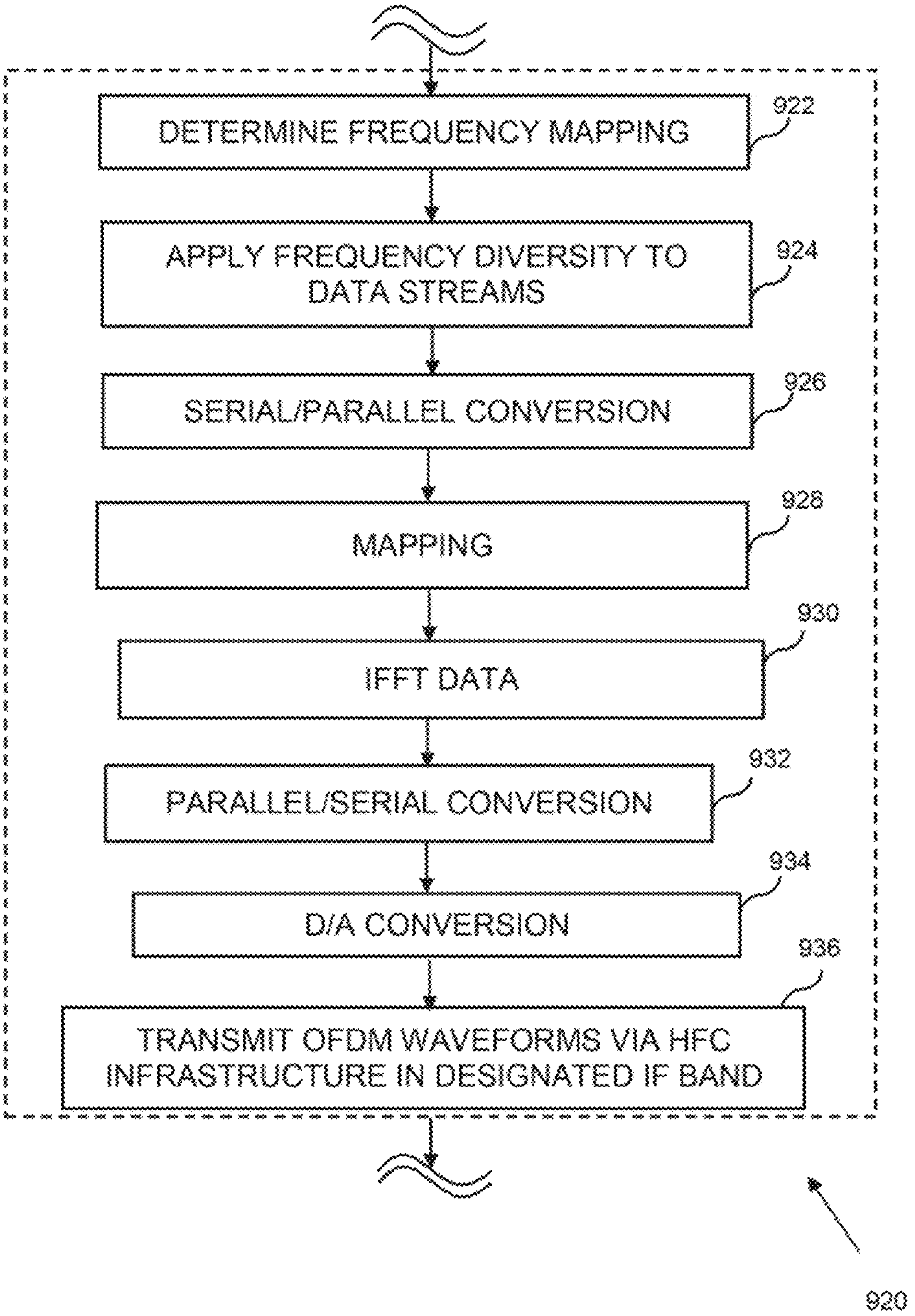
FIG. 9*a* is a logical flow diagram illustrating one particular implementation of waveform generation and transmission according to the generalized method of FIG. 9.

Further, to boost the broadband capacity beyond the capacity available through the primary coaxial cable link and to add a redundant connection for higher reliability (which could be important for small businesses, enterprises, educational institutions, etc.), two additional RF interfaces on the CPEe of FIG. 8*a* are included for connecting the CPEe to a 2-port external antenna 416 which is installed outdoors, e.g., on the roof of the small business, multi-dwelling unit (MDU) or multi-story enterprise (see FIG. 9*a*). This external antenna can be used to receive supplemental signals from outdoor radios installed in the vicinity of the consumer premises. It will be appreciated that the outdoor radios may have a primary purpose of providing coverage for outdoor mobility, but signals from them can also/alternatively be used in a fixed-wireless manner to supplement the capacity from the primary coaxial link and to add redundancy, as described elsewhere herein.

Methods

Figure 9B:
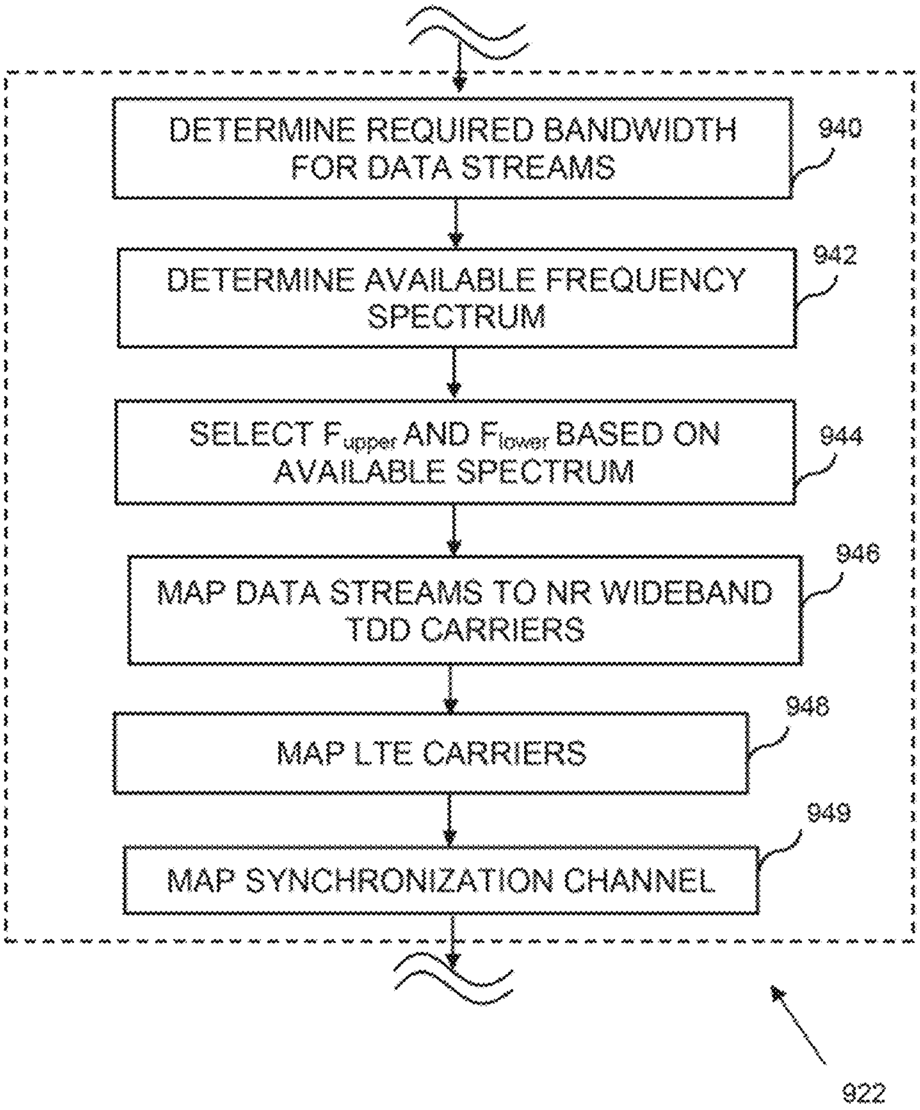
FIG. 9*b* is a logical flow diagram illustrating one particular implementation of frequency and channel mapping according to the method of FIG. 9*a*.
Figure 9C:
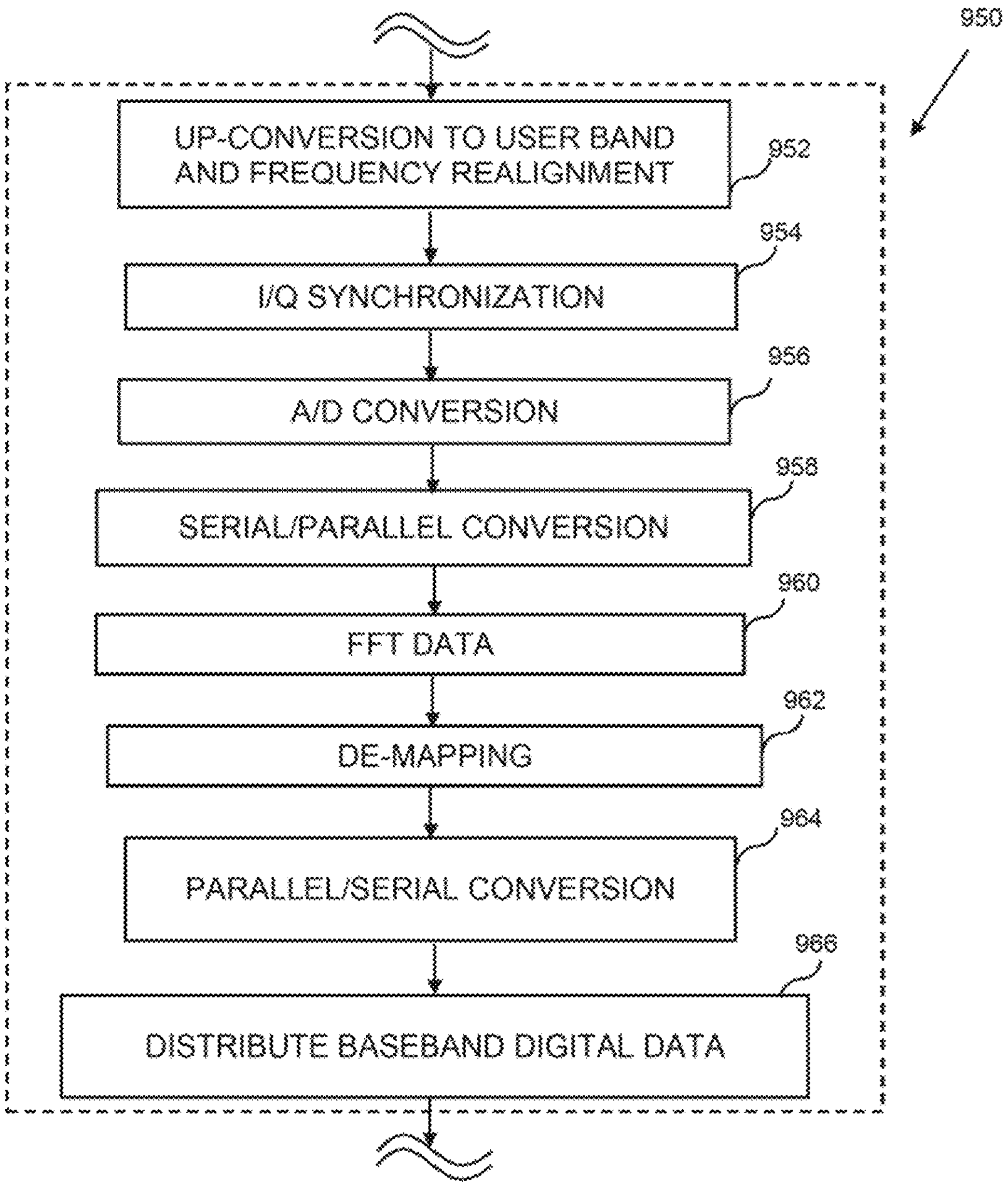
FIG. 9*c* is a logical flow diagram illustrating one particular implementation of content reception and digital processing by a CPEe according to the generalized method of FIG. 9.
Figure 9D:
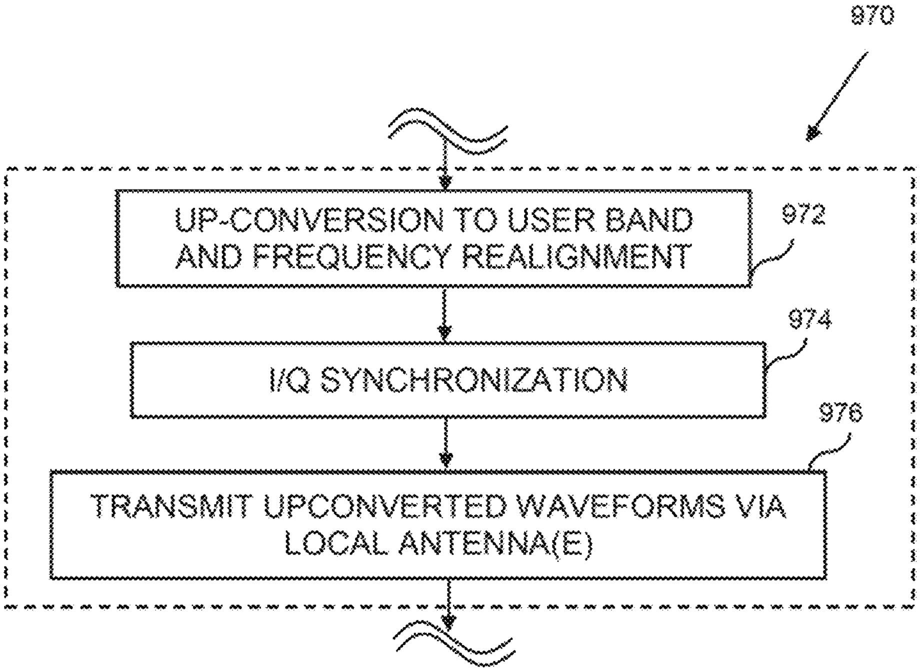
FIG. 9*d* is a logical flow diagram illustrating one particular implementation of content reception and transmission within a premises by a CPEe according to the generalized method of FIG. 9.

Referring now to FIGS. 9-9*d*, methods of operating the network infrastructure of, e.g., FIG. 4 herein are shown and described.

FIG. 9 is a logical flow diagram illustrating one embodiment of a generalized method 1200 of utilizing an existing network (e.g., HFC) for high-bandwidth data communication. As shown, the method includes first identifying content (e.g., digitally rendered media or other data, etc.) to be transmitted to the recipient device or node (e.g., a requesting CPEe 413 or UE in communication therewith) per step 902.

Next, per step 904, the transmission node 409 generates waveforms "containing" the identified content data. As described below, in one embodiment, this includes generation of OFDM waveforms and time-frequency resources to carry the content data (e.g., PRBs). As discussed in greater detail below with respect to FIG. 9*a*, the waveform generation and transmission process may also include both: (i) application of frequency diversity in accordance with FIG. 7*c* herein, and (ii) I-Q multiplexing onto one QPSK analog synchronization channel within the aforementioned "minor portion" 733 (FIG. 7*c*) from the signal generator 718 of the transceiver node 409 to the multiple inline amplifiers and CPEe 413 that may be sharing the coaxial bus.

Per step 906, the waveforms are transmitted via the network infrastructure (e.g., coaxial cable and/or DWDM optical medium) to one or more recipient nodes. It will be appreciated that such transmission may include relay or transmission via one or more intermediary nodes, including for instance one or more N-way taps (FIG. 5), optical nodes, repeaters, etc.).

Per step 908, the transmitted waveforms are received at the recipient node (e.g., CPEe 413 in one instance).

The waveforms are then upconverted in frequency (e.g., to the specified user frequency band per step 912 (including recovery of the frequency diversity shifts), and transmitted per step 914 via the local (e.g., premises RAN or distribution medium) for use by, e.g., consuming or requesting UE. Specifically, in the exemplary embodiment, and as shown in block 810 of FIG. 8, the CPEe 413 upconverts each frequency band on the cable, from 50 to 850 MHz for Port 0 and 850 to 1650 MHz for Port 1 in the exemplary frequency plan of 1.6 GHz total), to the same RF frequency. Hence, realignment of the frequency offsets applied by the transmitter occurs by virtue of a different frequency multiplier being applied to each Port.

FIG. 9*a* is a logical flow diagram illustrating one particular implementation of content processing and transmission methods 920 according to the generalized method of FIG. 9. Specifically, as shown, the method 920 includes first determining the frequency mapping plan or allocation for the transmission per step 922. In one variant, this mapping is in accordance with one of the schemes 730, 740 shown in FIG. 7*c*; i.e., a number of wideband TDD NR carriers are utilized within an IF band (between $f_{lower}$ and $f_{upper}$), along with 4G/4.5G carriers and a synchronization band. FIG. 12*b* discussed below described one exemplary approach for such frequency mapping determination.

It will also be appreciated that the frequency mapping plan may be varied on a temporal or other basis, including based on one or more TDD slots. For instance, the same mapping may be applied on two or more contiguous slots, or per individual slot. Individual mappings may be used for one or more subsets of CPEe's 413 as well, such as where the same subset of CPEe accesses the bearer medium according to a prescribed TDD schedule, and all utilize the common frequency mapping.

Next, per step 924, frequency diversity is applied to the generated data streams according to the mapping plan determined in step 922. In one variant, the different data streams generated according to 5G NR MIMO spatial diversity techniques are utilized; i.e., each separate MIMO data stream (Ports 0 and 1) is applied to two or more wideband carriers 732 within the mapping plan.

A serial-to-parallel conversion of the content data is then applied per step 926. Next, the parallelized data is mapped to its resources (step 928), and an IFFT or other such transformation operation performed to convert the frequency-domain signals to the time domain (step 930). The transformed (time domain) data is then re-serialized (step 932) and converted to the analog domain (step 934) for transmission over e.g., the RF interface such as a coaxial cable plant. In the exemplary embodiment, an IF band on the plant (e.g., 50 to 1650 MHZ) is used, although it will be appreciated that other frequency bands (and in fact multiple different frequency bands in various portions of the spectrum) may be used for this purpose, including higher frequencies for comparatively shorter cable runs.

FIG. 9*b* is a logical flow diagram illustrating one particular implementation of the frequency mapping plan determination methods 922 by a transmitting node 409 according to the method of FIG. 9*a*. In this method 922, the node 409 (e.g., the CUe 404) first determines the required bandwidth for the multiple MIMO data streams (e.g., Ports 0 and 1) per step 940. This determination may be accomplished by simply adding the requisite maximum bitrates for the streams, based on requisite performance (e.g., latency) requirements, and/or other criteria relating to the data streams (or othe original data stream from which the individual MIMO streams were derived). In one variant, adequate frequency bandwidth for the LTE and synchronization channels (discussed below) are reserved using a predetermined value (e.g., 45 MHz), although in other variants, LTE channel demand may be dynamically assessed as well. Synchronization channel bandwidth is presumed to be basically static, since it involves no user plane data.

Next, per step 942, the available frequency spectrum on the bearer medium (e.g., HFC plant) is determined. As previously noted, the total available useful spectrum on the exemplary configuration of the HFC cable of FIG. 4 is on the order of 1.6 GHZ (see FIGS. 6*a* and 6*b*). Since the higher frequencies within that band attenuate much more over the coaxial medium than lower frequencies, the implementation of FIG. 9*b* uses Intermediate Frequencies (IF), and block-conversion to RF carrier frequency is employed subsequently in the CPEe 413 for 3GPP band-compliant interoperability with the 3GPP 5G NR chipset in the CPEe. As such, the exemplary determination of step 942 includes both (i) determining what portion(s) of the spectrum are physically available duringthe requisite temporal period (e.g., not consumed by some other asset, not unavailable due to maintenance or equipment failure, etc.), and (ii) selecting one or more portions of the available spectrum that also meet the IF criterion (i.e., do not exhibit excess attenuation). As previously noted, the attenuation varies as a function of frequency, so even within a single wideband TDD carrier 732 (FIG. 7*c*), some variation will occur. As such, the previously described tilt compensation is used to account for such variations across the breadth of the applicable portion of the frequency spectrum.

The IF criterion used may be determined a priori (e.g., based on testing or characterization of the HFC plant or portions thereof), and/or determined dynamically at time of mapping (such as based on operational considerations or parameters).

Per step 944, $f_{upper}$ and $f_{lower}$ are selected based on available/designated spectrum from step 942. It will be appreciated that while the TDD spectrum portion shown in FIG. 7*c* is continuous (i.e., one block of about 1600 MHZ), this is not a requirement, and in fact the available "IF" spectrum used to map the MIMO data streams may be several non-contiguous portions, such as e.g., several N MHz (N ranging in value according to use of multiple MIMO layers in each carrier, use of carrier aggregation, and so forth) wideband carriers 732 interspersed throughout the illustrated 1600 MHz band or other. Selection of the upper and lower frequencies (including several of each when non-contiguous portions are used) enables the subsequent mapping of the data streams to the available/allocated spectrum portion(s) per step 946. For instance, in one implementation, each of two (2) independent MIMO spatial diversity streams, Ports 0 and 1, are mapped to respective ones of TDD carriers 732 within the allocated band(s) during one or more TDD DL access intervals for that node 409. In one approach, the respective center frequencies $f_{ci}$ are specified until all MIMO channels available for mapping are allocated.

Next, per step 948, the two (2) or more LTE carriers (18 MHz each with guard bands of 10%, so approximately 40 MHz in total) as shown in FIG. 7*c* are mapped onto the available spectrum portion(s). As previously discussed, these channels enable, inter alia, support under NSA operation.

Finally, per step 949, the synchronization channel(s) carrier (<5 MHz with guard band in one implementation) as shown in FIG. 7*c* is mapped onto the available spectrum portion(s). As previously discussed, this analog channel carries data bits in QPSK modulated I-Q multiplexed format to enable, inter alia, receiver synchronization for LTE and 5G NR receivers.

FIG. 9*c* is a logical flow diagram illustrating one particular implementation of content reception and digital processing methods 950 by a CPEe according to the generalized method of FIG. 9. In this method, the CPEe 413 receives the transmitted waveforms (see step 936 of the method 920), and performs analog-domain upconversion to the target frequency (e.g., user band) per step 952.

Per step 954, the upconverted signals are synchronized via the recovered I/Q signals via the synchronization circuit of the CPEe 413, and the upconverted signals are converted to the digital domain for use by, e.g., the chipset 816 of the CPEe 413 (see FIG. 8*a*). Within the chipset, the digital domain signals are processed including inter alia serial-to-parallel conversion, FFT transformation of the data back to the frequency domain (step 960), de-mapping of the physical resources (step 962), parallel-to-serial conversion (step 964), and ultimately distribution of the digital (baseband) data to e.g., the 10 GbE switch, Wi-Fi router, etc. (step 966). As previously discussed, the CPEe receiver also "realigns" the frequency-shifted IF MIMO streams (e.g., corresponding to Ports 0 and 1).

FIG. 9*d* is a logical flow diagram illustrating one particular implementation of content reception and transmission within a premises by a CPEe according to the generalized method of FIG. 9. Specifically, as shown in FIG. 9*d*, the method 970 includes upconversion to the user band (step 972) as in the method 950 described above, but rather than conversion to the digital domain as in the method 950, the upconverted analog domain signals are synchronized (step 974) and provided to one or more repeater ports for transmission of the upconverted waveforms via the antenna(e) of the repeater module per step 976 (see FIG. 8*a*). Again, the CPEe receiver in this embodiment also "realigns" the frequency-shifted IF MIMO streams (e.g., corresponding to Ports 0 and 1).

In exemplary implementations, supplemental link addition may be conducted according to any number of schemes, including without limitation: (i) 3GPP-based CA (carrier aggregation), or (ii) use of an additional MIMO (spatial diversity) layer or layers.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized network apparatus configured for use in a content distribution network, the computerized network apparatus comprising:

a first wireless data interface configured to transmit radio frequency (RF) waveforms onto a wireline or optical medium of the content distribution network, the RF waveforms comprising at least two spatially diverse data streams;

digital processor apparatus in data communication with the first wireless data interface; and a storage device in data communication with the digital processor apparatus and comprising at least one computer program, the at least one computer program comprising a plurality of instructions which are configured to, when executed by the digital processor apparatus, cause the computerized network apparatus to:

map the at least two spatially diverse data streams to respective frequency resources based at least on channel quality feedback received from one or more destination nodes;

select an appropriate modulation and coding scheme (MCS) for each of the at least two spatially diverse data streams; and transmit the at least two spatially diverse data streams to the one or more destination nodes, via the wireline or optical medium of the content distribution network and utilizing the respective frequency resources and the appropriate MCS.

2. The computerized network apparatus of claim 1, wherein the one or more destination nodes comprises at least one computerized premises apparatus.

3. The computerized network apparatus of claim 1, wherein the RF waveforms are orthogonal frequency division multiplex (OFDM) modulated.

4. A computerized method of determining a frequency mapping plan, the computerized method comprising:

determining an available frequency spectrum on a bearer medium;

selecting an upper frequency and a lower frequency of the available frequency spectrum, the selecting of the upper frequency and the lower frequency enabling mapping of at least two spatially diverse data streams onto one or more portions of the available frequency spectrum;

mapping at least two LTE carriers onto the one or more portions of the available frequency spectrum; and mapping one or more synchronization channels onto the one or more portions of the available frequency spectrum;

wherein the determining of the available frequency spectrum on the bearer medium comprises determining which portions of a spectrum are physically available during a requisite temporal period and selecting the one or more portions of the available frequency spectrum that meet at least one intermediate frequency (IF) criterion.

5. The computerized method of claim 4, further comprising determining a required bandwidth for the at least two spatially diverse data streams.

6. The computerized method of claim 5, wherein the determining the required bandwidth for the at least two spatially diverse data streams comprises adding requisite maximum bitrates for the at least two spatially diverse data streams, based on one or more performance requirements.

7. The computerized method of claim 4, further comprising reserving at least an adequate bandwidth for the at least two LTE carriers and the one or more synchronization channels using a predetermined value.

8. The computerized method of claim 4, wherein the mapping of the one or more synchronization channels onto the one or more portions of the available frequency spectrum comprises mapping at least one guard band less than 5 MHz onto the one or more portions of the available frequency spectrum.

9. The computerized method of claim 4, wherein the determining of the available frequency spectrum on the bearer medium comprises determining the available frequency spectrum on a hybrid fiber coax (HFC) infrastructure.

10. The computerized method of claim 4, wherein the selecting of the one or more portions of the available frequency spectrum that meet the at least one IF criterion comprises selecting of the one or more portions of the available frequency spectrum that do not exhibit excess attenuation.

11. The computerized method of claim 4, further comprising determining the at least one IF criterion a priori based on testing or characterization of at least a portion of a hybrid fiber coax (HFC) infrastructure.

12. The computerized method of claim 4, wherein the mapping of the at least two spatially diverse data streams to the one or more portions of the available frequency spectrum comprises mapping each of the at least two spatially diverse data streams to respective ones of TDD carriers within one or more allocated bands during one or more TDD DL access intervals for a node.

13. The computerized method of claim 4, further comprising transmitting the at least two spatially diverse data streams from a point-to-multipoint transmission node of a content delivery network infrastructure at an intermediate frequency (IF) which is between the upper frequency and the lower frequency.

14. The computerized method of claim 4, further comprising transmitting the one or more synchronization channels over the lower frequency of the available frequency spectrum.

15. The computerized method of claim 4, wherein the mapping of the one or more synchronization channels onto the one or more portions of the available frequency spectrum comprises mapping two digital synchronization channels, one of the two digital synchronization channels associated with Fifth Generation (5G) and another one of the two digital synchronization channels associated with Fourth Generation (4G) technology.

16. The computerized method of claim 15, further comprising I (In-phase) and Q (Quadrature) multiplexing the two digital synchronization channels onto one QPSK analog synchronization channel.

17. The computerized method of claim 15, wherein the two digital synchronization channels enable a computerized user device to switch between upstream and downstream modes of the at least two LTE carriers, respectively.

18. A computer readable apparatus comprising a non-transitory storage apparatus, the non-transitory storage apparatus comprising at least one computer program having a plurality of instructions which are configured to, when executed by a digital processing apparatus of a computerized network apparatus within a content distribution network, cause the computerized network apparatus to:

transmit radio frequency (RF) waveforms onto a wireline or optical medium of the content distribution network, the RF waveforms comprising at least two spatially diverse data streams;

map the at least two spatially diverse data streams to respective frequency resources based at least on channel quality feedback received from one or more destination nodes;

select an appropriate modulation and coding scheme (MCS) for each of the at least two spatially diverse data streams based at least on the channel quality feedback; and transmit the at least two spatially diverse data streams to the one or more destination nodes, via the wireline or optical medium of the content distribution network and utilizing the respective frequency resources and the appropriate MCS.

19. The computer readable apparatus of claim 18, wherein the RF waveforms are orthogonal frequency division multiplex (OFDM) modulated.

20. The computer readable apparatus of claim 18, wherein the one or more destination nodes comprise at least one computerized premises apparatus.

* * * * *